(12) United States Patent
Mueck et al.

(10) Patent No.: US 12,520,147 B2
(45) Date of Patent: Jan. 6, 2026

(54) TECHNOLOGIES FOR IMPLEMENTING THE RADIO EQUIPMENT DIRECTIVE

(71) Applicant: Intel Corporation, Santa Clara, CA (US)

(72) Inventors: Markus Dominik Mueck, Unterhaching (DE); Krzysztof Stanislaw Legutko, Munich (DE); Michael Faerber, Wolfratshausen (DE); Dario Sabella, Gassino Torinese (IT); Biljana Badic, Munich (DE); Nuno Manuel Kiilerich Pratas, Gistrup (DK)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 17/761,135

(22) PCT Filed: Nov. 13, 2020

(86) PCT No.: PCT/US2020/060471
§ 371 (c)(1),
(2) Date: Mar. 16, 2022

(87) PCT Pub. No.: WO2021/097253
PCT Pub. Date: May 20, 2021

(65) Prior Publication Data
US 2023/0007483 A1      Jan. 5, 2023

Related U.S. Application Data

(60) Provisional application No. 62/935,338, filed on Nov. 14, 2019.

(51) Int. Cl.
*H04W 12/08* (2021.01)
*H04W 4/50* (2018.01)
(Continued)

(52) U.S. Cl.
CPC .............. *H04W 12/08* (2013.01); *H04W 4/50* (2018.02); *H04W 8/22* (2013.01); *H04W 12/02* (2013.01);
(Continued)

(58) Field of Classification Search
CPC ....... H04W 12/08; H04W 4/50; H04W 12/61; H04W 12/63; H04W 12/069; H04W 8/22; H04W 12/02; H04W 52/243; H04W 64/00
See application file for complete search history.

(56) References Cited

U.S. PATENT DOCUMENTS 6,449,461 B1    9/2002  Otten
9,491,770 B1   11/2016  Heninwolf
(Continued)

FOREIGN PATENT DOCUMENTS

WO     WO2018/236399 A1    12/2018

OTHER PUBLICATIONS

Partial Supplementary European Search Report dated Oct. 26, 2023 for European Patent Application No. 20888065.8, 14 pages.
(Continued)

*Primary Examiner* — Curtis B Odom
(74) *Attorney, Agent, or Firm* — Essential Patents Group, LLP; Christopher K. Gagne

(57) ABSTRACT

Disclosed embodiments are related to various Radio Equipment implementations based on the European Union Radio Equipment Directive. Embodiments include implementations for safety and health, electromagnetic compatibility, and the efficient use of the radio spectrum, and cyber security including, inter alia, privacy protection and protection against fraud. Furthermore, additional aspects cover interoperability, access to emergency services, and compliance regarding the combination of Radio Equipment and software. Other embodiments may be described and/or claimed.

9 Claims, 44 Drawing Sheets

(51) Int. Cl.
  *H04W 8/22* (2009.01)
  *H04W 12/02* (2009.01)
  *H04W 12/069* (2021.01)
  *H04W 12/61* (2021.01)
  *H04W 12/63* (2021.01)
  *H04W 52/24* (2009.01)
  *H04W 64/00* (2009.01)

(52) U.S. Cl.
  CPC ......... *H04W 12/069* (2021.01); *H04W 12/61* (2021.01); *H04W 12/63* (2021.01); *H04W 52/243* (2013.01); *H04W 64/00* (2013.01)

(56) References Cited

U.S. PATENT DOCUMENTS

| | | |
|---|---|---|
| 2003/0118353 A1 | 6/2003 | Baller et al. |
| 2003/0171113 A1 | 9/2003 | Choi |
| 2012/0207040 A1 | 8/2012 | Comsa et al. |
| 2019/0089386 A1* | 3/2019 | Choi .................. H04B 1/00 |

OTHER PUBLICATIONS

"Reconfigurable Radio Systems (RRS) ; Use cases for dynamic equipment reconfiguration", ETSI TR 102 967 V1.2.1 (Nov. 2015), 29 pages.

"Reconfigurable Radio Systems (RRS); Security related use cases and threats", ETSI TR 103 087 V1.2.1 (Nov. 2017), 119 pages.

"Guide to the Radio Equipment Directive 2014/53/EU", RED Guide, Version of Jun. 5, 2018, 56 pages (Jun. 5, 2018).

Extended European Search Report dated Feb. 5, 2024 or European Patent Application No. 20888065.8, 15 pages.

Ting Kuo-Chang et al., "Loading Aware Green Power Control (LAGPC) for the Mitigation of Co-Tier Downlik Interface for Femtocell in the Future 5G Networks", Jul. 3, 2018, 14 pages, vol. 24, No. 3, Mobile Networks and Applications, Springer, New York.

International Search Report and Written Opinion mailed Feb. 26, 2021 for International Patent Application No. PCT/US2020/060471, 14 pages.

The European Parliament and the Council of the European Union, "Directive 2014/53/EU of the European Parliament and of the Council of Apr. 16, 2014 on the harmonisation of the laws of the Member States relating to the making available on the market of radio equipment and repealing Directive 1999/5/EC", Official Journal of the European Union, 45 pages (Apr. 16, 2014).

ETSI, "Reconfigurable Radio Systems (RRS); Radio Reconfiguration related Requirements for Mobile Devices", Draft ETSI EN 302 969 V1.2.1, 22 pages (Jul. 2014).

ETSI, "Reconfigurable Radio Systems (RRS); Radio Reconfiguration related Requirements for Mobile Devices", ETSI EN 302 969 V1.2.1, 22 pages (Nov. 2014).

ETSI, "Reconfigurable Radio Systems (RRS); Radio reconfiguration related architecture for Mobile Devices (MD)", ETSI EN 303 095 V1.3.1, 78 pages (May 2018).

ETSI, "Reconfigurable Radio Systems (RRS); Radio Equipment Reconfiguration Use Cases", ETSI TR 103 585 V1.1.1, 27 pages (Feb. 2018).

* cited by examiner

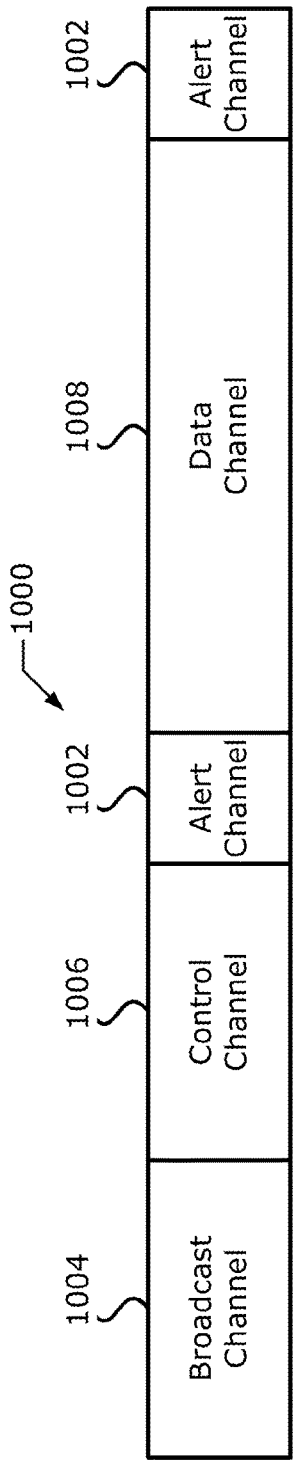
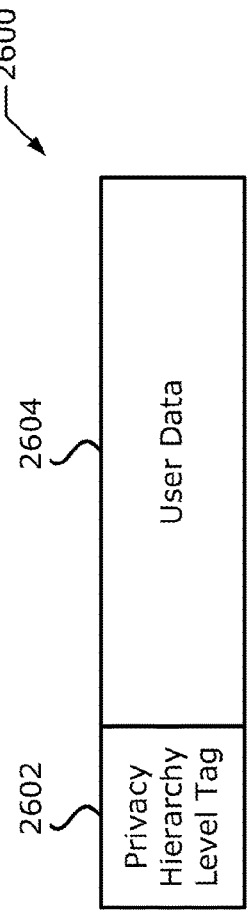
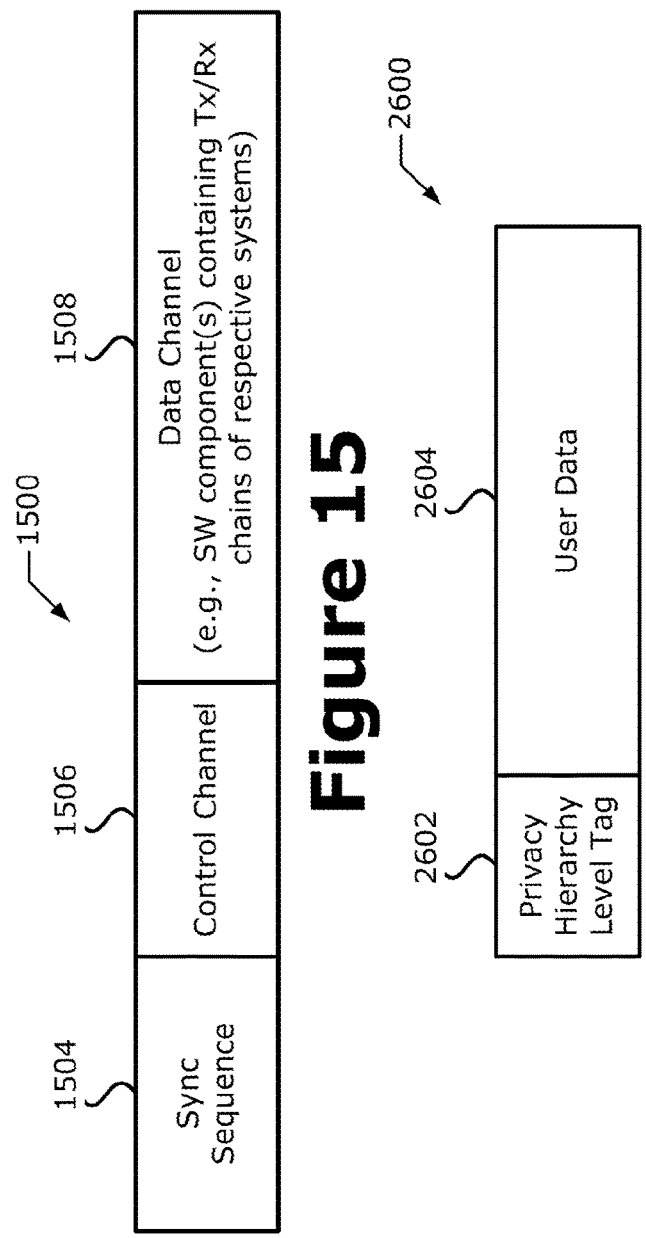
Figure 10
Figure 15
Figure 26

TECHNOLOGIES FOR IMPLEMENTING THE RADIO EQUIPMENT DIRECTIVE

RELATED APPLICATIONS

The present application is a national stage entry under 35 U.S.C. § 371 of Int'l App. No. PCT/US2020/060471, filed on Nov. 13, 2020, which claims priority to U.S. Provisional App. No. 62/935,338 filed Nov. 14, 2019, the contents of each of which are hereby incorporated by reference in their entireties.

FIELD

Embodiments described herein generally relate to edge computing, network communication, and communication system implementations, and in particular, to Radio Equipment implementations of the European Union (EU) Radio Equipment Directive (RED).

BACKGROUND

The DIRECTIVE 2014/53/EU OF THE EUROPEAN PARLIAMENT AND OF THE COUNCIL of 16 Apr. 2014 ON THE HARMONIZATION OF THE LAWS OF THE MEMBER STATES RELATING TO THE MAKING AVAILABLE ON THE MARKET OF RADIO EQUIPMENT AND REPEALING DIRECTIVE 1999/5/EC (hereinafter the "Radio Equipment Directive" or "[RED]") establishes a European Union (EU) regulatory framework for placing radio equipment (RE) on the market. The [RED] ensures a single market for RE by setting essential requirements for safety and health, electromagnetic compatibility, and the efficient use of the radio spectrum. The RED also provides the basis for further regulation governing some additional aspects. These include technical features for the protection of privacy, and protection of personal data and against fraud. Furthermore, additional aspects cover interoperability, access to emergency services, and compliance regarding the combination of RE and software.

The [RED] fully replaced the existing Radio & Telecommunications Terminal Equipment (R&TTE) Directive in June 2017. Compared to the R&TTE Directive, there are new provisions in the RED which are not yet "activated", but which will be implemented through so-called "Delegated Acts" and/or "Implementing Acts" by the European Commission in the future. Recently, an Expert Group has been set up by the European Commission for RED Article 3(3)(i) in order to prepare new "Delegated Acts" and "Implementing Acts" regulating equipment using a combination of hardware (HW) and software (SW).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 10 illustrates an example alert channel architecture according to various embodiments.

FIG. 15 illustrates an example interworking channel according to various embodiments.

FIG. 26 illustrates and example Privacy Hierarchy Level Tag for User Data, according to various embodiments.

DETAILED DESCRIPTION

Figure 1:
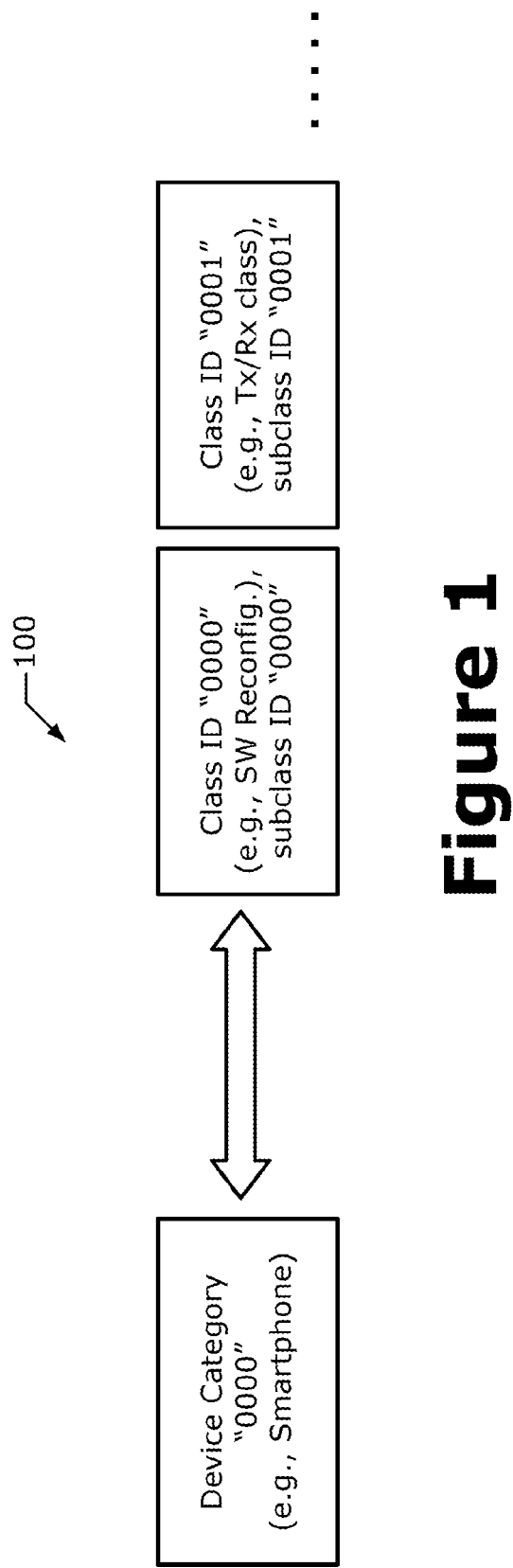
FIG. 1 illustrates an example device category frame format according to various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The embodiments herein are related to various aspects of the [RED]. The various embodiments discussed above are applicable to any kind of wireless equipment, including processors/CPUs with connectivity features, mobile devices (e.g., smartphones, feature phones, tablets, wearables (e.g., smart watches or the like), IoT product and/or IoT devices, laptops, wireless equipment in vehicles, industrial automation equipment, etc.), network or infrastructure equipment (e.g., Macro/Micro/Femto/Pico Base Stations, repeaters, relay stations, WiFI access points, RSUs, RAN nodes, backbone equipment, routing equipment, any type of Information and Communications Technology (ICT) equipment, any type of Information Technology (IT) equipment, etc.), and systems/applications that are not classically part of a communications network (e.g., medical systems/applications (e.g., remote surgery, robotics, etc.), tactile internet systems/applications, satellite systems/applications, aviation systems/applications, vehicular communications systems/applications, autonomous driving systems/applications, industrial automation systems/applications, robotics systems/applications, etc.). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

1. RED ARTICLE 5 ON RADIO EQUIPMENT REGISTRATION

Various embodiments are related to [RED] Article 5 "Registration of radio equipment types within some categories," which required that categories/classes/kinds of radio equipment (REs) needs to be registered. Also, a suitable set of such categories/classes/kinds of radio equipment are defined herein, for final implementation. As used herein, the term "radio equipment class" refers to a class identifying particular categories of REs which, under [RED], are considered similar and those radio interfaces for which the radio equipment is designed.

Article 5 of [RED] is as follows:

Article 5: Registration of Radio Equipment Types within Some Categories

1. As from 12 Jun. 2018, manufacturers shall register radio equipment types within categories of radio equipment affected by a low level of compliance with the essential requirements set out in Article 3 within a central system referred to in paragraph 4 of this Article prior to radio equipment within those categories being placed on the market. When registering such radio equipment types, manufacturers shall provide some, or where justified all, elements of the technical documentation listed in points (a), (d), (e), (f), (g), (h) and (i) of Annex V. The Commission shall allocate to each registered radio equipment type a registration number, which manufacturers shall affix on radio equipment placed on the market.
2. The Commission shall be empowered to adopt delegated acts in accordance with Article 44 specifying which categories of radio equipment are concerned by the requirement set out in paragraph 1 of this Article, and the elements of the technical documentation to be provided, taking into account the information on the compliance of radio equipment provided by Member States in accordance with Article 47(1) and following an evaluation of the risk of non-implementation of the essential requirements.
3. The Commission shall adopt implementing acts laying down the operational rules for registration and the operational rules for affixing the registration number on radio equipment for the categories specified by the delegated acts adopted pursuant to paragraph 2 of this Article. Those implementing acts shall be adopted in accordance with the examination procedure referred to in Article 45(3).
4. The Commission shall make available a central system allowing manufacturers to register the required information. That system shall ensure appropriate control of access to information of confidential nature.
5. Following the date of application of a delegated act adopted pursuant to paragraph 2 of this Article, the reports prepared in accordance with Article 47(1) and (2) shall evaluate its impacts.

Currently, there are no solutions for the implementation of [RED] Article 5 as defined. The alternative is thus to use an available database system. In order to anticipate the future implementation of [RED] Article 5, embodiments include specific definitions of categories, classes, types, and kinds of RE and how to link those to specific devices; mechanisms for performing the registration on an individual basis (e.g., for SW reconfigurable devices or Radio Reconfigurable Systems (RRS) or on a per-mass basis (e.g., for a given type of a smartphone); and mechanisms for accessing the registration database and how to manage access rights. Finally, the embodiments herein may be adopted by the European Commission as the officially mandated solution for implementation of [RED] Article 5 for any wireless equipment (e.g., cellular, RLAN, medical, professional, industrial, etc.).

The embodiments herein define suitable categories, classes, types and kinds of REs, which can be employed for regulatory purposes. This structuring leads to specific signaling and a specific mechanism for combining different capability classes. Such embodiments include suitable signaling means for conveying this information.

The embodiments also include includes mechanisms for performing RE registration. These embodiments allow REs to register with a central system, either on a mass RE basis or on individual RE basis. For example, individual registration may be performed by a specific manufacturing assembly of an automaker, OEM, etc. Individual registration may be required for SW based modification of radio capabilities. An example of the mass registration may be registration for a specific type of a smartphone. The RE registration mechanisms may also be used for fix configured devices (e.g., simple citizens band (CB) radio), and for modifiable devices (e.g., SW RE, RRS, etc.). These embodiments also include mechanisms for accessing a registration database (as mandated by [RED] Article 5) and how to manage access rights.

1.1. Radio Equipment Categories, Classes, Types, and Kinds

Definitions for categories, classes, types, and kinds are as follows:

The term "device kind" or "kind" refers to the final usage of the RE, for example, a smartphone, a sports watch with wireless capabilities, industrial IoT sensor, etc.

The term "device type" or "type" refers to a specific series of an RE of a given kind. For example, a specific smartphone model such as Apple IPhone 7, Samsung S6, etc., with a given serial number (e.g., with a given configuration) is a "type" of RE.

The term "device class" or "class" refers to specific capabilities of an RE such as "power classes", "functionality classes", etc. For example, a device of a low "power class" provides only limited output power levels while a device of a higher "power class" can provide increased output power levels depending on the need and locally applicable regulation.

The term "device category" or "category" refers to a combination of a type with one or more classes. For example a specific smartphone "type" (e.g., Samsung S6) combined a "power class", a "fraud protection class", etc., is denoted as a category.

Classes are derived them from RED Article 3 on Essential Requirements:

Article 3: Essential Requirements

1. Radio equipment shall be constructed so as to ensure:
   (a) the protection of health and safety of persons and of domestic animals and the protection of property, including the objectives with respect to safety requirements set out in Directive 2014/35/EU, but with no voltage limit applying;
   (b) an adequate level of electromagnetic compatibility as set out in Directive 2014/30/EU.
2. Radio equipment shall be so constructed that it both effectively uses and supports the efficient use of radio spectrum in order to avoid harmful interference.
3. Radio equipment within certain categories or classes shall be so constructed that it complies with the following essential requirements:
   (a) radio equipment interworks with accessories, in particular with common chargers;
   (b) radio equipment interworks via networks with other radio equipment;
   (c) radio equipment can be connected to interfaces of the appropriate type throughout the Union;
   (d) radio equipment does not harm the network or its functioning nor misuse network resources, thereby causing an unacceptable degradation of service;
   (e) radio equipment incorporates safeguards to ensure that the personal data and privacy of the user and of the subscriber are protected;
   (f) radio equipment supports certain features ensuring protection from fraud;
   (g) radio equipment supports certain features ensuring access to emergency services;
   (h) radio equipment supports certain features in order to facilitate its use by users with a disability;
   (i) radio equipment supports certain features in order to ensure that software can only be loaded into the radio equipment where the compliance of the combination of the radio equipment and software has been demonstrated.

The Commission shall be empowered to adopt delegated acts in accordance with Article 44 specifying which categories or classes of radio equipment are concerned by each of the requirements set out in points (a) to (i) of the first subparagraph of this paragraph.

For the essential requirements (reqs) of RED Article 3(3), embodiments include "classes" that are allocated a 4-digit (or more) Class ID together with a sub-ID as illustrated by the following examples:

1) Class ID "0000": Software Reconfiguration Classes (following the definitions in ETSI EN 302 969 V1.2.1 (2014 November) ("[EN302969]") and RED Art. 3(3)(i))
   a) Class sub-ID "0000": No Reconfiguration
   b) Class sub-ID "0001": No Resource Share
   c) Class sub-ID "0010": Pre-Defined Static Resources
   d) Class sub-ID "0011": Static Resource reqs
   e) Class sub-ID "0100": Dynamic Resource reqs
2) Class ID "0001": Transmission (Tx)/Reception (Rx) Classes (extension of RED Art. 3(3)(i))
   a) Class sub-ID "0000": Receiver only Device
   b) Class sub-ID "0001": Transmitter only Device
   c) Class sub-ID "0010": Transmitter & Receiver Device
3) Class ID "0010": Mobility Class (extension of RED Art. 3(3)(d))
   a) Class sub-ID "0000": Stationary
   b) Class sub-ID "0001": Portable
   c) Class sub-ID "0010": Mobile
   d) Class sub-ID "0011": High Mobility
4) Class ID "0011": Hardware Interfaces (RED Art. 3(3)(c))
   a) Class sub-ID "0000": Wired
   b) Class sub-ID "0001": Wireless
   c) Class sub-ID "0010": Wired and Wireless
5) Class ID "0100": Data Interfaces RED Art. 3(3)(c))
   a) Class sub-ID "0000": Wired
   b) Class sub-ID "0001": Wireless
   c) Class sub-ID "0010": Wired and Wireless
6) Class ID "0101": Device Purpose (extension of RED Art. 3(3)(c))
   a) Class sub-ID "0000": consumer
   b) Class sub-ID "0001": professional
   c) Class sub-ID "0010": emergency
   d) Class sub-ID "0011": education
   e) Class sub-ID "0100": medicine
   f) Class sub-ID "0101": government
7) Class ID "0110": EMC Class (RED Art. 3(3)(d))
   a) Class sub-ID "0000": low EMC
   b) Class sub-ID "0001": medium EMC
   c) Class sub-ID "0010": high EMC
   d) Class sub-ID "0011": harmful EMC 8) Class ID "0111": Power Class (extension of RED Art. 3(3)(d))
   a) Class sub-ID "0000": low Power
   b) Class sub-ID "0001": medium Power
   c) Class sub-ID "0010": high Power
   d) Class sub-ID "0011": harmful Power
9) Class ID "1000": Fraud protection Class (RED Art. 3(3)(f))
   a) Class sub-ID "0000": low fraud protection (e.g., simple or no encryption, etc.)
   b) Class sub-ID "0001": medium fraud protection (e.g., average encryption, etc.)
   c) Class sub-ID "0010": high fraud protection (e.g., high encryption, etc.)
   d) Class sub-ID "0011": extreme fraud protection (e.g., ultra-high encryption, etc.)
10) Class ID "1001": Safety Class (extension of RED Art. 3(3)(g))
    a) Class sub-ID "0000": Not person safety related
    b) Class sub-ID "0001": Low person safety related
    c) Class sub-ID "0010": Medium person safety related
    d) Class sub-ID "0011": High person safety related
    e) Class sub-ID "0100": Not domestic animal safety related
    f) Class sub-ID "0101": Low domestic animal safety related
    g) Class sub-ID "0110": Medium domestic animal safety related
    h) Class sub-ID "0111": High domestic animal safety related
11) Class ID "1010": Charger Type Class (RED Art. 3(3)(a))
    a) Class sub-ID "0000": Charger with CONNECTOR CABLE type "0000" (e.g., mini USB)
    b) Class sub-ID "0001": Charger with CONNECTOR CABLE type "0001" (e.g., USB3)
    c) Class sub-ID "xxxx": Charger CONNECTOR CABLE Type "xxxx" (any number of further connector types)
12) Class ID "1011": Network Interworking Class (RED Art. 3(3)(b))
    a) Class sub-ID "0000": No interworking features
    b) Class sub-ID "0001": Interworking with IEEE (WiFi, WiGig, etc.)
    c) Class sub-ID "0010": Interworking with 3GPP (NR/5G, LTE, etc.)
    d) Class sub-ID "0011": Interworking with ECMA (TV White Spaces ECMA-392, etc.)
    e) Etc.
13) Class ID "1100": Interface Connectivity Class (RED Art. 3(3)(c))
    a) Class sub-ID "0000": No connectivity to external interfaces
    b) Class sub-ID "0001": No connectivity to external interface "0001" (e.g., USB)
    c) Class sub-ID "0010": No connectivity to external interface "0010" (e.g., RS-232)
    d) Etc.
14) Class ID "1101": Emergency Service Class (RED Art. 3(3)(g))
    a) Class sub-ID "0000": No Emergency Service
    b) Class sub-ID "0001": Emergence Call without location determination
    c) Class sub-ID "0010": Emergence Call with location determination
    d) Etc.
15) Class ID "1110": Disabled User Support Class (RED Art. 3(3)(h))
    a) Class sub-ID "0000": No support for disabled user(s)
    b) Class sub-ID "0001": Low level of support for disabled user(s)
    c) Class sub-ID "0010": Medium level of support for disabled user(s)
    d) Class sub-ID "0011": High level of support for disabled user(s)
16) Class ID "1111": Partial Compliance to essential reqs (generally applicable to RED Art. 3)
    a) Class sub-ID "0000": product fully compliant with all essential reqs of RED Art. 3(3).
    b) Class sub-ID "0001": compliance to 8 out 9 essential reqs of RED Art. 3(3).
    c) Class sub-ID "0010": compliance to 7 out 9 essential reqs of RED Art. 3(3).
    d) Class sub-ID "0011": compliance to 6 out 9 essential reqs of RED Art. 3(3).
    e) Class sub-ID "0100": compliance to 5 out 9 essential reqs of RED Art. 3(3).
    f) Class sub-ID "0101": compliance to 4 out 9 essential reqs of RED Art. 3(3).
    g) Class sub-ID "0110": compliance to 3 out 9 essential reqs of RED Art. 3(3).
    h) Class sub-ID "0111": compliance to 2 out 9 essential reqs of RED Art. 3(3).
    i) Class sub-ID "1000": compliance to 1 out 9 essential reqs of RED Art. 3(3).
    j) Class sub-ID "1001": compliance to 0 out 9 essential reqs of RED Art. 3(3).
17) Class ID "10000": Harming network or causing unacceptable degradation of service (§ 3.3.d)
    a) Class sub-ID "0000": Low probability of harming network or causing degradation of service (e.g., low power equipment, high selectivity receiver, etc.)
    b) Class sub-ID "0001": Medium probability of harming network or causing degradation of service (e.g., low power equipment, low selectivity receiver, etc.)
    c) Class sub-ID "0010": Medium-High probability of harming network or causing degradation of service (e.g., high power equipment, high selectivity receiver, etc.)
    d) Class sub-ID "0011": High probability of harming network or causing degradation of service (e.g., higher power equipment, low selectivity receiver, etc.)
18) Class ID "10001": safeguards to protect personal data and privacy of the user (§ 3.3.e)
    a) Class sub-ID "0000": Low safeguard level (e.g., unencrypted and open system)
    b) Class sub-ID "0001": Medium safeguard level (e.g., encrypted system with authorization)
    c) Class sub-ID "0010": High safeguard level (e.g., encrypted system with authorization and secure memory storage of personal data)

Additionally or alternatively, the categorization and the related ID assignments shown by Table 1.1-1 can be used.

TABLE 1.1-1

| Layer 1 application | Layer 2 application (or definition for IoT and SDR) | Proposed ID |
|---|---|---|
| Dual-use defense, Meteorology, Radioastronomy, and/or Radiolocation | All (Note that RE for defense only is not in the scope of the RED) | ID (Layer 1) "0", sub ID (Layer 2) "0" |
| Satellite | All except (7) | ID (Layer 1) "1", sub ID (Layer 2) "0" for all |
| Land mobile | D-GPS<br>Inland waterway communications<br>Paging<br>PPDR<br>Telemetry/Telecommand | ID (Layer 1) "2", sub ID (Layer 2): "0" for D-GPS, "1" for "Inland waterway communications", "2" for Paging, "3" for PPDR, "4" for Telemetry/Telecommand |
| Other | GNSS Pseudolites<br>GNSS Repeaters<br>HAPS<br>Meteor scatter communications equipment<br>Standard frequency and time signal | ID (Layer 1) "3", sub ID (Layer 2): "0" for "GNSS Pseudolites", "1" for "GNSS Repeaters", "2" for "HAPS", "3" for "Meteor scatter", "4" for "communications equipment", "5" for "Standard frequency and time signal" |
| Short Range Devices | Inductive<br>RFID | ID (Layer 1) "4", sub ID (Layer 2): "0" for "Inductive", "1" for "RFID" |
| Aeronautical Maritime | All Aeronautical and Maritime equipment that are in the scope of the RED, but not to equipment falling out of its scope | ID (Layer 1) "5", sub ID (Layer 2): "0" for all |
| Satellite | Broadcasting (SIT/SUT only) | ID (Layer 1) "6", sub ID (Layer 2): "0" for Broadcasting (SIT/SUT only) |
| Broadcasting | Broadcasting (terrestrial)<br>PMSE | ID (Layer 1) "7", sub ID (Layer 2): "0" for "Broadcasting (terrestrial)", "1" for PMSE |
| Other | CB radio<br>MBR<br>ISM<br>UAS<br>Radionavigation equipment<br>Radiolocation equipment<br>Tracking systems equipment | ID (Layer 1) "8", sub ID (Layer 2): "0" for "CB radio", "1" for "MBR", "2" for "ISM", "3" for "UAS", "4" for "Radionavigation equipment", "5" for "Radiolocation equipment", "6" for "Tracking systems equipment" |
| Short Range Devices | All except (5) and (14) | ID (Layer 1) "9", sub ID (Layer 2): "0" for all |
| Land mobile | All except (3) | ID (Layer 1) "10", sub ID (Layer 2): "0" for all |
| Fixed | All | ID (Layer 1) "11", sub ID (Layer 2): "0" for all |
| Other | Commercially available amateur radio equipment | ID (Layer 1) "12", sub ID (Layer 2): "0" for all |
| Short Range Devices | UWB<br>WDTS | ID (Layer 1) "13", sub ID (Layer 2): "0" for "UWB", "1" for "WDTS" |
| Software Defined Radios | A Software Defined Radio is defined as: a system where components typically implemented and configured in hardware (e.g., mixers, filters, amplifiers, modulators/demodulators, detectors, etc.) are instead implemented and configured by means of software on a personal computer or embedded system. | ID (Layer 1) "14", sub ID (Layer 2): "0" for all |
| IoT | Radio equipment comprising the IoT is defined as: radio equipment intended to be<br>(i) connected to (directly or indirectly) or<br>(ii) controlled through<br>the internet or a wireless data network. | ID (Layer 1) "15", sub ID (Layer 2): "0" for all |

For all of the classes listed above, additional categories of (sub-)classes listed above can be added upon market as needed. FIG. 1 shows an example device category frame format 100 according to various embodiments. As shown by FIG. 1, a device category is constructed based on a number of Device Classes being combined together.

1.2. Registration to Central System and Access to Information in Central System

In embodiments, registration to a central database/system is performed by indicting either the device category, the concatenation of the related classes and/or sub-classes, or a combination thereof.

Figure 2:
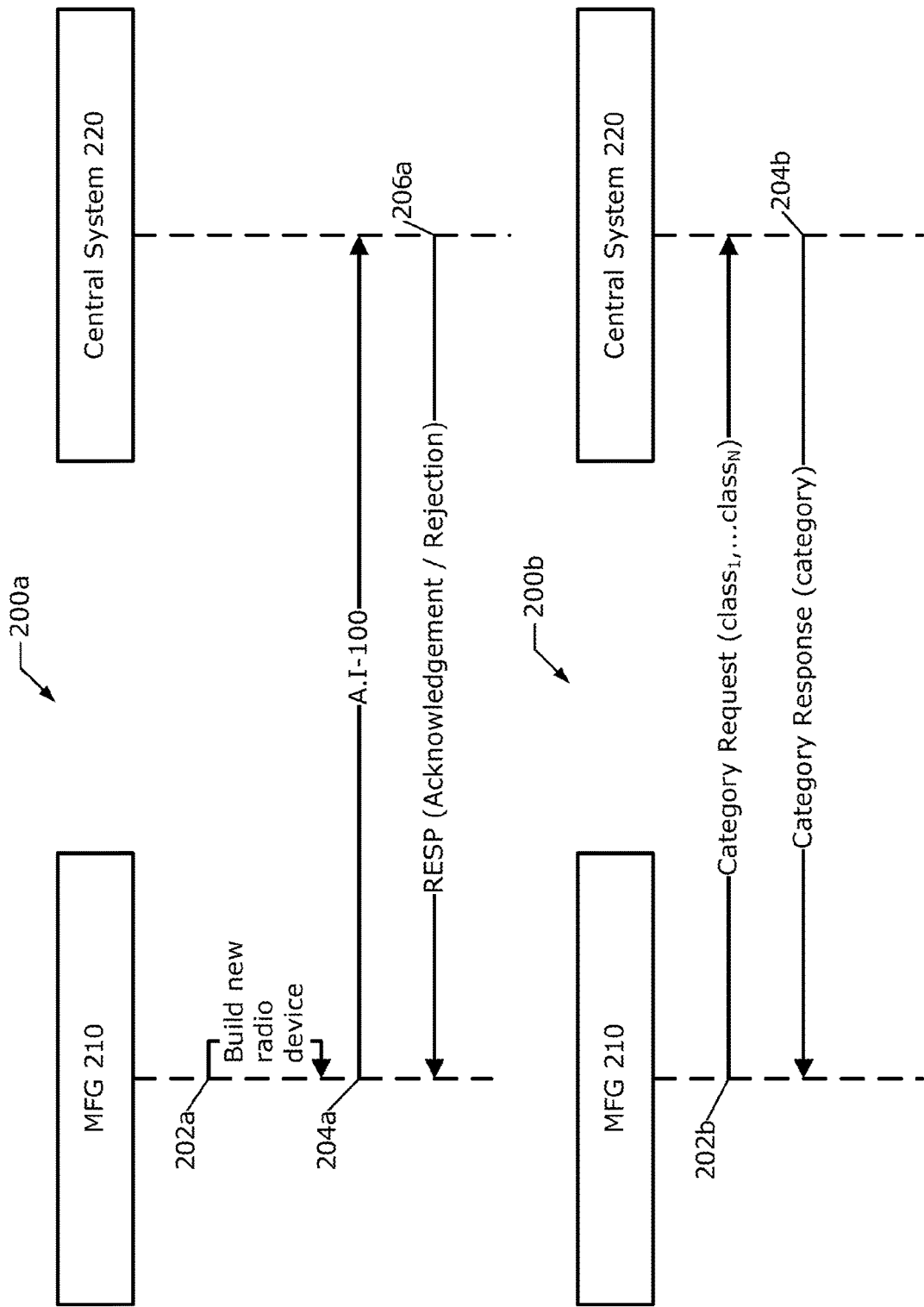
FIG. 2 illustrates an example registration and category request procedures according to various embodiments.

FIG. 2 shows an example registration procedure 200a according to various embodiments. Procedure 200 begins at operation 202a where a manufacturer (MFG) 110 builds a new radio device. At operation 204a, the MFG 110 sends a device category frame 100 to the central system 120. At operation 206a, the central system 120 sends a response (RESP) to the MFG 110. The response indicates acceptance of the device category (e.g., acknowledgement) or rejection of the device category by the central system 120.

The MFG 110 can also request the device category from the central database/system by providing a series of classes 1-N (where N is a number) characterizing the target RE, as is shown by procedure 200b of FIG. 2. Procedure 200b begins at operation 202b where the MFG 110 sends a category request to the central system 120. The category request includes the device categories for one or more devices. At operation 204b, the central system 120 sends a category response to the MFG 110. The category response includes the requested category (or categories) of the devices indicated by the category request.

The related device category is either taken from an existing (e.g., previously defined) device category matching the provided set of classes or a new device category defined by the central Registration System if the provided combination of device classes is unknown.

Following the implementation of [RED] Article 4 (expected by end of 2019 or early 2020), the registration of REs to a centralized database/system is highly likely to become mandatory. The centralized database/system may have access to the latest reconfiguration configuration of equipment. The data exchange mechanisms discussed herein will be the basis for the registration mechanisms, which are expected to be defined in a mandatory way by regulation administrations and/or through work in ETSI standardization.

One example implementation involves Internet-of-Things (IoT) equipment.

Typically, a single (or small number) of chipset solutions must meet the requirements of a broad market with potentially thousands or even millions of different applications and usage types. In this example, an RE manufacturer uses the chipsets and implements tailoring to its target application through software, which may be radio software or other software. For example, to make such chipsets suitable for Smart Watches, Smart Metering, Sensor applications, Industrial Automation applications (including sensors, control mechanisms for example for controlling machinery, robots, etc.), Sports equipment (e.g., Swing analysis tools for Golf, Tennis or similar), etc., corresponding software updates are registered wherein the request message is a registration query message querying the registration system for registered REs, and the response message is a registration response message indicating one or more REs registered with the registration system based on the device category.

2. TWO BINS APPROACH FOR REGULATION OF COMBINATION OF SOFTWARE AND HARDWARE

An RE may be Mass Market Equipment (MMkE) that needs to be in full compliance of the [RED], or Proof of Concept Equipment (PCE) (also referred to as "Research Equipment") that is fully reconfigurable and does not meet the requirements of the [RED]. Embodiments herein are capable of transforming PCE into a MMkE and vice versa.

Currently, PCE is in a regulatory 'grey zone' since it is unclear who takes the responsibility if interference is generated by the RE. It is also unclear whether reconfigurable radio platforms (or RRS) can be operated without specific licenses (such as a radio amateur license). The European Commission is preparing a clarification of the situation by issuing a "Delegated Act" and "Implementing Act" on [RED] Article 3(3)(i).

Embodiments herein provide a clear differentiation between PCE and MMkE. The present disclosure also provides embodiments to transform PCE into MMkE, and vice versa. The embodiments herein provide a regulatory framework, for example, for implementation of [RED] Article 3 and to be applied for all REs including, for example, smartphones, tablets, wearable devices, access points (e.g., WiFi routers), smallcell and/or macrocell RAN nodes, and the like.

Figure 3:
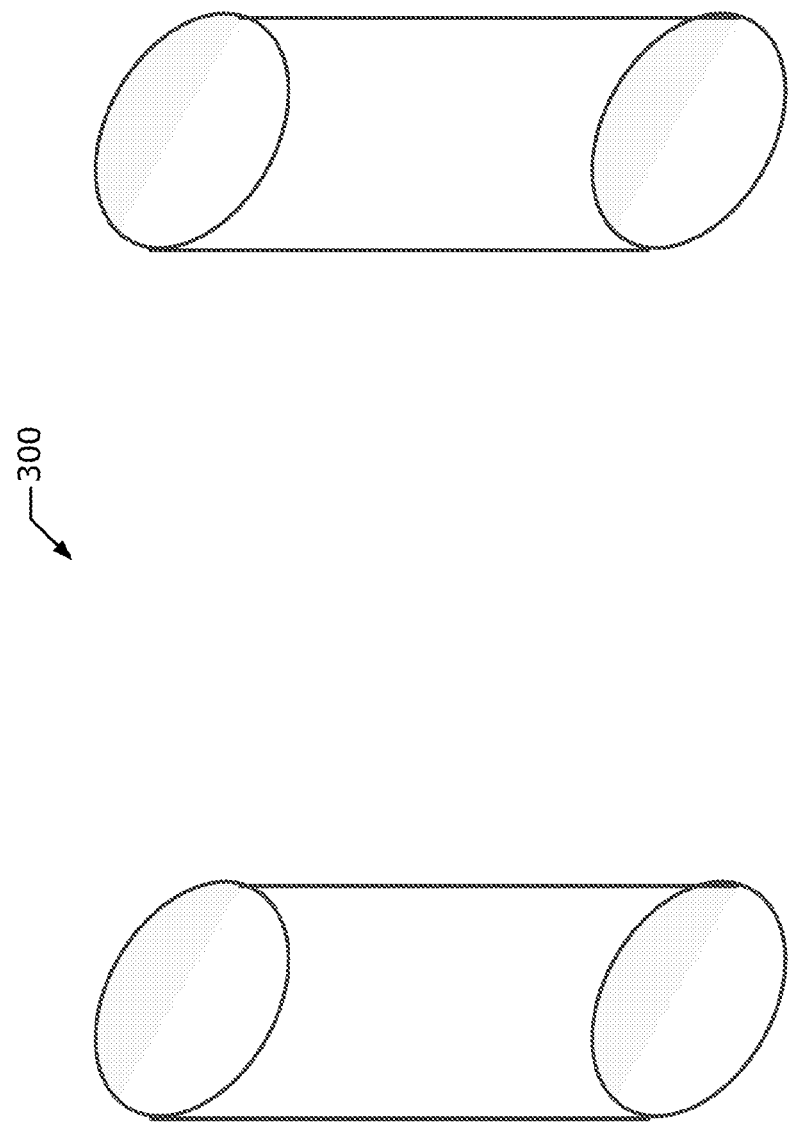
FIG. 3 illustrates an example of RE types according to various embodiments.

The embodiments introduce two high-level RE types, which is shown by FIG. 3. MMkE are RE that are available on the mass market for all users, and needs to be in full compliance of the [RED]. Reconfiguration of MMkE can only take place under the control of the equipment manufacturer. MMkE include a CE mark and/or a DoC.

PCE are RE that are fully reconfigurable, and include reconfigurable RF circuitry and other HW and SW elements. PCE usually does not comply with [RED] requirements, and are only available for licensed users such as researchers, RE enthusiasts, etc. PCE usually does not include a CE mark and/or a DoC.

For MMkE, by affixing or having affixed the CE marking, the manufacturer indicates that it takes responsibility for the conformity of the product with all applicable requirements set out in the relevant community harmonization legislation providing for its affixing (see e.g., Wellkang® Tech Consulting, "What is CE Marking (CE Mark)?", available at: http://www.ce-marking.org/what-is-ce-marking.html ("[CE-MARK]"):

1. CE Marking on a product is a manufacturer's declaration that the product complies with the essential requirements of the relevant European health, safety and environmental protection legislation, in practice by many of the so-called Product Directives.*

*Product Directives contains the "essential requirements" and/or "performance levels" and "Harmonized Standards" to which the products must conform. Harmonized Standards are the technical specifications (European Standards or Harmonization Documents) which are established by several European standards agencies (CEN, CENELEC, etc.).

2. CE Marking on a product indicates to governmental officials that the product may be legally placed on the market in their country.
3. CE Marking on a product ensures the free movement of the product within the EFTA & European Union (EU) single market (including totally 30 EEA* countries), and
4. CE Marking on a product permits the withdrawal of the non-conforming products by EEA customs and enforcement/vigilance authorities.

According to various embodiments, the activation of the DoC and the CE Marking is buffered or otherwise stored in a Trusted Space or TEE, such as a TPM. The TPM (e.g., TEE 4290 of FIG. 42 infra) is a specialized (tamper-resistant) chip on a computing device/system (e.g., endpoints 4311, 4321 of FIG. 43, edge computing node 4250 of FIG. 42, system 4100 of FIG. 41, and/or the like) that stores RSA encryption keys specific to the host system for hardware authentication. Each TPM chip contains an RSA public-private key pair called the Endorsement Key (EK). The EK is maintained inside the TPM and cannot be accessed by software. The private key never leaves the chip, while the public key is used for attestation and for encryption of sensitive data sent to the chip. In other embodiments, secure enclaves (e.g., provided using Intel® Software Guard Extensions (SGX), Oasis™ Keystone Enclaves, etc.) may be used to store the same or similar information. In these embodiments, the DoC and CE marking can be buffered in a memory block within the TEE/TPP 400, an example of which is shown by FIG. 4.

Figure 4:
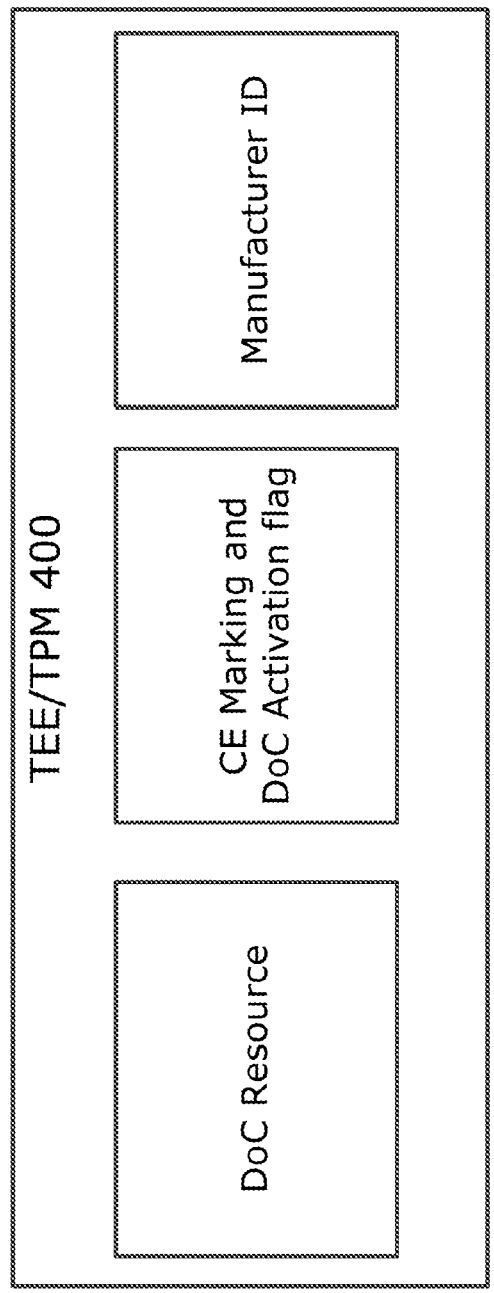
FIG. 4 illustrates an example trusted execution environment (TEE)/trusted platform module (TPM) according to various embodiments.

In the example of FIG. 4, the DoC Resource is a memory structure storing a resource (e.g., web address, URL, URI, etc.) of the DoC. The CE marking and DoC activation flag may be a flag indicating whether the CE marking and/or DoC has been activated (e.g., a value of "1") or deactivated (e.g., a value of "0"). The Manufacturer ID is an identifier of the manufacturer taking full responsibility if the CE/DoC flag is on (activated).

Figure 5:
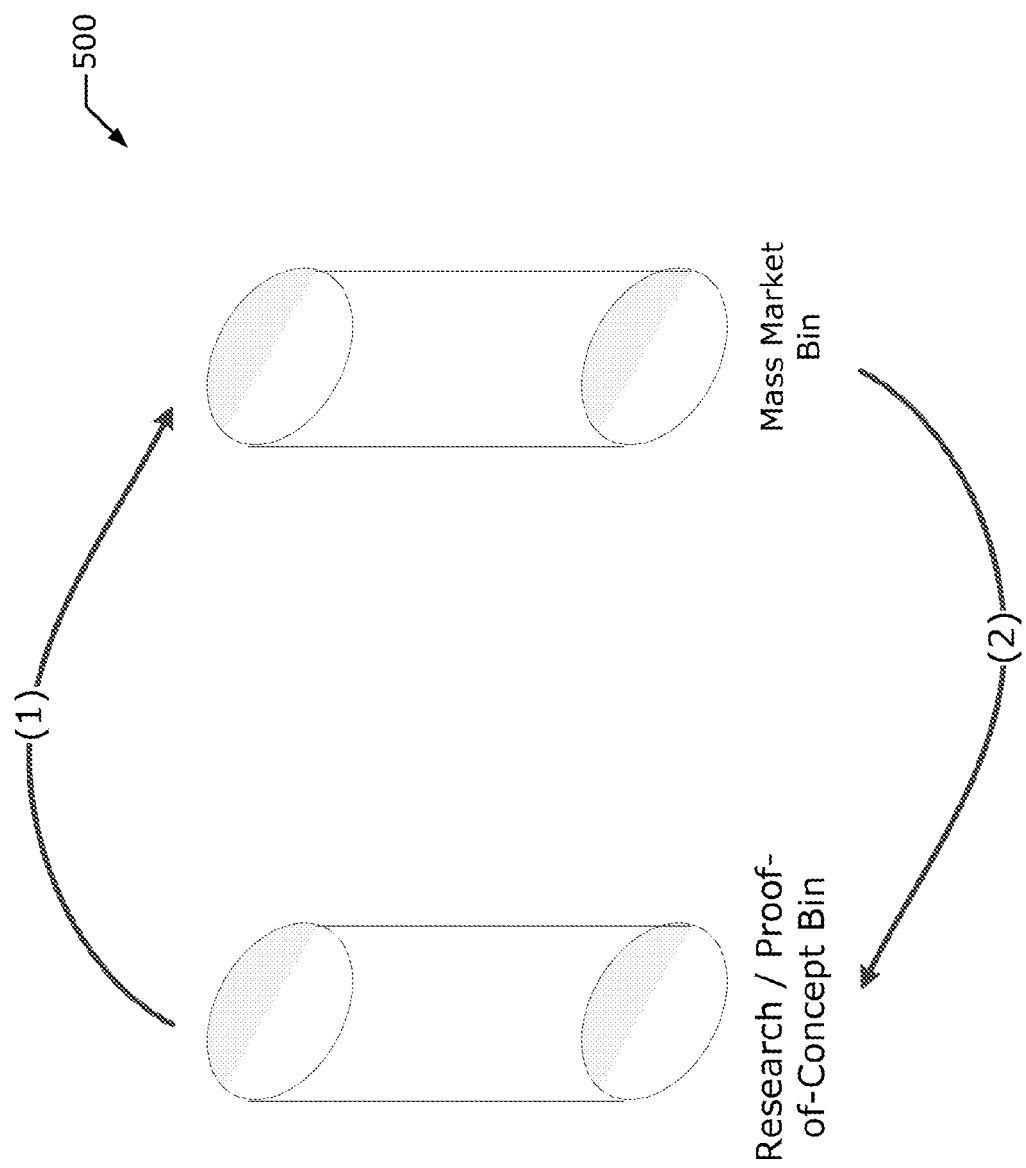
FIG. 5 illustrates an example bin transfer process according to various embodiments.

In various embodiments, a product may be transferred from one bin to the other bin as shown by the bin transfer process 500 of FIG. 5.

Referring to FIG. 5, at (1) a of "research platform" (e.g., USRP platforms) can be transformed into a mass market product by issuing a CE Mark and DoC including a declaration of an intended purpose (e.g., WiFi, LTE, Bluetooth®/BLE, etc.); and/or including mechanisms which ensure that compliance is always guaranteed (see e.g., [RED] Article 3(3)(i)) for all combinations of HW & SW accessible to the user. At (2), researchers may convert a mass market product (e.g., a WiFi Access Point) into a research platform by removing/deactivating the CE Marking and DoC including the declaration of intended purpose (e.g., WiFi, etc.) and/or enabling upload and activation of SW components provided by the researcher. This may be achieved in collaboration with the manufacturer, for example, through an authorization code. The signaling flow between the Equipment owner and the Manufacturer are as follows.

Figure 6:
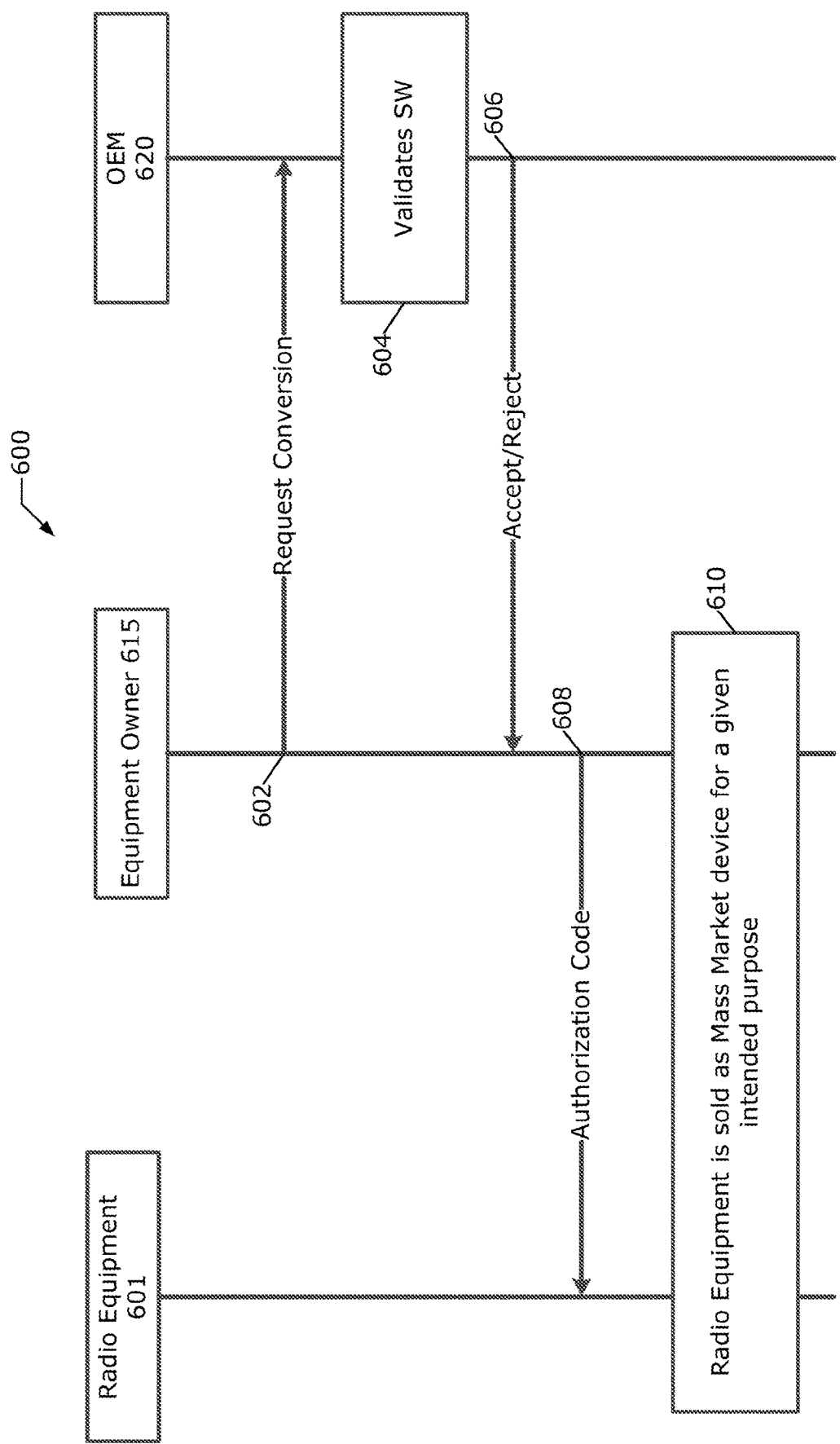
FIGS. 6, 7, and 8 illustrate example procedures for converting research platforms into Mass Market Equipment, and vice versa, according to various embodiments.

FIG. 6 shows an example procedure 600 for conversion of a research platform into MMkE (e.g., selling a WiFi Access Point built from an SDR Platform). FIG. 6 illustrates a first case where an Equipment Manufacturer (OEM) 620 remains as the manufacturer for the new devices and takes full responsibility. Procedure 600 begins at operation 602 where the Equipment Owner 615 provides Radio SW with a request to allow a conversion to MMkE to the OEM 620. At operation 604, the OEM 620 validates the request/SW, and either accepts (approves) or rejects the SW. If approved, the OEM 620 takes full responsibility and issues DoC, and then at operation 606 provides an authorization code to the Equipment Owner 615 in the accept message. At operation 608, the Equipment Owner 615 provides the authorization code to the RE 601 for installation and activation of the SW. At operation 610, the RE 601 may be sold as MMkE for a given intended purpose.

Figure 7:
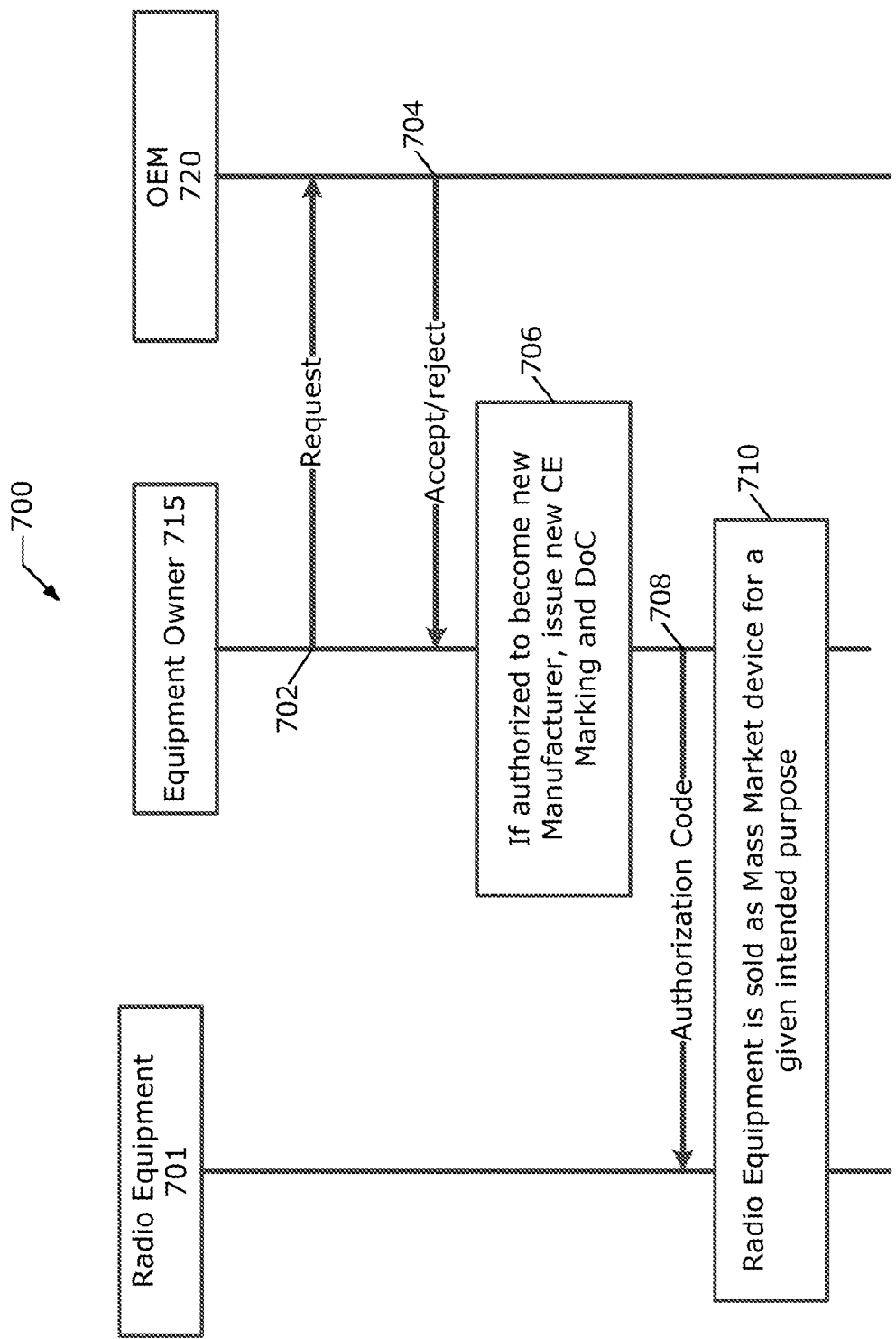

FIG. 7 illustrates an example procedure 700 for the case where an Equipment Owner takes the role of the OEM (in the sense of the [RED]) and takes full responsibility, according to various embodiments. Procedure 700 begins at operation 702 where, if required, the Equipment Owner 715 requests authorization to become the Manufacturer 720 in the sense of the [RED] to take full responsibility for the product. The OEM 720 accepts (approves) or rejects the request to make Equipment Owner 715 the new Manufacturer 720 at operation 704. If authorized by the OEM 720, at operation 706 the Equipment Owner 715 issues a new CE marking and DoC. If approved, at operation 708 the Equipment Manufacturer 715 provides an authorization code to the Equipment Owner 715 in the accept message. At operation 710, the Equipment Owner 715 issues the authorization code to the RE 701 for installation & activation of SW (if required: using authorization code by the OEM 720). After that, the RE 701 may be modified as PCE.

Figure 8:
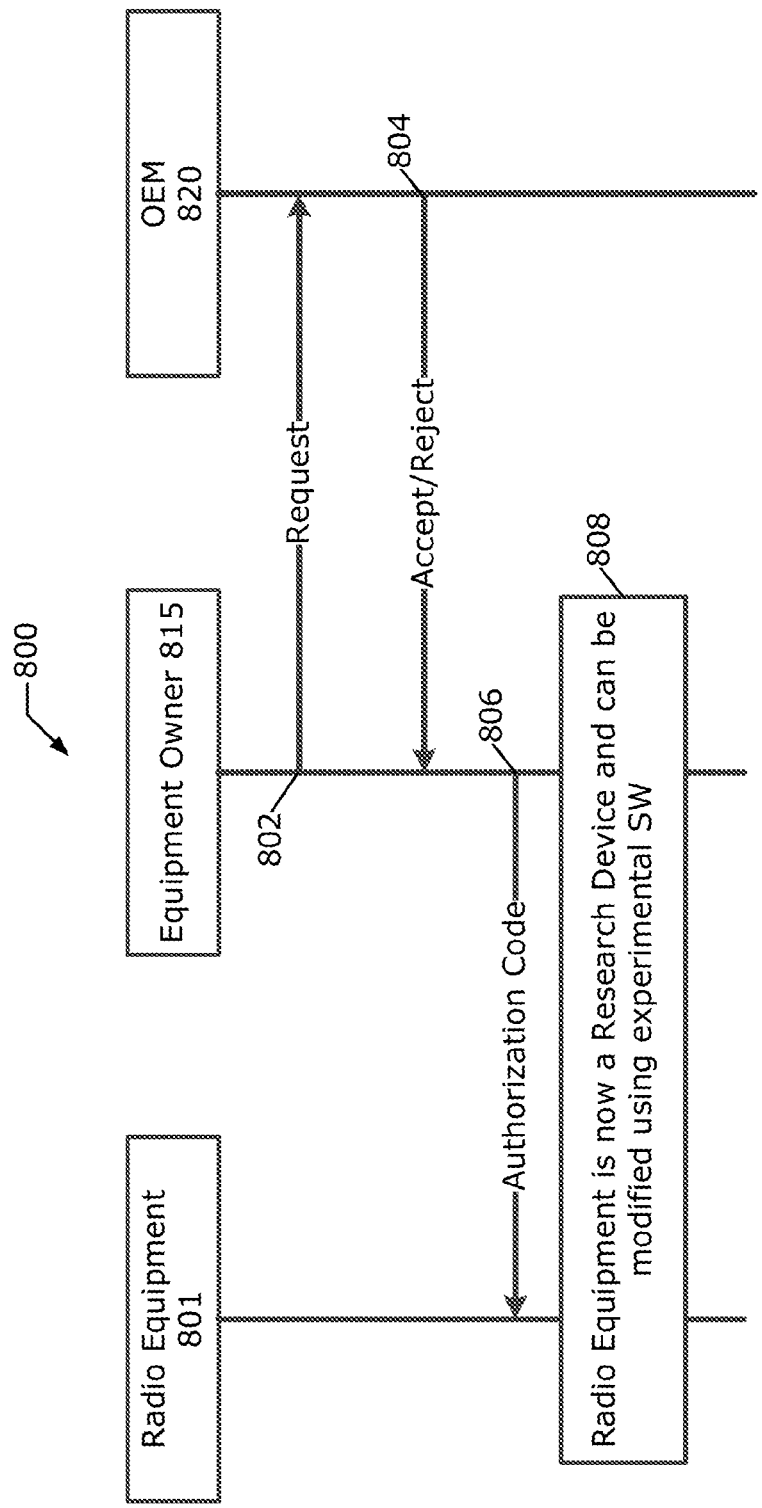

FIG. 8 illustrates an example procedure 800 for the case of conversion of a MMkE into a research platform (e.g., opening up a WiFi Access Point to modify MAC (Layer 2) software, etc.). Procedure 800 begins at operation 802 where the Equipment Owner 815 sends a request to allow a conversion to a Research Device to the OEM 820. At operation 804, the OEM 820 either accepts (approves) or rejects the request. If approved, the OEM 820 declines any further responsibility and withdraws its DoC and CE marking. If approved, the OEM 820 provides an authorization code to the Equipment Owner 815 in the accept message. At operation 806, the Equipment Owner 815 provides the authorization code to the RE 801 thereby opening the RE 801 for developed/experimental SW. After that, at operation 808 the RE 801 is now a Research Device and can be modified using experimental SW.

Although research test setup equipment are out of scope for the RED, the embodiments herein make it possible to create final products taking such PCE as a basis or starting point. The way for transitioning between PCE and MMkE could become mandatory for layer 1 and/or layer 2 applications including Software Defined Radios (SDRs). An SDR is a system where components typically implemented and configured in hardware (e.g., mixers, filters, amplifiers, modulators/demodulators, detectors, etc.) are instead implemented and configured by means of software on a personal computer or embedded system.

In any of the aforementioned embodiments, the authorization entity may be part of an SoC, SiP, MCP, or other like implementation, the authorization entity may be provided as a separate chipset or separate entity that interacts with the networking components. In some of the aforementioned embodiments, an authorization hierarchy may be used wherein certain users/entities/devices have a higher hierarchy level, rank, priority, score, or the like than other users/entities/devices. Users/entities/devices having a certain hierarchy level/rank/priority/score are treated preferably (e.g., faster and/or first) and/or have access to more information/data/resources than other users/entities/devices.

3. PRIVACY PROTECTION OF USERS THROUGH STATISTICAL MATCHING OF ACCESS REQUESTS

As mentioned previously, an Expert Group has been set up by the European Commission for [RED] Article 3(3)(i) in order to prepare a new "Delegated Act" and "Implementing Act" regulating equipment using a combination of HW & SW. In the near future, this Expert Group will extend its scope from [RED] Article 3(3)(i) to the entirety of [RED] Article (3)(3). Embodiments herein are related to [RED] Article 3(3)(e), which requires RE to incorporate safeguards to ensure that personal data and privacy of the user and the subscriber are protected. The embodiments herein sufficiently protect personal data and privacy of the user and the subscriber, and in particular, provide protection mechanisms in UEs and the Edge Network.

Currently, data and information related to "personal data and privacy of the user and of the subscriber" (hereinafter "personal data") are typically not accessible, or are only accessible to specifically authorized users. The problem is that this is not sufficient for use cases such as automotive communications where some user privacy related data, such as location data, must be shared with other equipment in the surrounding area.

In embodiments, a statistical model is established that describes how often particular data and information related to personal data are accessed, as well as the reason or motivation to request and use that data (e.g., safety, or less critical services such as infotainment, etc.). Interdependencies are also established, for example, when IE "A" is accessed, what is the probability that IE "B" will be accessed shortly afterwards. This is to prevent concurrent requests coming from heterogeneous applications as being treated equally. Safety-related requests sent by authorized entities may be treated with a different policy from other less critical requests from other entities (e.g., a service asking info for service improvement data). Privacy in the UE regulation is also associated with a different motivation to use that data, in addition to access/request frequency.

In embodiments, any access to data and information related to personal data is cross checked with the statistical model and with a category indicator, describing the reason for accessing this information. The category indicator may be associated with the entity requesting the information, together with the motivation to use the data, and possibly a certificate in order to allow the UE to verify the authenticity of the sender.

Instead of answering each request on a one-to-one basis (e.g., sending a response per each request), the UE receives all requests related to data and information related to personal data, and double checks the overall request with the statistical model and with the associated category indicator. Access to the requested data will be granted only if the request is compatible with a typical or authorized access to the information. Otherwise, the access will be rejected.

These embodiments allow a reasonable level of access to data and information related to personal data without requiring a complex authentication and authorization scheme, which tends to increase computational and signaling overhead. For example, a reasonable level of access to vehicular users in the proximity of the concerned source is allowed while preventing malicious users from extracting data and information related to personal data.

As mentioned previously, a statistical analysis is established for each IE related to personal data. In some embodiments, a Probability Density Function (PDF) is derived based on the behavior of the in-field equipment. A PDF is a function whose value at any given sample (or point) in a sample space (e.g., the set of possible values taken by a random variable) can be interpreted as providing a relative likelihood that the value of the random variable would equal that sample. The PDF may specify a probability of the random variable falling within a particular range of values as opposed to taking on any one value. In embodiments, the PDFs can be derived by observing the behavior of a relatively large number (or a representative sample) of target devices, such as UEs, in-vehicle communication equipment, Edge servers/hosts, etc.

As examples, such PDFs can be derived for the following contexts:

PDF p(time since last access to any information related to personal data requested by any entity)
PDF p(number of accesses to My information related to personal data within a given time interval requested by any entity)
PDF p(time since last access to specific information related to personal data requested by a certain authorized entity (e.g., with a specific category indicator))
PDF p(number of accesses to specific information related to personal data within a given time interval requested by a certain authorized entity (e.g., with a specific category indicator))
PDF p(time since last access to M information related to personal data requested by a certain authorized entity (e.g., with a specific category indicator))
PDF p(number of accesses to any information related to personal data within a given time interval, requested by a certain authorized entity, e.g., with a specific category indicator)

Furthermore, the access PDFs may be derived depending on requested access to other information. For example, such a PDF can be derived for PDF p(time since last access to information "A" related to personal data|under the condition that information "B" had been accessed before (e.g., in a given time interval)), where "A" and "B" are data and/or IEs related to personal data.

Figure 9:
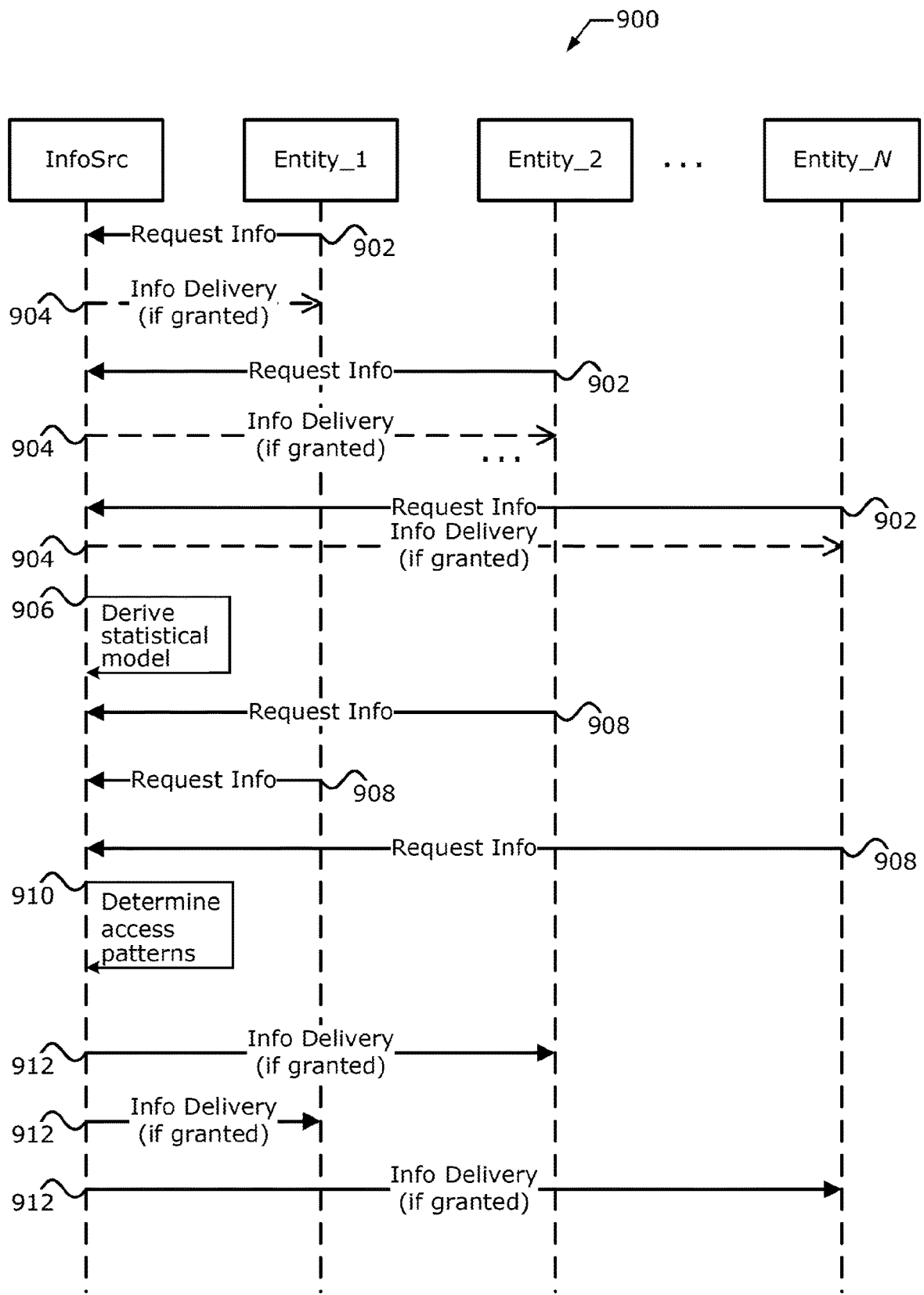
FIG. 9 illustrates an example data access procedure according to various embodiments.

FIG. 9 shows an example data access procedure 900 according to various embodiments. Procedure 900 begins at operation 902 where one or more information requesting entities (e.g., Entity_1, Entity_2, . . . , Entity_N where N is a number) individually information from an information source (InfoSrc), and at operation 904, the InfoSrc delivers respective requested information to information requesting entities, if granted. At operation 906, the InfoSrc derives a statistical model (or machine learning model) on typical access to privacy related data. Various parameters, conditions, criteria (e.g., "features") of the data accesses at operations 902 may be considered training data for deriving the statistical (ML) model at operation 906. This statistical (ML) model may be based on various factors such as time of the access, the number of access attempts, and/or other like parameters/criteria.

At operation 908, Entity_1 to Entity_N individually request information. At operation 910, the InfoSrc checks whether access patterns to private data correspond with excepted (accepted) access distribution (e.g., based on the ML model derived at operation 906). At operation 912, the InfoSrc delivers respective requested information to individual ones of the information requesting entities Entity_1 to Entity_N if the data access behavior conforms with the ML model.

The statistical model (ML model) and data access behavior may differ over different geographic areas. Consequently, concerned equipment may trigger an update of the statistical model, for example, depending on its current location, its movement speed, the movement of other equipment in a predefined area (e.g., a neighborhood) or in close proximity, etc. The concerned equipment may receive updated statistical behavior models from external entities such as network elements, edge network entities, RSUs, and others.

For vehicular use cases (e.g., V2X) including new equipment or equipment that is new to an operator's environment (roaming case), a set of pre-defined statistical functions are stored in the on-board communication unit. The further adjustment of the statistical functions is conducted only locally in the device using data derived on the basis of monitoring the behavior of other in-field equipment, successively overwriting the pre-defined statistical functions.

Additionally or alternatively, the operator can send messages to the on board unit to adjust the predefined statistical functions, to prepare for regional specific use case driven access behaviors. The user shall receive a message of the roaming situation and should get the choice for fast adaptation by a road operator, or to deny and continue with the conventional process in collecting own statistical data. In any case, the message from road operator should be accompanied by some certificate, in order to enable the UE to authenticate the sender, and associate it to the authorization to perform these actions.

The further adjustment of the statistical functions is conducted only locally in the device, by using data derived on the basis of monitoring the behavior of other in-field equipment successively overwriting the pre-defined statistical functions.

In any of the aforementioned embodiments, the statistical model (or individual PDFs making up the statistical model) may be based on a machine learning (ML) model generated or determined using a suitable ML algorithm and/or technique. Generally, an ML algorithm is a computer program that learns from experience with respect to some task(s) and some performance measure(s), and an ML model is any object or data structure created after an ML algorithm is trained with one or more training datasets. After training, the ML model may be used to make predictions on new datasets. Although the term "ML algorithm" refers to different concepts than the term "ML model," these terms as discussed herein may be used interchangeably for the purposes of the present disclosure. Examples of ML algorithms/techniques that may be used include, but are not limited to, neural networks (NNs) or variants thereof (e.g., Convolutional NNs (CNNs), Deep NNs (DNNs), Recurrent NNs (RNNs), logic learning machines, etc.), dimensionality reduction techniques (e.g., principal component analysis (PCA), matrix factorization, factor analysis, etc.), anomaly detection techniques (e.g., Bayesian networks, Hidden Markov Models (HMMs), k-nearest neighbor, Fuzzy logic-based outlier detection, etc.), association rule learning (e.g., Apriori algorithm, Eclat algorithm, etc.), and/or other ML techniques and/or combinations thereof. Such embodiments are discussed in more detail infra with respect to FIG. 40.

The aforementioned embodiments allow the request/provision of a relatively small subset of personal data. One may for example request the location of a user, but then access other elements such as speed, Vehicle Identification Number (VIN), license plate number, etc., may be prohibited. This enables new protection technologies such as Vehicular Communication Technology while ensuring that only a minimum level of information is accessed to preserve the user's privacy.

In embodiments, instead of answering each request 1-by-1, the UE first receives all requests related to personal data, and double checks the overall request with the statistical model and with the associated category indicator. The access will be granted only if the request is compatible with a typical or authorized access to that information. Otherwise, the access request will be rejected.

The category indicator can be associated with the entity requesting the information, together with some indication of the motivation or intended use of the personal data. In some embodiments, the category indicators associated with a digital certificate in order to allow the UE to verify the authenticity of the sender.

In particular, the interdependencies of different data requests may include or indicate a relationship between a request for a particular type of data and/or intended use of that data and another type of data and/or intended use of the other data. For example, for many applications, a request for location information may typically be followed by a request for a license plate number. If the requests do not match with the statistical model, no information will be delivered and all requests will be blocked.

In any of the aforementioned embodiments, the entity for processing the statistical data may be part of an SoC, SiP, MCP, etc., part of a separate entity directly connected to the communication equipment (e.g., User Equipment or Network Equipment), or managed fully remotely, for example, by a monitoring device or system.

In any of the aforementioned embodiments, a hierarchical approach may be used for the statistical data. For example, data of higher hierarchy level, rank, priority, score, etc. (or originating from a source of higher hierarchy level/rank/priority/score) is trusted more than data of a lower hierarchy level/rank/priority/score. More trusted data is finally considered with preference, for example, introducing a weighting factor which is higher compared to less trusted data (of lower hierarchy).

4. PREVENTING HARMING NETWORKS OR INAPPROPRIATE USAGE OF RESOURCES (AB6167)

[RED] Article 3(3) states that "Radio equipment within certain categories or classes shall be so constructed that it complies with the following essential requirements: [ . . . ] (d) radio equipment does not harm the network or its functioning nor misuse network resources, thereby causing an unacceptable degradation of service." Embodiments herein ensure that a device does not harm the network or its functioning nor misuse network resources such as by causing harmful interference and/or electromagnetic disturbances.

Currently, most REs are capable of using network features and/or resources in an inappropriate way. It is difficult for network operators to resolve this issue in the short term. Typically, a removal of corresponding equipment or OTA firmware updates are required to prevent any inappropriate behavior, but these solutions can be expensive and difficult to implement.

In order to fulfill above requirements, embodiments provide anew physical channel referred to as an "Alert Channel", which is established between the network and mobile devices. The Alert Channel carries a minimum set of parameters that are easily decodable by any equipment. Resource management is done by an SW component to be downloaded from the network. This ensures that locally allowed resource management strategies are applied. The alert channel enables the negotiation of any change in configuration and/or inappropriate use of resources, which may take place as follows:

1) Harm is identified by neighboring devices (e.g., through channel measurements, or the like);
2) Alert is sent by neighboring devices via Alert Channel signaling;
3) Harm generating device contacts network with a request for an appropriate network configuration via Alert Channel;
4) Network provides appropriate configuration to the harmful device via the Alert Channel;
5) Harm is resolved by provisioning and/or applying the configuration; and
6) Alert is terminated via Alert Channel signaling.

The Alert Channel will allow MNOs to re-negotiate the behavior and configuration of mobile devices in case that the mobile device harms (or attempts to harm) the network or its functioning, and/or when the mobile device otherwise misuses network resources

4.1. Alert Channel

In order to detect and communicate (e.g., transmit and receive) over the Alert Channel, an RE may include a dedicated unit and position is embedded in the communication protocol as illustrated by FIG. 10.

FIG. 10 shows an example alert channel architecture 1000 according to various embodiments. The alert channel architecture 1000 includes a broadcast channel 1004, control channel 1006, and data channel 1008.

In some embodiments, the various channels of the alert channel architecture 1000 channels may correspond to channels in 3GPP LTE or 5G/NR systems. For example, the broadcast channel 1004 may be one or more transport and/or logical broadcast channels discussed in 3GPP TS 36.321 v16.2.0 (2020 Oct. 2) ("[TS36321]") and/or 3GPP TS 38.321 v16.2.1 (2020 Oct. 5) ("[TS38321]"), and/or one or more physical broadcast channels discussed in 3GPP TS 36.211 v16.3.0 (2020 Oct. 1) ("[TS36211]") and/or 3GPP TS 38.321 v16.3.0 (2020 Oct. 1) ("[TS38211]"); the control channel 1006 may be one or more transport and/or logical control channels discussed in [TS36321] and/or [TS38321], and/or one or more physical control channels and/or physical signals discussed in [TS36211] and/or [TS38211]; and the data channel 1008 may be a transport and/or logical data/traffic channels discussed in [TS36321] and/or [TS38321], and/or one or more physical data/traffic channels discussed in [TS36211] and/or [TS38211].

In some embodiments, the various channels of the alert channel architecture 1000 channels may correspond to channels in WLAN (WiFi) systems. For example, the broadcast channel 1004 may be or include beacon frames or Target Beacon Transmit Times (TBTTs) in the access medium, the control channel 1006 may be or include one or more Control Frames, management frames, or the like; and the data channel 1008 may be or include one or more data packets or transmission intervals as defined by a suitable IEEE 801.11 standard/specification In addition, the data frame 1000 also includes two alert channel sections 1002 on either end of the data channel section 1008. Or, a first alert channel section 1002 between the control channel section 1006 and data channel section 1008, and a second alert channel section 1002 taking place after the data channel section 1008.

An RE can have one or more Alert Channels defined, depending on its type (e.g., smartphone, tablet, in-vehicle system, IoT device or sensor, etc.), application (e.g., commercial, government, medical, etc.), and/or other criteria such as those discussed herein. Furthermore, the position and content of the Alert Channel may be provided by RE specification.

In some embodiments, the Alert channel is a transport channel or a logical channel that carries Alert messages or Alert information (e.g., the alert signals discussed below). In an example, when implemented as a logical channel, the Alert channel may be mapped to one or more transport channels. In another example, when implemented as a transport channel, the Alert channel may be mapped to a physical channel and/or physical radio resources.

Figure 11:
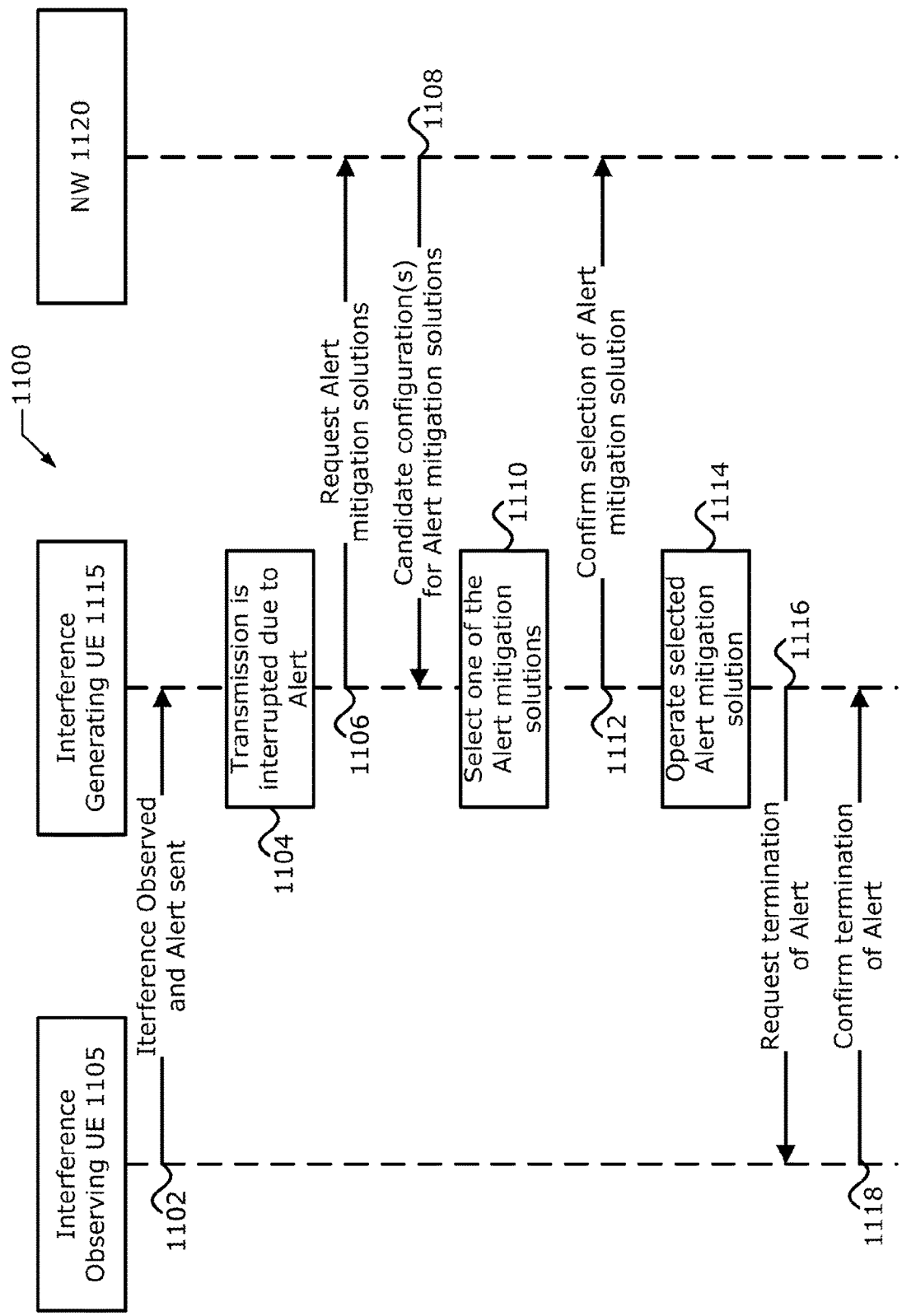
FIG. 11 illustrates an example Alert Channel communication procedure according to various embodiments.

FIG. 11 shows an example procedure 1100 communication between the network and UEs via the Alert Channel according to various embodiments. Procedure 1100 begins at operation 1102 where an interference observing RE/UE 1105 sends an Alert message to an interference generating UE 1115 over the Alert channel. In some embodiments, the Alert message may be sent during an Alert occasion (or at an Alert position). An Alert occasion may be a set of physical channel monitoring occasions and can include one or more time slots during which Alert messages can be sent. In some embodiments, the interference observing RE 1105 may monitor for interference or other like behaviors during Alert occasions, and may transmit the Alert message during that Alert occasion or during a next Alert occasion. In some embodiments, the interference generating RE 1115 may monitor the Alert channel during Alert occasions to obtain Alert messages.

At operation 1104, the interference generating RE 1115 detects transmission interruption due to the Alert. At operation 1106, the interference generating RE 1115 sends a request for Alert mitigation solutions to the network (NW) 1120. At operation 1108, the NW 1120 provides one or more candidate configurations for Alert mitigation solutions. At operation 1110, the interference generating RE 1115 selects one of the one or more candidate configurations for Alert mitigation solutions, and at operation 1112, the interference generating RE 1115 sends a confirmation (e.g., ACK) message indicating the selected Alert mitigation solution configuration. At operation 1114, the interference generating RE 1115 implements the selected Alert mitigation solution configuration and operates accordingly. At operation 1116, the interference generating RE 1115 sends a request to terminate the Alert to interference observing RE 1105. The request to terminate the Alert may include some indication of the Alert mitigation configuration or some other indication that the interference generating behavior has or will cease. At operation 1118, the interference observing RE 1105 determines whether to terminate the Alert, and if terminated, the interference observing RE 1105 sends a confirmation of the Alert termination to the interference generating RE 1115.

In some embodiments, if there is no response from the interference generating UE 1115, the NW 1120 deems the interference generating UE 1115 to be a harmful device and takes appropriate steps to stop service to the harmful device. In one example, a warning is sent with a given time to response and if no response is received, the NW 1120 has the option to completely terminate the service to the device or limit the service (e.g., emergency calls only). These steps may be network specific and may vary depending on network operator policy, RAT type, and/or other like parameters/criteria.

4.2. Alert Messages/Alert Signaling

An Alert message is a minimum set of parameters carried by the Alert channel. For this, an "Alert Signal" is introduced, which applies a physical layer design such that it can be understood by all relevant UEs.

Figure 12:
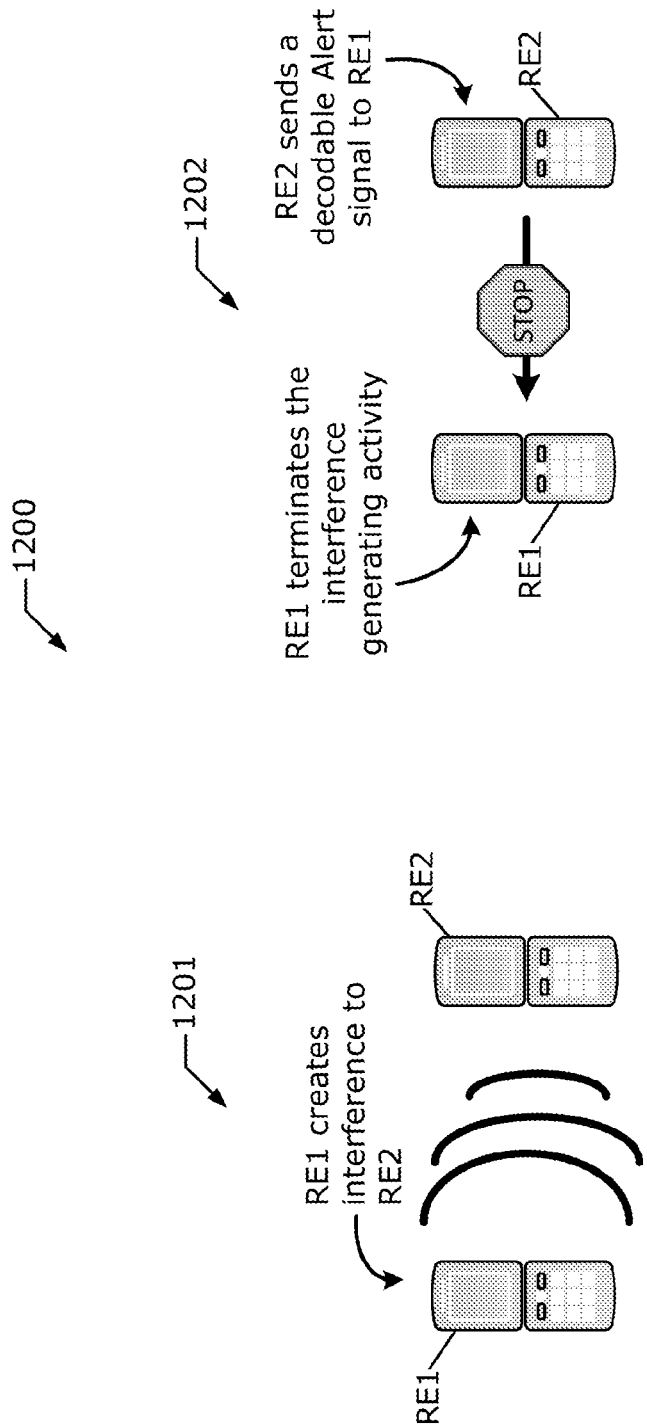
FIG. 12 illustrates an Alert message signaling example according to various embodiments.

FIG. 12 shows an Alert message signaling example 1200 according to various embodiments. In the example 1200, RE2 is an Alert signal receiver (Rx), which corresponds to the interference observing UE 1105 of FIG. 11; and RE1 is an Alert signal transmitter (Tx), which corresponds to the interference generating UE 1115 of FIG. 11. Section 1201 shows RE1 creating interference to RE2. Section 1202 shows RE2 sending a decodable Alert signal to RE1, and then the RE1 terminating the interference generating activity.

The generally available and decodable Alert signal may be designed such that the Alert signal Rx UE, applying the same or a different radio standard than the Alert signal Tx UE, can decode the Alert Signal. In one example, a narrowband PHY/MAC layer design is applied, which may be based on a Bluetooth PHY or similar which is typically understood by all devices.

The Alert signal is designed to be easily detectable by Alert signal Rx UEs. In one example, the Alert signal is designed to be detected without decoding a symbol that carries the Alert signal. In one embodiment, a simple header sequence may be used. In one example, a high power Constant Amplitude Zero Auto-Correlation (CAZAC) sequence with relatively good autocorrelation properties may be used. In this example, the CAZAC sequence may be a Zadoff-Chu (ZC) sequence. This allows multiple receivers to easily understand the sequence. The of the Alert signal position (or Alert occasion) is predefined and known to all equipment. OEMs or equipment vendors may configure the REs with the Alert signal position in the equipment specification.

In some embodiments, the Alert signal is sent on the same band where the interference occurs (or is detected). In some embodiments, the Alert signal is sent during time slots when the band is not occupied, which may be detected using a suitable channel sensing operation. If the band is constantly occupied then a higher output power level is applied to transmit the Alert signal.

The interference observing UE 1105 may repeat transmission of the Alert signal when the interfering UE does not react to the Alert signal. In these embodiments, the interference observing UE 1105 may implement a suitable timer for this purpose. For example, after the interference observing UE 1105 transmits the Alert signal, the interference observing UE 1105 may start an Alert retransmission timer, which may be set to a duration until a response to the Alert signal can be expected. The duration of the Alert retransmission timer may be predefined or configured by the network. In some embodiments, a suitable counter may be used to track the number of retransmissions. Moreover, the output power level is increased over time until the interfering device has received the Alert Signal and terminated its transmission causing interference. The transmission power may be increased after a certain number of retransmissions in some embodiments.

In various embodiments, the Alert signal may contain some data elements that are used to identify the source the interfering transmission. As examples, the Alert signal may include some or all of the following data elements:

ID of the interferer (if known);
AoA of the interfering signal (if known);
Power level of the interfering signal at receiver (if known);
Duration of the interfering signal at receiver (if known); and/or
Modulation (or MCS) type of the interfering signal at receiver (if known).

This information should help an interfering device to determine that it is indeed the source of the interference. If any of the above-mentioned data elements are not known by the interference observing device, then the corresponding data element may be marked as "unknown" or left empty.

4.3. Resource Management Through Software Component(s)

Figure 13:
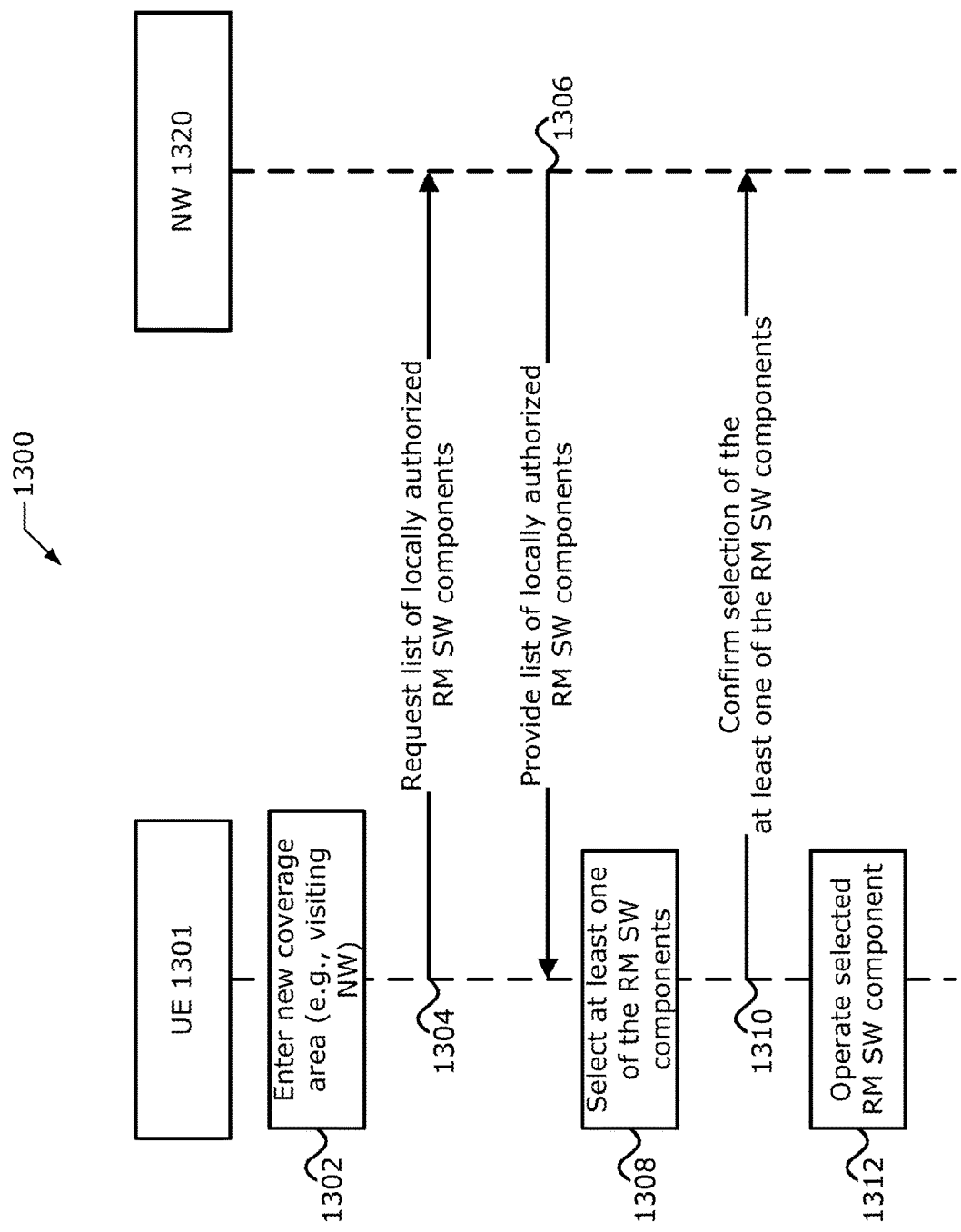
FIG. 13 shows an example resource management procedure according to various embodiments.

Depending on locally applicable network configurations, some resource management strategies may be unsuitable and create high levels of interference. In various embodiments, resource management in a UE is done through a replaceable SW components that are provided by the NW for locally applicable requirements and optimized for the local NW configuration. In these embodiments, a UE requests a list of such suitable SW components for resource management, the network provides a list of options (typically optimized for different applications such as FTP, VoIP, etc.) and the UE selects and operates one of the options. FIG. 13 shows an example procedure 1300 for such embodiments.

In procedure 1300, after a UE 1301 enters a new coverage area or region (1302), such as a visiting network (e.g., VPLMN), the UE 1301 requests a list of locally authorized SW components for resource management (RM) by the UE (1304). In response, the NW 1320 provides a list of locally authorized SW components for RM by the UE 1301 (1306) (e.g., a SW component optimized for FTP, another SW component optimized for VoIP, etc.). Next, the UE 1301 selects at least one of the RM SW components (1308), sends a confirmation message to the NW 1320 indicating the selection of the at least one locally authorized RM SW component (1310), and then operates the selected RM SW component(s) (1312).

Figure 14:
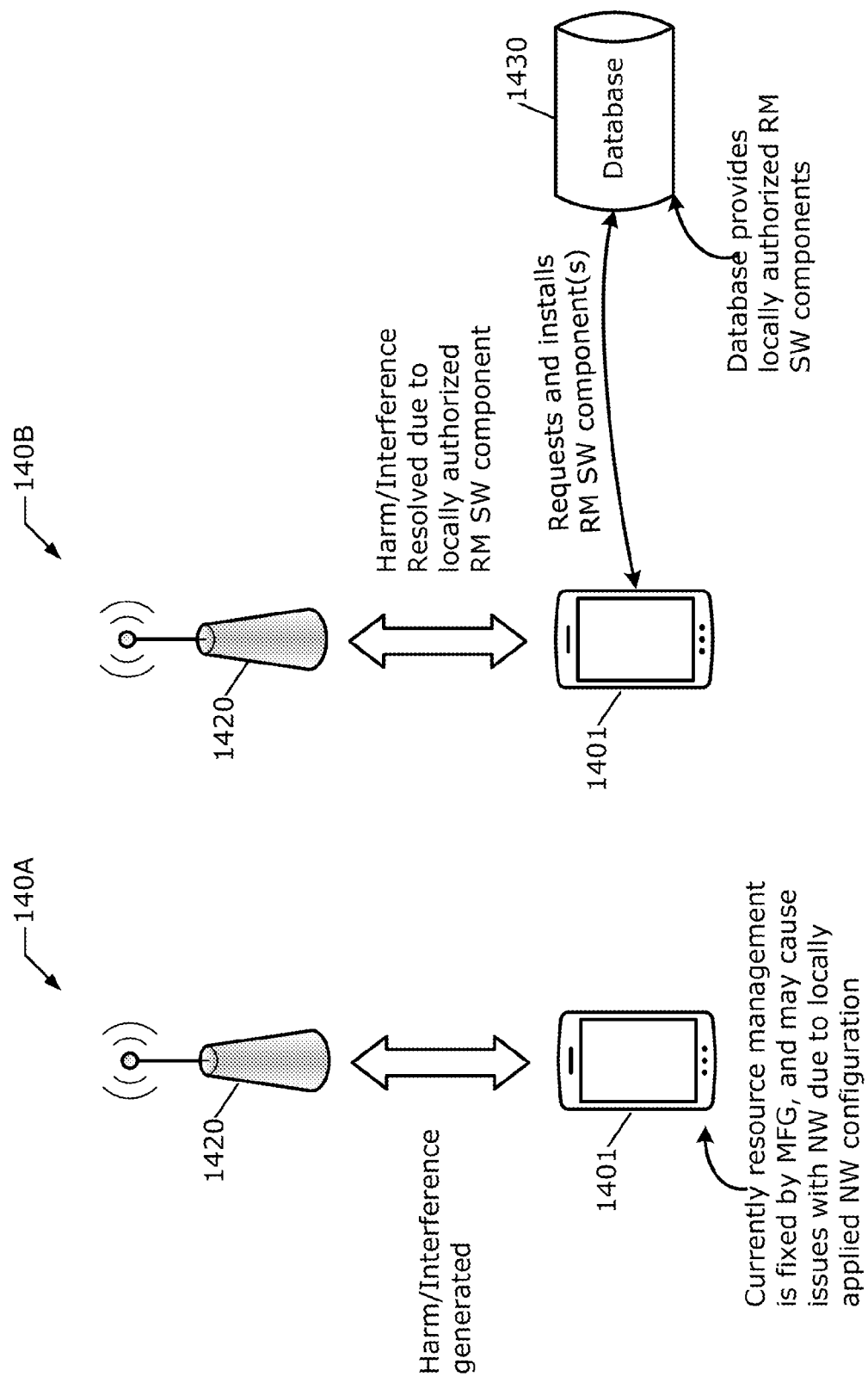
FIG. 14 illustrates another Alert message signaling example according to various embodiments.

The difference between the existing case and new SW driven case is shown by FIG. 14. Section 140A illustrates the existing approach, where the UE 1401 experiences harm/interference generated by the network node 1420. In this case, the resource management is fixed by the MFG, and may cause issues with NW 1420 due to locally applied NW configuration(s). Section 140B illustrates an approach according to the example embodiments herein, where experienced harm/interference is resolved due to locally authorized RM SW component. In this case, the UE 1401 requests RM SW component(s) from RM SW component database 1430. Database 1430 provides locally authorized RM SW components to the UE 1401, and the UE 1401 installs the requested components. In some embodiments, the database 1430 is co-located with the network node 1420 (e.g., as part of an edge computing network, CDN, etc.), a cloud based storage system, and/or the like. In some embodiments, the database 1430 may be a local DB implemented by the UE 1401, where the NW 1420 unlocks or otherwise grants access to the requested RM SW components. Other implementations are possible in other embodiments.

Any of the aforementioned embodiments may use a hierarchical approach where certain incoming beams or signals are associated with a higher hierarchy level, rank, priority, score, etc., than other beams or signals. The beams/signals having a higher hierarchy level may be prioritized over beams/signals having a lower hierarchy level.

Any of the aforementioned embodiments are applicable to highly directive systems that are able to steer their antenna (s), such as smart antenna systems, systems with (highly) directional antennas, Multiple-Input Multiple Output (MIMO) systems, and/or the like. Such systems may include, for example, Macro/Micro/Femto/Pico cell Base Stations, Edge Nodes, repeaters, multi-antenna (or multi-panel) REs, and/or the like.

5. INTERWORKING WITH OTHER RADIO EQUIPMENT (AB6169)

[RED] Article 3(3) states that "Radio equipment within certain categories or classes shall be so constructed that it complies with the following essential requirements: [ . . . ] (b) radio equipment interworks via networks with other radio equipment." Embodiments herein enable interworking between REs.

Currently, interworking is only possible if specific interworking features have been implemented. This may be the case for some types of equipment (e.g., 3GPP LTE and WiFi), but definitely not for all. Thus, such features are only available for a small subsets of available systems (REs) and not for others. All remaining systems (REs) are not interoperable and only function as stand-alone devices.

In various embodiments, if interworking between two concerned communication standards, protocols, and/or RATs (hereinafter simply "RAT"), has been specifically designed and implemented, OEMs or service providers use the tailored solution. If no specific interworking feature is present, OEMs/service providers use a new "minimum service" intermediate protocol. In these embodiments, all wireless services without interoperability features are translated or transformed to a minimum service protocol (MSP), which is understood by every RE. Then, the MSP representation is used to convert the service to any other radio system/RAT different from the original/source radio system/RAT.

In order to support any applicable RAT, in some embodiments, REs provide SW components characterizing their respective Tx/Rx chains (or RATs) to an intermediary or translator entity, and the intermediary uses these SW components in order to translate (transcode) signals from one RAT to another RAT. In some embodiments, the intermediary may be a UE, aNAN, a network element, or some other entity. Since the MSP is understood by all RATs, the MSP provides a minimum level of interoperability between REs.

Interworking refers a state or an instance of two or more elements working with, or being made to work with, each other. As an example, interworking between two devices allows a first device that implements a first RAT to communicate with a second device that implements a second RAT. When both devices implement the same RAT, or common parts of the same RAT, then their interaction is denoted as "intra-working."

The RE interworking embodiments may include network access node (NAN) (e.g., NANs 4331-4333 of FIG. 43) mediated intra-UE interworking, inter-NAN mediated interworking, direct inter-UE interworking, broker mediated inter-UE interworking, and broker mediated inter-NAN interworking. NAN mediated intra-UE interworking involves a NAN enabling the transcoding between RATs and allowing the two UEs to communicate, in addition to providing all the network support within each device standard. Inter-NAN mediated interworking involves two NANs, although not implementing the same radio standard, have a interworking interface (wired and/or wireless (radio)). Direct inter-UE interworking involves each UE having an interworking radio interface protocol. Broker mediated inter-UE involves a broker (or an IWF) providing interworking support between two UEs, for example, by providing translation and/or transcoding between RATs. Broker mediated inter-NAN interworking involves a broker providing interworking support between NANs from different RATs. A broker is a standalone entity other than a NAN or a functional entity of another network element other than a NAN, which implements both devices' RATs and/or performs RAT translation, if necessary, and forwards relevant communications/data towards any relevant network entity/entities.

In various embodiments, interworking is achieved through the transcoding of the distinct communication RATs of concerned equipment, for example, signaling of a first RAT is transcoded such that the signaling can be understood by an equipment of the second RAT. In embodiments, a specific channel is defined for the coordination on transcoding between UEs and the NW. This channel can be either a proprietary channel (e.g., applicable to systems which are supported by a (proprietary) transcoding system) or a standardized channel. An example of such a channel is shown by FIG. E-1.

In FIG. 15, the control channel carries various control information (e.g., ACK/NACK, etc.), and the data channel carries SW component(s) containing Tx/Rx chains of respective systems as well as other data. The synchronization (sync) sequence contains a specific sequence indicating the nature/purpose of the frame, which in this example is a frame for the coordination of transcoding services. In one example, the sync sequence is a specific CAZAC sequence with good autocorrelation properties.

Furthermore, interworking can be achieved on various layers, such as a Radio Layer (e.g., two devices applying distinct/different wireless interfaces/RATs need to communicate with one another) and/or a Networking Layer (e.g., two devices accessing the internet need to communicate with each other but have different upper layers).

Figure 16:
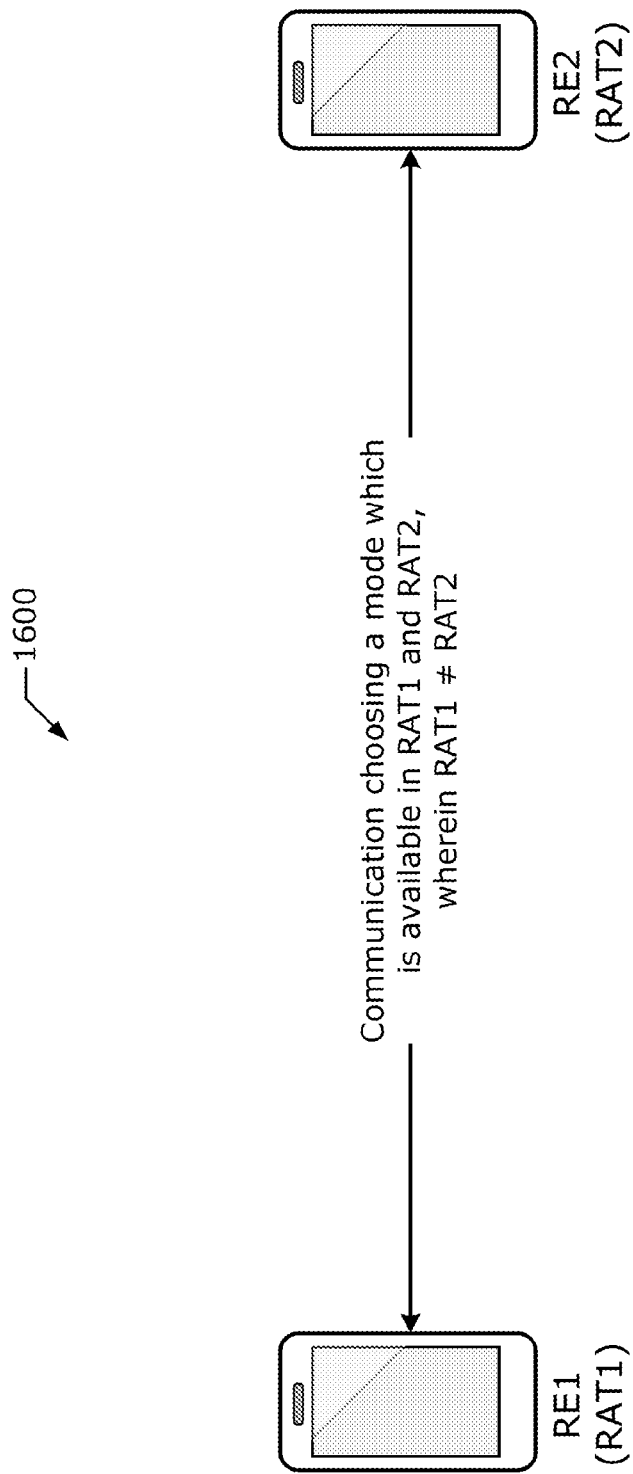
FIGS. 16, 17, 18, and 19 illustrate example communication scenarios between devices operating according to different communication protocols.

FIG. 16 shows a first scenario 1600 where two or more devices (e.g., RE1 and RE2 in FIG. 16) have distinct but yet similar PHY/MAC layers (e.g., both based on OFDM, etc.). A relatively simple configuration may be decodable by receivers of both systems (e.g., binary phase-shift keying (BPSK), Rate 1/2 convolutional coding, direct-sequence spread spectrum (DSSS), quadrature amplitude modulation (QAM), etc.). Then, an interworking mode is applied for interconnection of those systems.

An example procedure for scenario 1600 of FIG. 16 may operate as follows: First, an initiating device (e.g., RE1) listens to the communication by a target device (e.g., RE2). Then, the initiating device (e.g., RE1) identifies or determines whether the applied RAT (e.g., RAT2) is known to the initiating device and whether the initiating device (e.g., RE1) is able to establish a communication in one of the modes that are decodable by the target device (e.g., RAT2). For example, the initiating device (e.g., RE1) may identify and/or determine whether PHY and/or MAC layer aspects of RAT1 are common, compatible, or otherwise capable of being decoded and/or understood by RE2 using some aspects of RAT2. If yes, the communication is established using such a mode which is compatible with RAT1 and RAT2.

Figure 17:
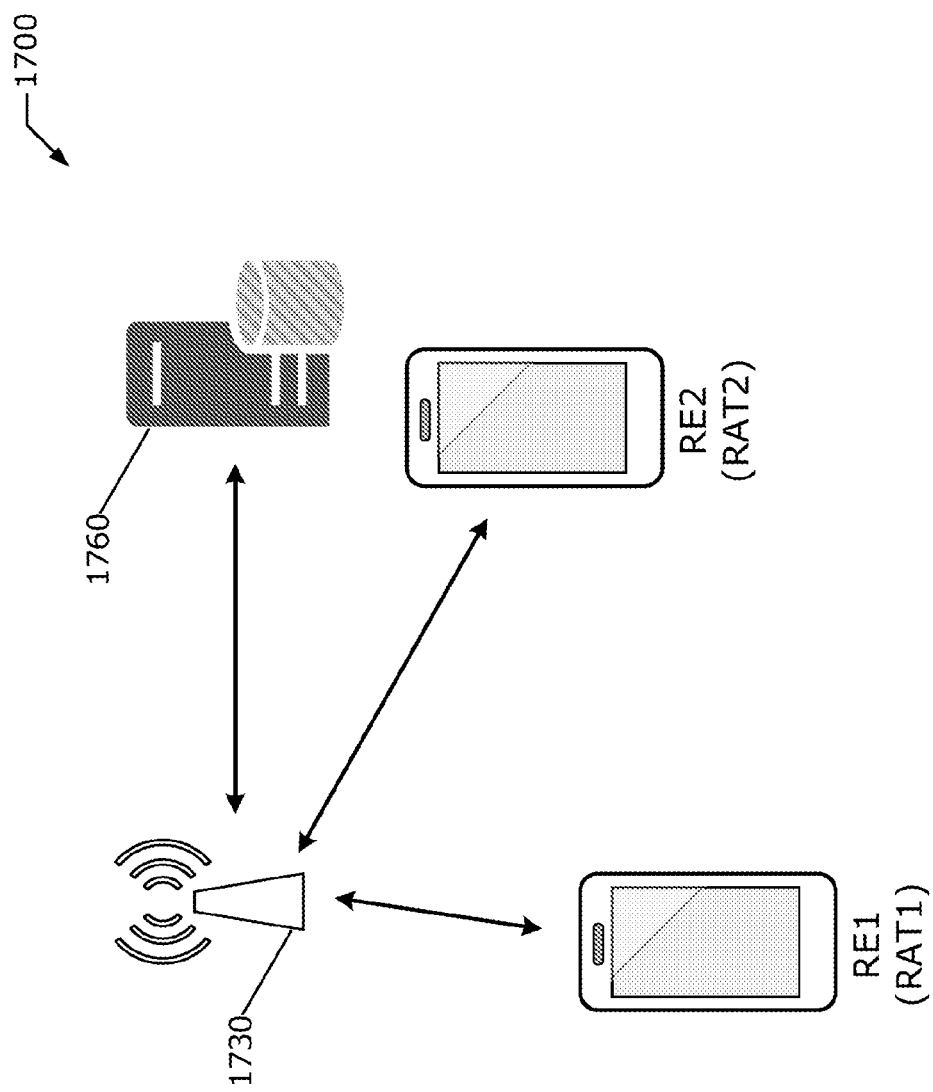

FIG. 17 shows a second scenario 1700 where two or more devices (e.g., RE1 and RE2 in FIG. 17) have distinct communication protocols and no direct communication can be established. However, the devices both connect to one or more network access nodes (NANs) 1730, which is/are able to apply both communication protocols. The NAN(s) 1730 may be the same or similar as NANs 4331-4333 of FIG. 43. The NAN(s) 1730 is/are requested to act as a transcoding/mediating device for establishing the communication. In particular, the NAN(s) 1730 perform transcoding of messages from RAT1 to RAT2, and vice versa. Additionally or alternatively, a connection to a remote transcoding service 1760 may be established. The remote transcoding service 1760 may be provided by one or more application servers (e.g., app servers 43504 of FIG. 43), a cloud computing service (e.g., cloud 4344 of FIG. 43), an edge computing service (e.g., edge compute system 4335 of FIG. 43), and/or the like.

The process of scenario 1700 may operate as follows: First, an initiating device (e.g., RE1) contacts the NAN 1730 to interact with a target device (e.g., RE2). The initiating device may request a list of options from the NAN 1730 on how to interact with the target device. The NAN 1730 may for example suggest to act as a transcoding entity. Alternatively, the NAN 1730 may suggest that another (e.g., remote) device (e.g., transcoding service 1760) may be used for the transcoding service and then the initiating and target devices may even be connected to different NANs 1730. Next, the initiating device requests a transcoding service. Then, the NAN 1730 grants the transcoding service and starts acting as an intermediary entity between the initiating device (e.g., RE1) and the target device (e.g., RE2). Then, the initiating device finally requests the termination of the transcoding service when the interaction with the target device is completed.

Figure 18:
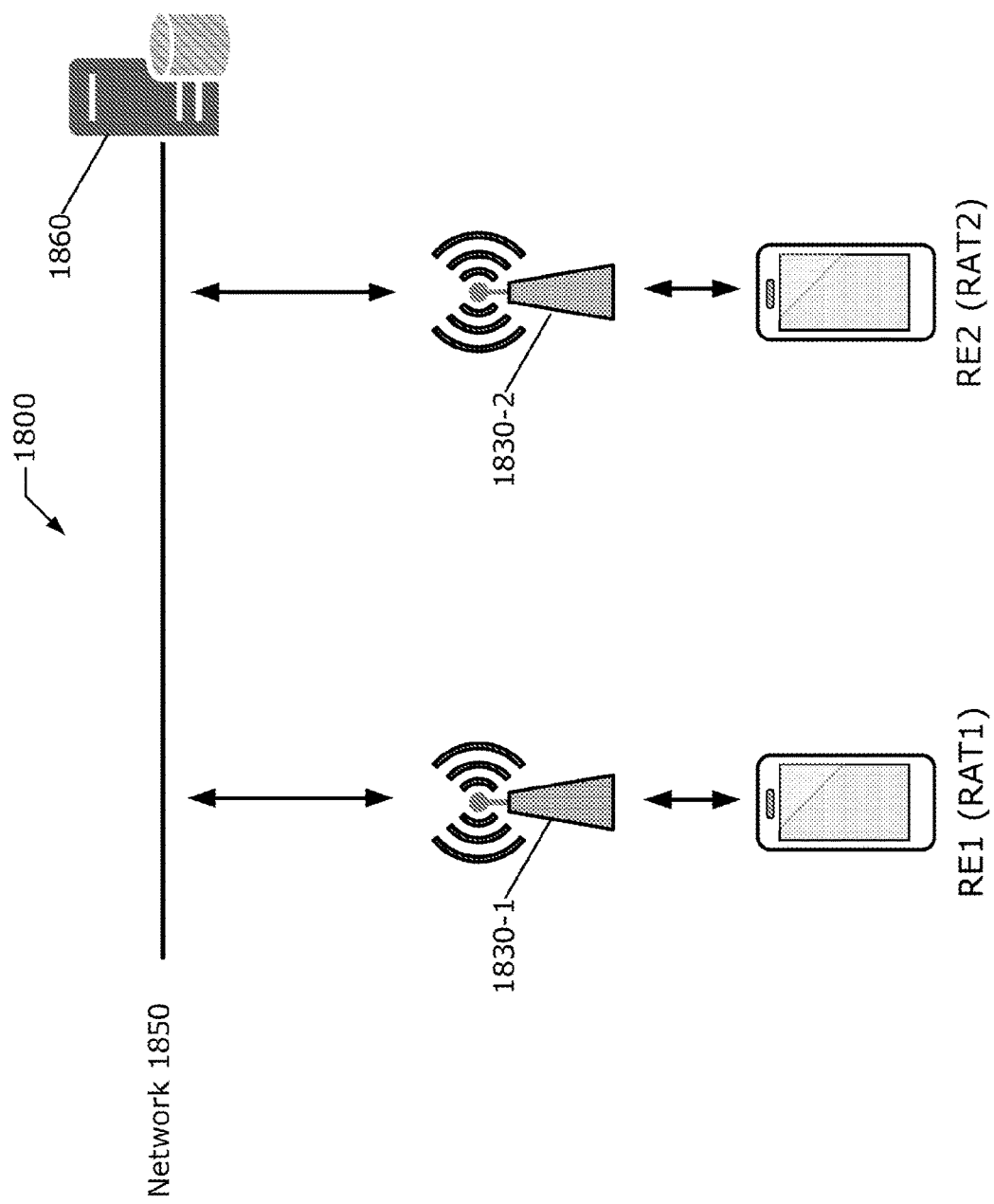

The interworking on the radio layer may be achieved as shown by FIGS. 16 and 17, and interworking on the networking layer is shown by FIG. 18.

FIG. 18 shows an network layer interworking scenario 1800. In scenario 1800, both REs (e.g., RE1 and RE2 in FIG. 18) access a network (e.g., the Internet, an enterprise network, etc.) through a connection to a respective NAN 1830 (e.g., RE1 being connected to NAN 1830-1 and RE being connected to NAN 1830-2 in FIG. 18). RE1 and RE2 are either connected directly to one another through the internet or a connection to a (remote) transcoding service 1860 is established.

Figure 19:
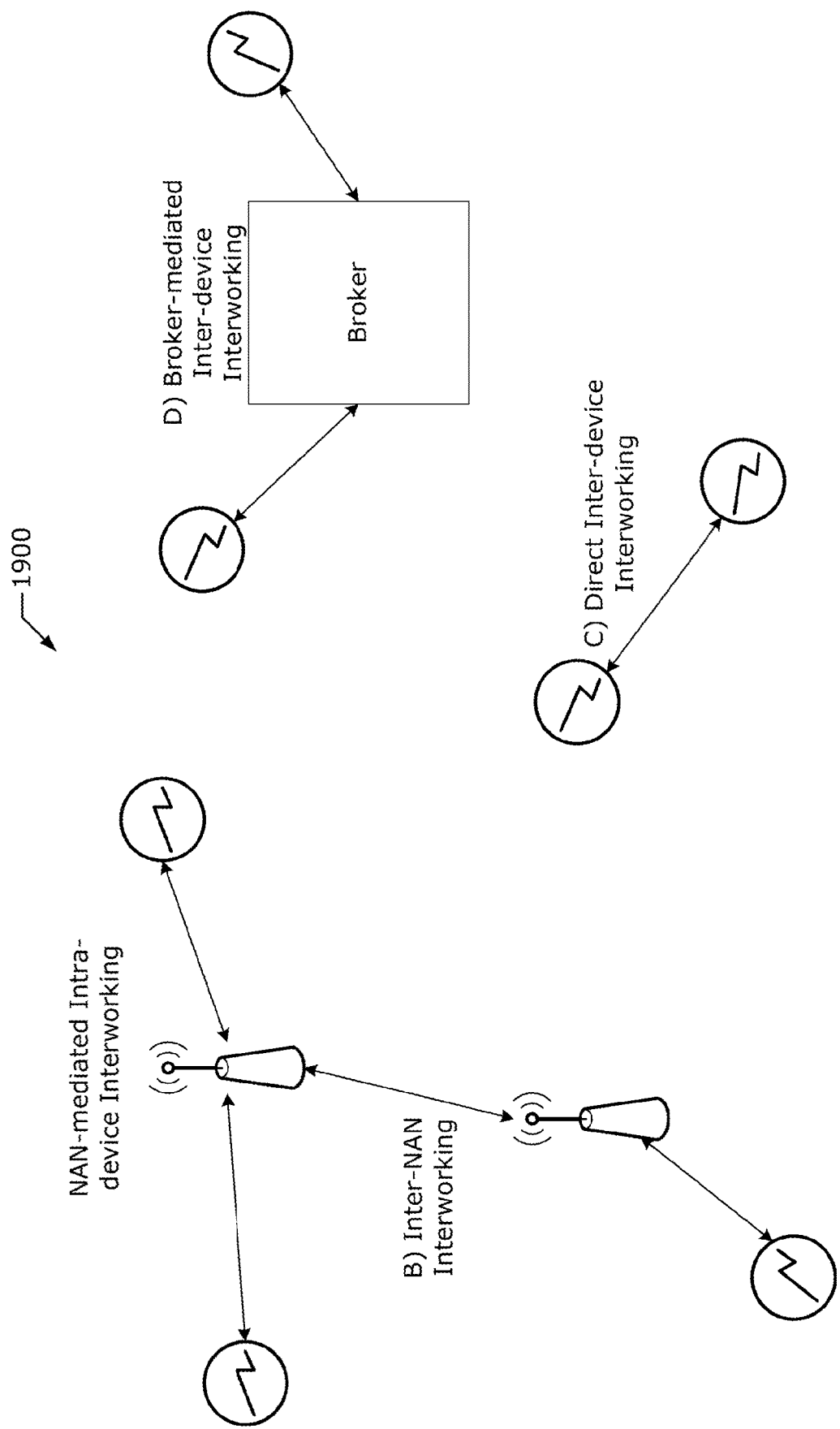

Additionally or alternatively, the interworking can be improved by a broker (or IWF) which can be contacted (wirelessly or through an internet connection) in order to get information about neighboring/other REs (e.g., which devices are available, which communication standards apply, which mechanisms exist for data exchange, etc.); and/or provide information on available services to ensure an interconnection (e.g., transcoding by a suitable NAN identified by the Broker, direct communication using a specific PHY/MAC configuration identified by the Broker, etc.) In case the NAN enables interworking between devices, then the NAN takes the role of the broker. In some implementations, the broker or IWF may be an NF in a network operator's core network (e.g., CN XR220 of FIG. XR2 infra) or backend system (e.g., cloud XE144 or server(s) XE150 of FIG. XE1 infra), or an application function (AF) operated by a cloud computing service (e.g., cloud XE144), or an AF operated by a CDN or edge computing network (e.g., edge network XE135 of FIG. XE1). FIG. 19 illustrates an example 1900 of such broker-based embodiments.

Regardless of the manner in which the interworking is accomplished, each interworking embodiment uses a minimum amount of data/signaling (e.g., a "minimum unit") in the communication protocol in order to keep overhead to a minimum. This minimum unit is reserved for other technology interworking protocol(s). Each interworking embodiment also includes a reserved unit known by all RATs.

The minimum unit and/or reserved unit contains the minimum set of information required for interoperability. The minimum set of information can be layered and prioritized such as, for example:

Level 1: Authentication, authorization, accounting procedures and some specific attributes associated with access, accounting, roaming, security services
Level 2: Service priority
Level 3: Data and voice service exchange
Level 4: Specific application exchange
Level 5: Channel quality, interference levels and other QoS related parameters The levels can be prioritized and also can be manufacturer-specific. Additionally, an example transmission and decoding procedure may be as follows:

1. Interworking feature enabled (this option disables using slot all the time, and reduces overhead where no interworking is required).
2. Assignment of specific transmission time to the unit (this allows some or all RATs to know that the interworking feature is enabled).
3. Transmission of unit starts and interworking technology can start decoding.
4. A first transcoding unit converts a source RAT to the MSP.
5. A second transcoding unit converts the MSP to a selected or otherwise desired target RAT.

5.1. Set of Minimum Service Enabled by Joint Protocol

In various embodiments, some messages and services are defined that enable an exchange of data across multiple systems. Examples of these defined messages and services include broadcast of wireless service information (RAT, authentication, authorization, routing information, etc.); trusted device information; and selection/reselection and handover services (e.g., service optimization and prioritization). Additionally, device capability signaling may be introduced to indicate support for such features.

In the case of universal tailored solution that enables interworking between different communication services, a dedicated part of the communication protocol in each RAT is reserved for direct interworking with other RATs.

5.2. Software Based Transcoding

According to various embodiments, transcoding is executed based on SW versions of the respective Tx/Rx chains of the concerned equipment/systems. The "transcoding" or "translating" refers to tasks and/or coding strategies (e.g., reading, parsing, etc.) for decoding communications received according to a source RAT, and tasks and/or coding strategies (e.g., serializing, transforming, writing, etc.) for (en)coding the communications in a manner specific to a destination/target RAT. Additionally or alternatively, transcoding or translating may involve converting physical layer signaling of a source RAT into physical layer signaling of a destination/target RAT.

Figure 20:
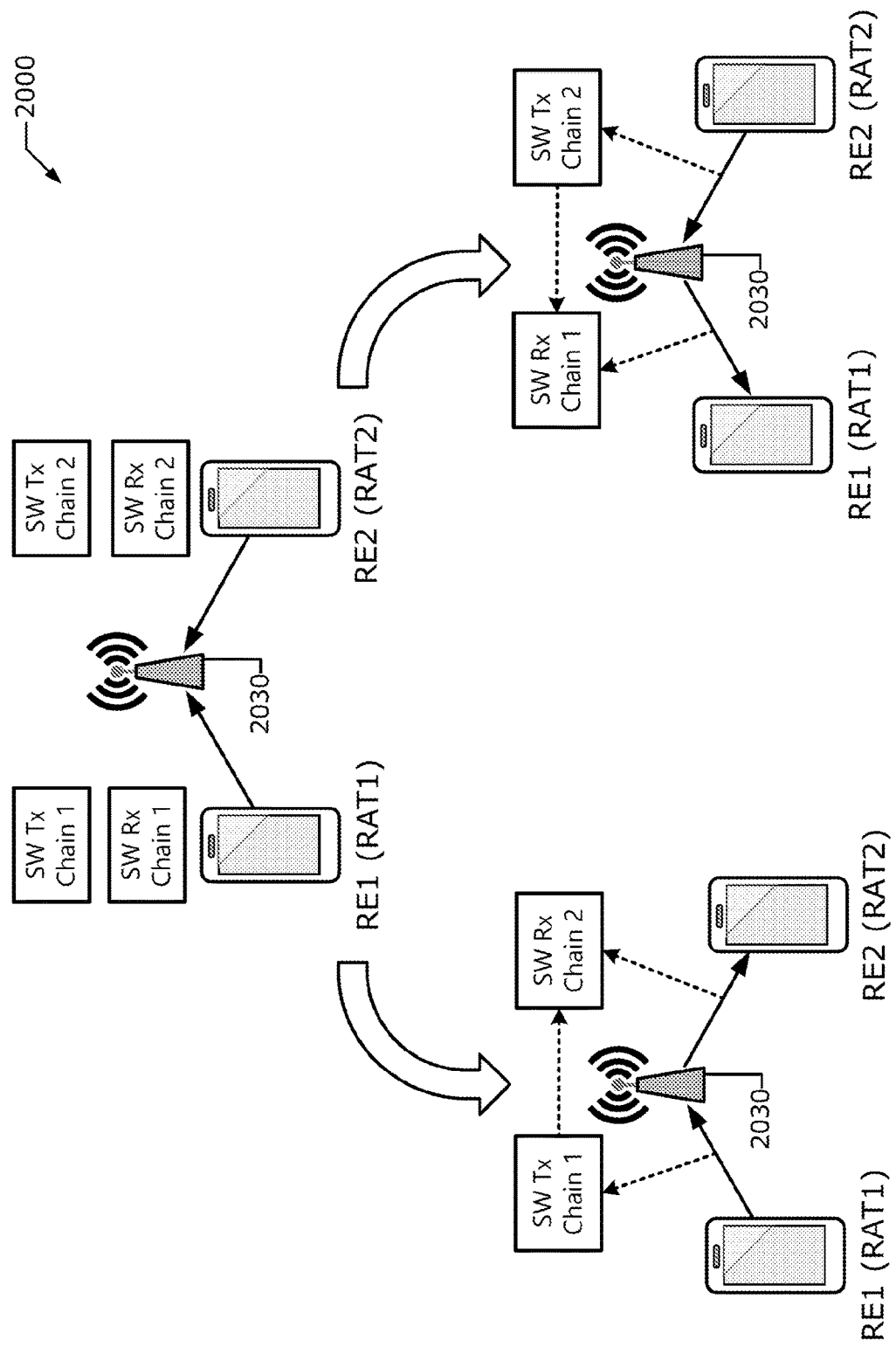
FIGS. 20 and 21 illustrates examples of Software Based Transcoding according to various embodiments.

In various embodiments, equipment of each system is requested by the NW to provide a SW version of its Tx/Rx chains. As illustrated by example 2000 of FIG. 20, the NW (e.g., NAN 2030) will use these SW components in order to execute the transcoding. In FIG. E.II-1, RE1 provides SW versions of its Tx/Rx chains to the NW (e.g., NAN 2030), and RE2 provides SW versions of its Tx/Rx chains to NW. Then, the NW (e.g., NAN 2030) uses the SW versions of the respective Tx/Rx chains to perform the transcoding from RAT1 to RAT2 and/or from RAT2 to RAT1.

Figure 21:
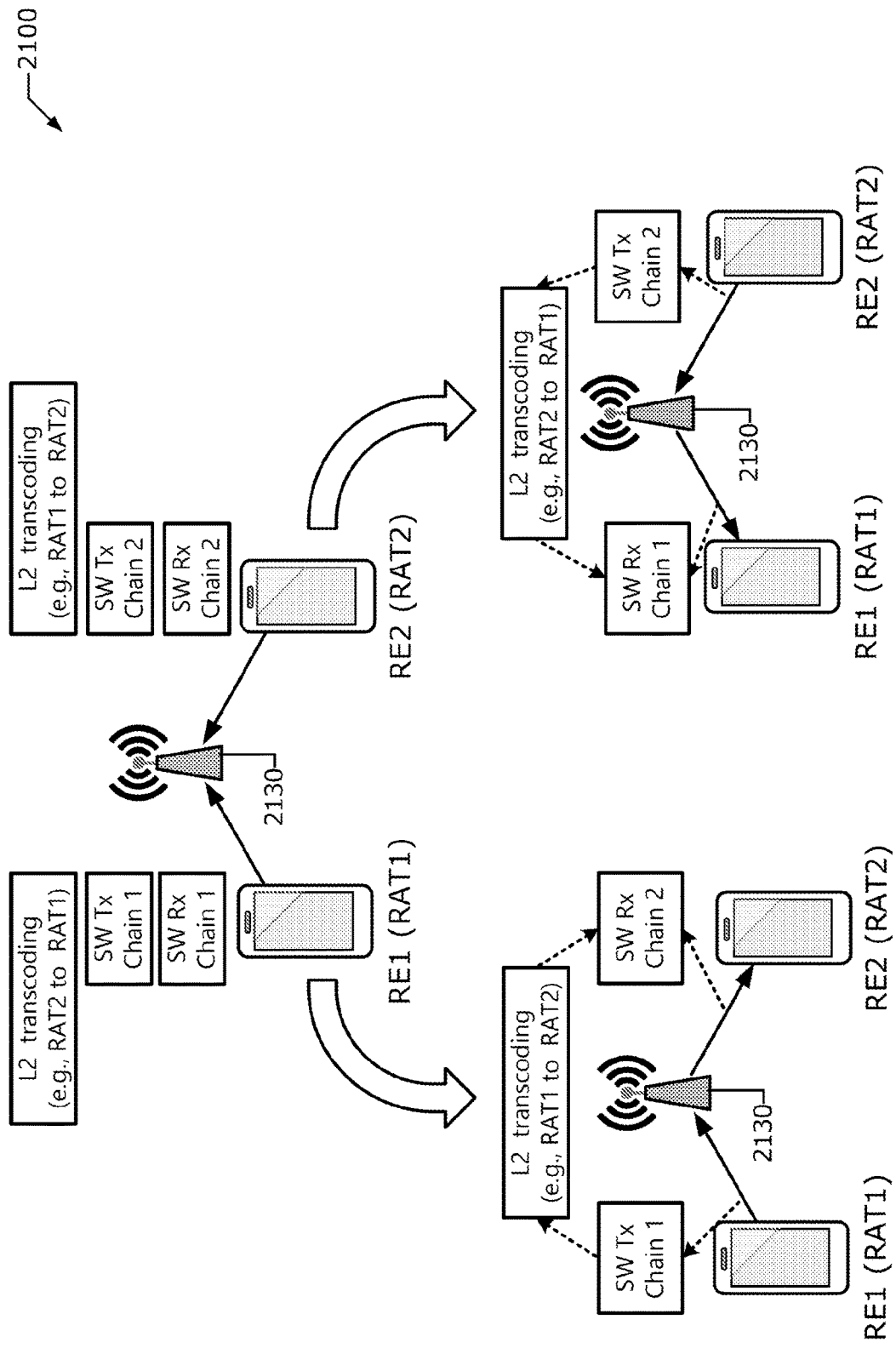

In some embodiments, devices may add another SW component which contains information on how to transcode data packets on Layer 2 (or higher layer). In these embodiments, a corresponding Layer 2 (L2) transcoding block is disposed between the SW components used for transcoding as illustrated by example 2100 of FIG. 21. In FIG. 21, RE1 provides SW versions of its Tx/Rx chains and L2 transcoding block/module/engine to the NW, and RE2 provides SW versions of its Tx/Rx chains and L2 transcoding block/module/engine to NW. Then, the NW uses the SW versions of the respective Tx/Rx chains and/or L2 transcoding blocks/modules/engines to perform the transcoding from RAT1 to RAT2 and/or from RAT2 to RAT1.

Any of the aforementioned embodiments may be applied to systems of different manufacturers relaying on the same RAT (e.g., 3GPP LTE or 5G/NR, etc.). In such embodiments, the a direct communication between the two REs is established and exchange of relevant data takes place, including configuration data, user performance data, system state information, wireless communication information (e.g., SNR, SINR, channel measurement data, and/or other like measurements).

The example embodiments provide distinct systems to communicate with one another, which then allows for a minimum level of coordination through information exchange. Examples include: WiFi<-->3GPP systems (any generation of WiFi including IEEE 802.11a/b/g/n/ac/ax/etc. based and any Release of 3GPP including Release 10, 11, 12, 13, 14, 15, 16, 17, 18, etc. based); WiGig<->WiFi (any generation of WiGig including IEEE 802.11ay/ad/etc. based and any generation of WiFi including IEEE 802.11a/b/g/n/ax/etc.); WiGig<->3GPP (any generation of WiGig including IEEE 802.11ay/ad/etc. based and any Release of 3GPP including Release 10, 11, 12, 13, 14, 15, 16, 17, 18, etc.); and/or any other network(s)/system(s).

Furthermore, a hierarchical approach may be taken where one system is associated with a higher hierarchy level, rank, priority, score, etc., than another system. The system of higher hierarchy level may be the entity coordinating the communication with other system(s) of lower hierarchy.

6. FALLBACK SOLUTIONS TO MANDATORY EMERGENCY SERVICES (AB7832)

[RED] Article 3(3) states that "Radio equipment within certain categories or classes shall be so constructed that it complies with the following essential requirements: [ . . . ] (g) radio equipment supports certain features ensuring access to emergency services."

Currently, a Draft Delegated Act related to Article 3(3)(g) mandates Galileo GNSS and WiFi as mandatory features supporting emergency services. The Draft Delegated Act for [RED] Article 3(3)(g)—Article 1 is as follows:

1. The essential requirements set out in Article 3(3)(g) of Directive 2014/53/EU shall apply to hand-held mobile telephones with features similar to those of a computer in terms of capability to treat and store data.
2. Compliance with paragraph 1 shall be ensured through technical solutions for the reception and processing of Wi-Fi data, data from Global Navigation Satellite Systems compatible and interoperable with at least the Galileo system referred to in Regulation (EU) No 1285/2013, and for the making available of that data for transmission in emergency communications.

However, the behavior for REs in emergency situations where the mandated services (e.g., Galileo GNSS and/or WiFi) are locally/temporarily unavailable is undefined, and therefore, access to emergency services may be inefficient or not possible in such emergency situations.

Embodiments herein are related to providing continued access to Emergency Services in case that the mandated services (e.g., Galileo GNSS and/or WiFi) are locally/temporarily unavailable. Embodiments herein are also related to providing prioritized access of emergency messages (e.g., in 3.7-3.8 GHz). The embodiments include equipment behavior in case that the mandatory services are not available (e.g., when an RE is out of Galileo coverage, no WiFi peers/access points are in range, etc.), provide options for managing prioritized access for emergency messages, and enable use of the 3.7-3.8 GHz band for sporadic emergency messages as this band will be allocated to local services in Germany/Sweden (such as industrial usage) (see e.g., Bundesnetzagentur (BNetzA), "Anhörung zur lokalen und regionalen Bereitstellung des Frequenzbereichs 3.700 MHz bis 3.800 MHz für den drahtlosen Netzzugang" (English: Consultation on the local and regional provision of the 3,700 MHz to 3,800 MHz frequency range for wireless network access) (2018), available at: https://www.bundesnetza2en-tur.de/DE/Sachgebiete/Telekommunikation/Unternehmen Institutionen/Frequenzen/Oeffe ntlicheNetze/RegionaleNetze/regionalenetze.html ("[BNetzA]"). Although the embodiments are discussed in terms of the mandated services (e.g., Galileo, WiFi), the embodiments herein are also applicable to any other services such as other GNSS (e.g., GPS or others discussed herein), 3GPP 5G/NR and/or LTE, WiMAX, D2D technologies, etc.

Various embodiments include a Fallback and Emergency Manager Device Entity (FEM-DE) (e.g., FEM-DE 2210 of FIG. 22) that offers the following services: a set of fallback options, rules, and/or policies including clear rules on how they shall be applied in case that the mandated (radio) access technologies ((R)ATs (e.g., Galileo, WiFi, 5G/NR, LTE, etc.) is/are unavailable; a mechanism on how to achieve prioritized access in particular to shared/unlicensed bands in which a number of distinct (R)ATs) operate; and options, rules, and/or policies on how used frequency bands (e.g., 3.7-3.8 GHz which will mainly be used by industrial sites) can be repurposed for emergency services in when the mandated (R)ATs is/are unavailable.

The embodiments herein allow a coordinated and predictable way of operation in case that an emergency situation occurs and mandated (R)ATs (e.g., Galileo, WiFi, 5G/NR, LTE, etc.) are locally/temporarily unavailable. Although these fallback emergency embodiments are discussed herein as being used during emergency scenarios, such embodiments are also applicable to any other non-emergency scenario or time periods, such as when a primary or desired network is overloaded or underperforming, when high-priority or paid prioritization is implemented by an MNO, or the like.

As mentioned previously, emergency calls and related user localization are required to rely (at a minimum) on WiFi and Galileo GNSS following the Delegated Act by the European Commission on [RED] Article 3(3)(g). In case one (or both) of the mandated services/systems are unavailable, the present disclosure introduces fallback strategies for localizing users and issuing emergency calls or other emergency communications (e.g., PWS, ETWS, and/or CMAS (a.k.a., Wireless Emergency Alert) short messages discussed in 3GPP TS 22.268 v16.3.0 (2019-06) ("[TS22268]") and/or EU-ALERT discussed in [TS22268] and ETSI TS 102 900 V1.3.1 (2019-02)). In various embodiments, the fallback strategies utilize D2D communications.

Figure 22:
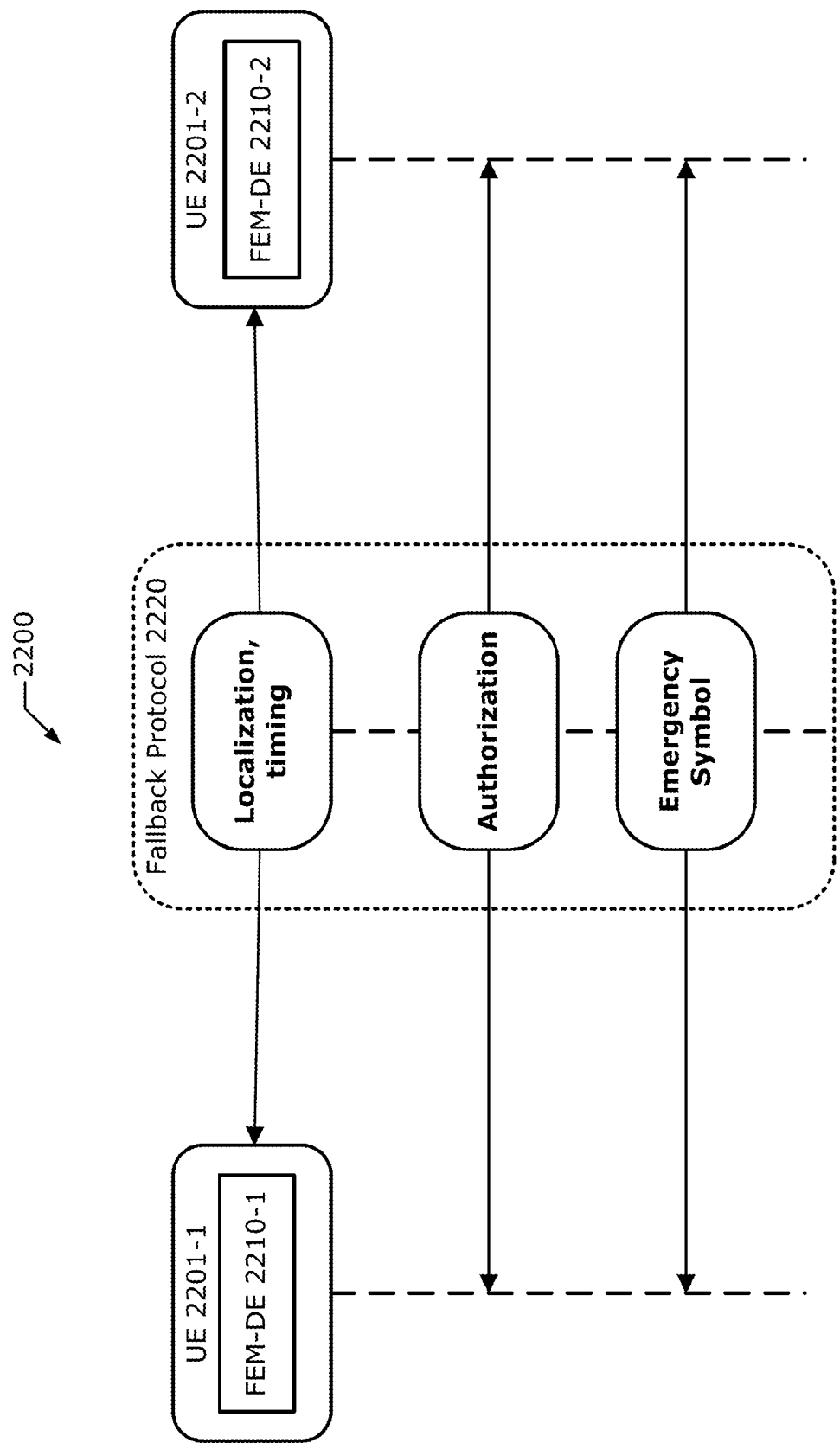
FIG. 22 illustrates an example Fallback Protocol procedure according to various embodiments.

FIG. 22 shows an example fallback protocol example 2200 according to various embodiments. The fallback embodiments that deliver emergency services are enabled in UEs 2201 (including UE 2201-1 and UE 2201-2 in the example of FIG. 22), and are used when the mandated services are unavailable for whatever reason. In this regard, each UE 2201 implements its own instance of an FEM-DE 2210 (including FEM-DE 2210-1 implemented by UE 2201-1 and FEM-DE 2210-2 implemented by UE 2201-2 in the example of FIG. 22).

In FIG. 22, the FEM-DE 2210 implements the fallback protocol 2220, which includes or indicates fallback bands to be used for emergency services. For example, the fallback bands may be used to exchange localization and timing signaling, authorization signaling, and/or emergency symbol signaling between the UEs 2201. The FEM-DE 2210 is also capable of placing the UE 2201 in an off-the-grid mode, and consumes position and timing services from other applications/services and/or other infrastructure/equipment. In some embodiments, the FEM-DE 2210 collects location data based on signals received and/or measured by the UE 2201 (e.g., using GNSS positioning circuitry (see e.g., FIGS. 41 and 42), using WiFi indoor positioning services, and/or the like), and when the UE 2201 (or FEM-DE 2210) determines that the location data is not available from a mandated service, the FEM-DE 2210 places the UE 2201 into a standalone (e.g., off-the-grid) mode and enables a localization mechanism to determine the current location of the UE 2201.

6.1. Localization Mechanism

In embodiments, if a localization reference from a mandated service (e.g., GNSS-based or WiFi-based localization reference) is not available, the UE (or FEM-DE) calculates its own reference position and becomes a localization and time reference source for other nearby equipment. As soon as the localization of a mandated service is lost or otherwise undetectable, the FEM-DE will set the equipment to the off-the-grid (OTG) mode as mentioned previously. In the OFG mode, the UE (or FEM-DE) calculates the UE position and/or time relative to the last known position and/or time values, and broadcasts the calculated position/time values at regular intervals to other equipment via dedicated localization and synchronization sequences. In various embodiments, the location may be calculated using nearby devices as the reference as shown by FIG. 23.

Figure 23:
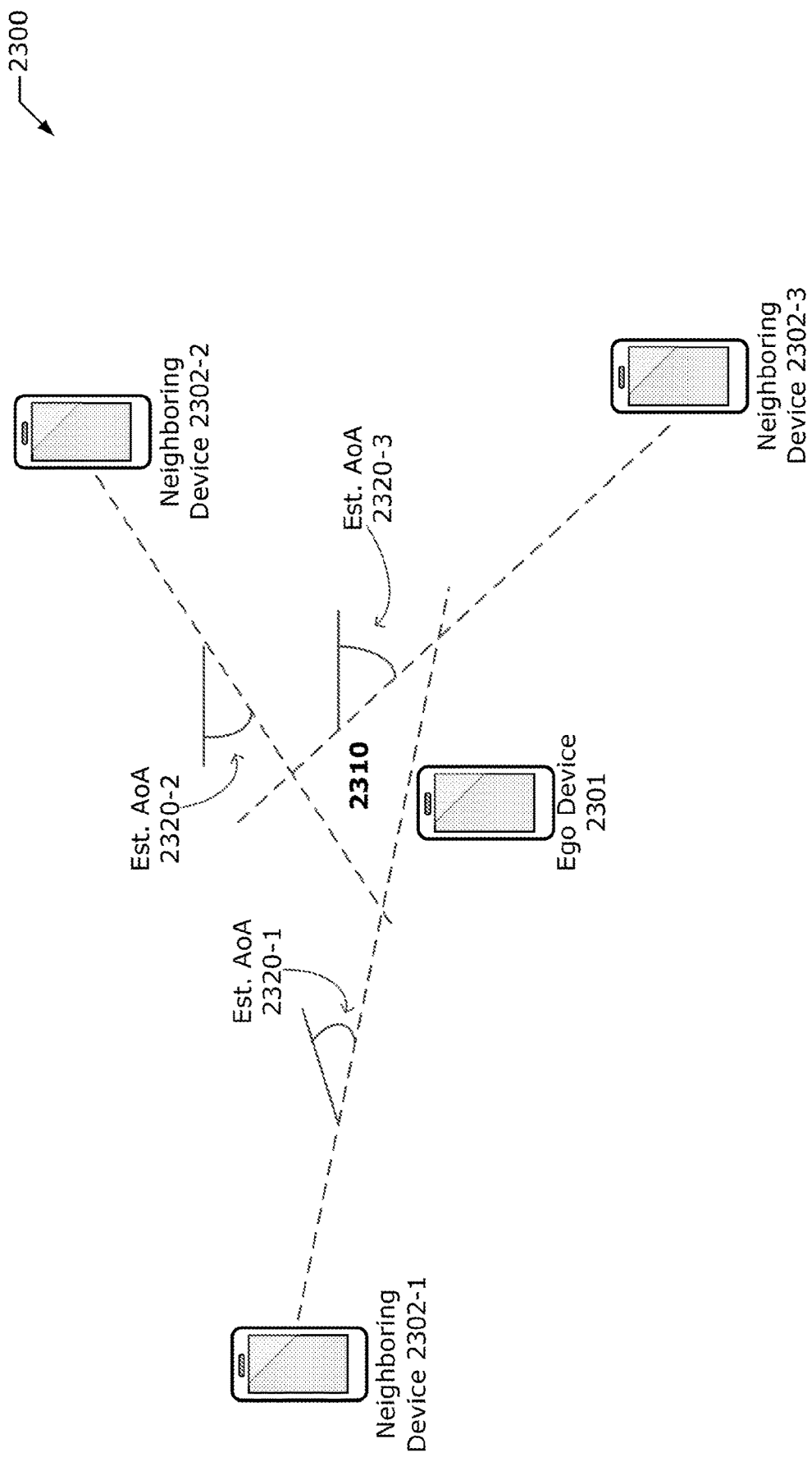
FIG. 23 shows an location estimation example according to various embodiments.

FIG. 23 shows a location estimation example 2300 according to various embodiments. The D2D communication example 2300 includes D2D communication based location estimation through Angle-of-Arrival (AoA) determination and exchange of device location estimates. In FIG. 23, an approximate location of neighboring devices 2302 (e.g., devices 2302-1, 2302-2, and 2302-3 in FIG. 23) is requested by ego device 2301, along with information on estimated error margin, typically through a D2D communication link (e.g., PC5 for LTE/NR, Bluetooth®/BLE, or some other suitable RAT such as those discussed herein). These estimates may rely on current and/or previous, historical and/or stored GNSS data, sensor data (e.g., accelerometer, gyroscope, etc.), cellular system based location estimation (e.g., based on AoA estimates from known RAN nodes, or using LTE/NR location services), estimates based on D2D interactions with neighboring devices 2302, etc., and/or any combination thereof. Once the location from neighboring devices 2302 is known or determined, several of such devices 2302 are considered for AoA estimations 2320 (including AoA estimations 2320-1, 2320-2, and 2320-3 in FIG. 23). The location is then estimated to be within the area 2310 based on the AoA estimations 2320. In some embodiments, two devices 2302, 2301 are sufficient to have an intersection of such estimated AoAs 2320. In some embodiments, more than two devices 2302, 2301 are considered in order to derive an area of expected location 2310 instead of just a single point (or using only two devices 2302, 2301).

To ensure that the best available localization source is used, the FEM-DE 2210 will search for mandated service in regular intervals and switch back to a normal mode a mandates service becomes available.

6.2. Emergency Fallback Communications

Two embodiments are provided in order to ensure high priority access for emergency messages even if the primary system infrastructure for the mandated services is/are unavailable.

Figure 24:
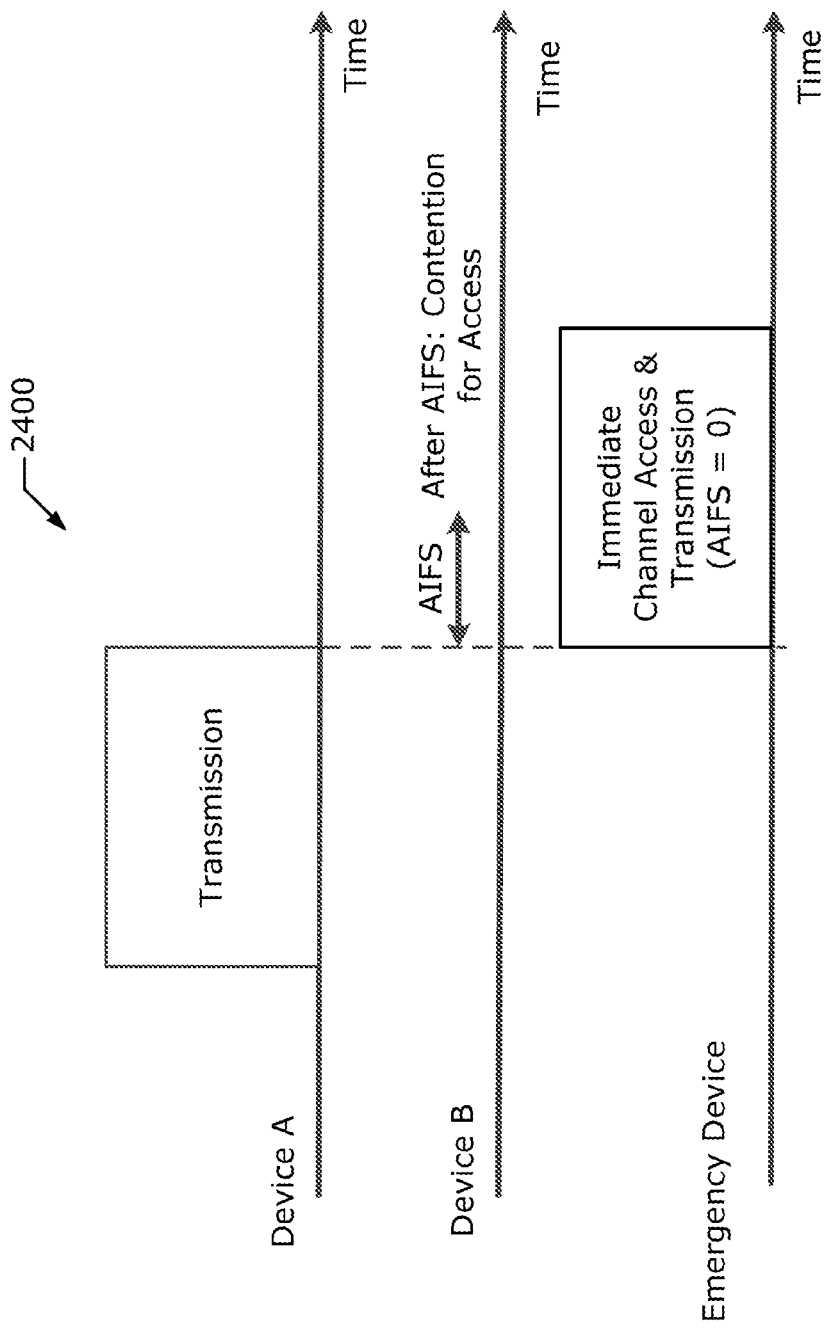
FIGS. 24 and 25 illustrate emergency message high priority examples according to various embodiments.

FIG. 24 illustrates a first embodiment where ultra-high priority is given to emergency messages in case of contention based access (e.g., in the context of the CSMA protocol of D2D WiFi connections, which should still be available even if the infrastructure, such as WiFi Access Points, are no longer available). In many scenarios, devices typically have to respect a waiting time between transmissions, which may be based on, for example, the so-called Arbitration Inter-Frame Spacing (AIFS)). In this embodiment, the AIFS is set to 0 for high priority emergency messages in order to achieve the highest possible access probability to the medium. FIG. 24 illustrates an example 2400 of high priority access through zero-level AIFS according to various embodiments.

In other implementations, the waiting time between transmissions may be based on a CSMA/CA backoff timer, a contention resolution timer, or some other like timer. Similar to the AIFS, in this embodiment such a timer is set to 0 for high priority emergency messages.

In other embodiments, the AIFS or retransmission timer(s) may be set according to a device category/type and/or priority associated with the device. For example, the AIFS or timer(s) may be set to 0 as discussed above if the device is registered as being owned or operated by emergency responder (e.g., paramedics, police, firefighters, etc.), whereas the AIFS or timer(s) may be set to some other value if the device is registered as being owned or operated by non-emergency personnel. Various priorities or categories may be used for different personnel, roles, or based on some other criteria. Additionally, beacon timers may be implemented to change or alter these device priorities/categories. For example, the AIFS or retransmission timer(s) may be set to 0 as discussed above for a specified period of time, such as X number of hours after the device is placed in the OTG mode (which may correspond to some period of time related to the emergency scenario), and then set to a different value according to the device priority/category upon expiration of the beacon timer. Additionally or alternatively, signaling from authorized equipment may be used to change the AIFS/retransmission timer values (e.g., an NFC signal obtained from the authorized device, or signaling received from some central (e.g., regulatory) authority)).

In case that WiFi is not available, the FEM-DE 2210 is also responsible for establishing a communication link with one or more peer devices. When OTF mode is enabled, and a localization and time reference is established, the UE (or FEM-DE 2210) uses a fallback connection protocol (see e.g., FIG. 22) to remain connected with one or more peer devices. In various embodiments, the fallback communication protocol is only used for emergency message broadcasting and reception, and other communications are not performed via the fallback communication protocol. The fallback communication protocol includes basic procedures for peer-to-peer or D2D discovery, authorization, and emergency message exchange. The fallback communication protocol includes Emergency Symbols which contain emergency messages.

Figure 25:
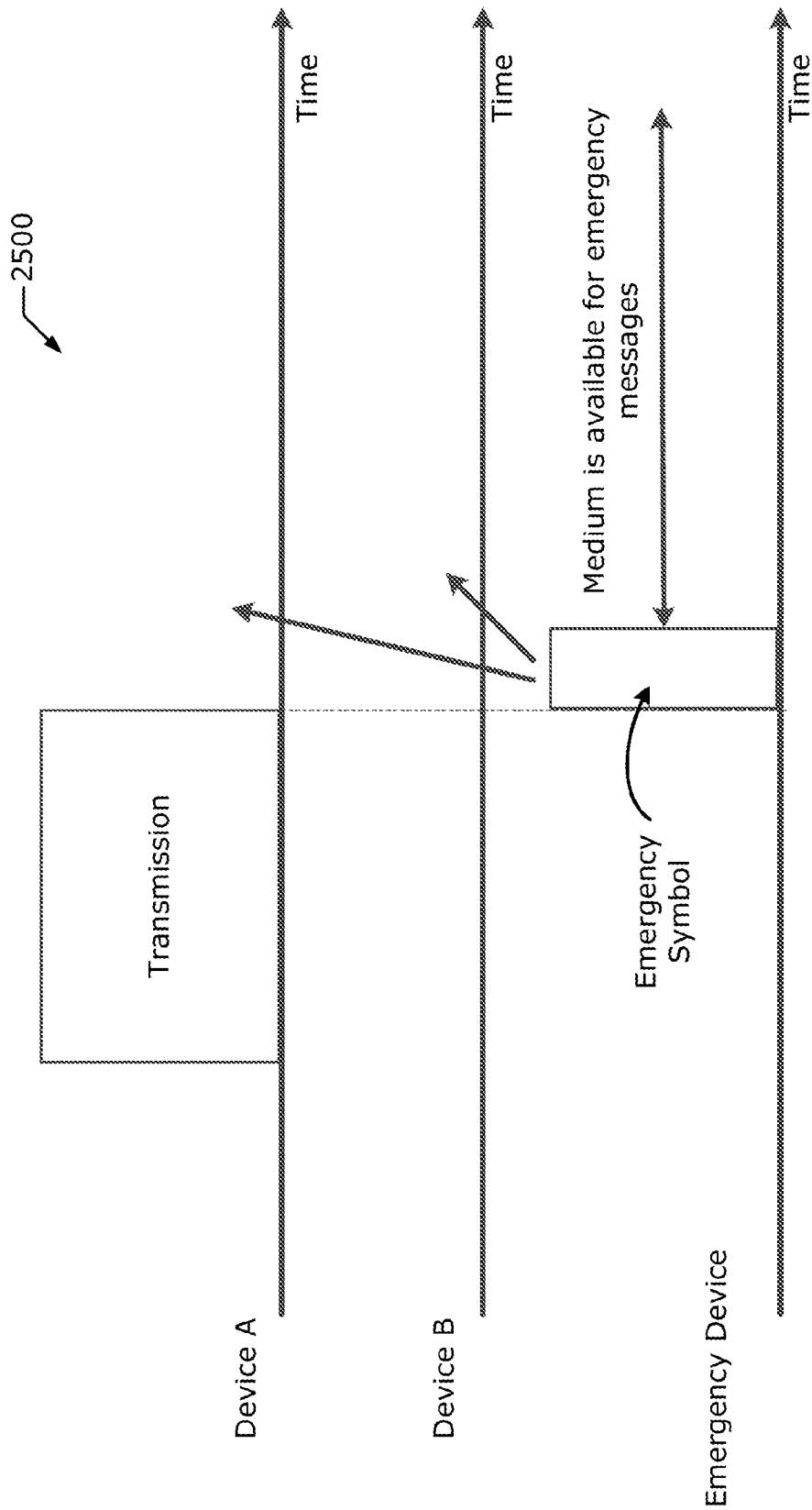

FIG. 25 illustrates an example 2500 in which an emergency symbol enforces the reservation of the medium for a predetermined period of time (e.g., 1s) for high priority emergency messages. Emergency symbol indicates to other devices that the medium is reserved for the predetermined period of time for the high-priority emergency messages only. This is represented in FIG. F.II-2 by the arrows pointing from the emergency symbol towards the time lines for Devices A and B.

The emergency message may be introduced or indicated in serval ways. In a first embodiment, the emergency indicator can be sent as a standard WiFi data packet using a standard WiFi frame structure. Other packet types may also be used such as a packet structure used for a Personal Area Network (PAN) protocol such as any of those discussed herein, or using any of the channel or packet structures discussed elsewhere herein. Such a data packet may include the following information: a start of the emergency period, which may be given by a predefined message type, optionally including an indication when the emergency period is actually starting (e.g., immediately or a number of milliseconds (ms) in the future (or from a current time or from an indicated timestamp); (optionally) a duration of the emergency period (e.g., in milliseconds); and (optionally) the type(s) of devices and/or traffic allowed to access resource(s) during the emergency period. In a second embodiment, a symbol with good autocorrelation properties may be used, for example, a ZC sequence, a CAZAC sequence, or the like, which can be easily detected by devices of most access technologies through simple autocorrelation.

6.3. Emergency Service Frequency Band Prioritization

For emergency situations, it is possible that cellular bands and/or unlicensed bands (e.g., WiFi bands) are saturated, for example, when there is a high volume of traffic or is experiencing overload or low signal/channel quality conditions, such as when a disaster type event takes place. For such emergency situations, embodiments include fallback emergency bands. The fallback emergency bands are intended to be sparsely used. In these embodiments, the FEM-DE 2210 manages available locally used frequency bands and repurposes these bands for emergency services. In one example, the FEM-DE 2210 repurposes the 3.7-3.8 GHz band, which is mainly used for industrial applications/services. In Germany and Sweden, this band is located at 3.4-3.7 GHz, which is just above the 5G bands. This band is allocated in Germany and Sweden to "local usage" such as Industrial 4.0 (e.g., Industrial Automation) and related services. Only when locally unused, it may complement classical cellular bands [BNetzA]. Accordingly, emergency service fallback channels may be allocated to the 3.7-3.8 GHz band. The process for accessing these bands is as follows:

1. An RE (e.g., a mobile device or any other wireless equipment) detects an emergency situation is taking place. This may be based on receipt of a PWS, ETWS, CMAS, etc., message or using some other mechanism.
2. In response to detecting an emergency, the RE attempts to communicate using default techniques, for example, by attempting to access bands in an unlicensed spectrum (e.g., WiFi bands) and/or bands in a licensed spectrum (e.g., cellular bands).
3. When no communication is possible in the default bands, for example, due to saturation (congestion or overload scenarios), network breakdown, or similar, the RE accesses (or attempts to access) an emergency fallback channel in a repurposed band (e.g., in the 3.7-3.8 GHz band or any other suitable band). The specific channel to be accessed may be communicated/made available a-priori, for example, through a channel map indicating where parts of the repurposed band are locally unused (e.g., by stakeholders such as industrial automation).
4. When the RE accesses the emergency fallback channel in the repurposed band, the RE communicates (transmits and/or receives) emergency message(s) in the emergency fallback channel as discussed previously.

One example implementation includes vehicular communications where a vehicle may or may not be in the coverage area of a network or infrastructure equipment (e.g., RSU, edge compute node, etc.). If the vehicle is not in the coverage area of the network, the standalone mode is activated, otherwise the mode is deactivated. In another example, a level of hierarchy is defined for standalone equipment. Equipment of higher hierarchy is controller equipment of lower hierarchy in this example.

7. PROTECTION MECHANISMS FOR USER PRIVACY AND PERSONAL/SENSITIVE DATA (AB7960)

Protecting personal and confidential data stored in mobile equipment and privacy of the users against security threats is a multidimensional problem involving human and technological aspects. Mobile devices are an attractive target for threat actors such as attackers or hackers. Some threat actors attempt to access mobile devices using malware. Malware is any type of software element(s) that are intentionally designed to cause damage to a computing system, network, creates a vulnerability in the target system, and/or exhibits deceptive behaviors or practices that may potentially harm systems, networks, users and/or consumers. A vulnerability is a weakness which can be exploited by a threat actor to perform unauthorized actions within a computing system, such as a mobile device. To exploit a vulnerability, the threat attacker must have at least one applicable tool or technique that can connect to the target system through its weakness, which in some cases is created by installed or executable malware.

Malware causes damage or creates vulnerabilities after it is provisioned, installed, or otherwise introduced into a target's computer system. A lure is often used to trick users into accessing malicious resources, downloading and installing the malware onto their systems, and/or lure users into submitting their personal or financial information by posing as legitimate platforms. The aforementioned lures may be referred to as phishing messages, which involves the fraudulent attempt to obtain personal, confidential, and/or sensitive information by disguising oneself as a trustworthy entity in an electronic communication. In some cases, the malware may automatically execute malicious program code or scripts, or display a content item that carriers a malware payload that executes when the user opens or interacts with the content. Through installing the malware on victim devices, unauthorized users (e.g., threat actors) can gain access to private, confidential, and/or sensitive data. Downloading malicious applications ("malware") and/or receiving phishing messages coming from short messages (e.g., SMS messages), email messages, social network messaging and/or posts, and phone calls increase the vulnerability of users to many security or privacy-related threats. Specific examples include banking/financial applications, medical applications and any other application or service where personal, private, confidential, and/or sensitive data is being conveyed.

[RED] Article 3(3) states that "Radio equipment within certain categories or classes shall be so constructed that it complies with the following essential requirements: [ . . . ] (e) radio equipment incorporates safeguards to ensure that the personal data and privacy of the user and of the subscriber are protected."

Currently, there are many different ways of protecting the privacy of data. However, the conventional data privacy protection mechanisms (e.g., information security or "InfoSec") require full user reliance and/or are system/platform specific, which makes these conventional solutions available to a relatively small set of users. Additionally, conventional solutions usually require user awareness to implement specific security policies.

Embodiments herein provide several mechanism to ensure that a device protects the personal, confidential, and/or sensitive information and privacy of users. In an example, security through diversity is applied by providing data across different wireless and/or wired/cabled channels, each of a same or different access technology. If one of the channels is corrupted, the others may still be operational and support the safe delivery of information.

Embodiments introduce a "privacy hierarchy" and related data tags for privacy data. For purposes of the various embodiments discussed herein, "privacy data" may refer to personal data, sensitive data, confidential data, and/or any type of data that a natural person or entity wishes to keep private or keep from being publically disclosed without permission. In some implementations, the terms personal data and/or sensitive data may be defined by the Regulation (EU) 2016/679 of the European Parliament and of the Council of 27 Apr. 2016 on the protection of natural persons with regard to the processing of personal data and on the free movement of such data, and repealing Directive 95/46/EC (hereinafter the "General Data Protection Regulation" or "GDPR").[1]

[1] Available at: https://eur-lex.europa.eu/legal-content/EN/TXT/HTML/?uri=CELEX:02016R0679-20160504&from=EN.

Depending on the privacy hierarchy level (or classification), the processing of the data is limited. Embodiments also include a new physical channel (referred to as a "Security Channel") between the mobile devices for authorized privacy data and message exchange flows. Additionally or alternatively, a hierarchical approach is also introduced for the channels/links wherein channels/links of higher priority/rank in the hierarchy are considered more secure/trustworthy than channels/links of lower priority/rank in the hierarchy. Embodiments include a protocol mechanism that does not leak information about identification of a given device unless that recipient device is trusted to know this information. Embodiments include a Security Preamble that is decodable by trusted devices, and Security Pointers that point to trusted locations (trusted resources) where trusted information can be found without disclosing any other information.

7.1. Privacy Hierarchy Levels and Related Data Tagging Embodiments

In order to differentiate data of different privacy requirements, embodiments introduce a "privacy level hierarchy," which may be as follows:

1. Public Data: data that can be freely shared, not privacy related.
2. Data indirectly related to a user: data having no direct relationship to a user, but some limited personal data may be extracted/determined through inference (e.g., a photo of Toronto may imply that the user has been recently visiting Toronto), etc.
3. Historical data related to the context of a user such as previously visited location data (e.g., vacation destination of the last summer, etc.), historical user (login) session data, browser history, etc.
4. Current data related to the context of a user such as a current location of the user/device, travel speed and/or direction, current user (login) session data, device/system data (information about individual components, current resource utilization, and the like), etc.
5. Intimate User Privacy Data (e.g., personally identifiable information (PII) and/or identity credentials (e.g., passport ID, driver's license number, social security number (SSN), user ID/passwords, etc.), biometric data, healthcare/medical records, payment credentials (e.g., bank account, credit card numbers), and the like).

Other privacy levels or classifications may be used in other embodiments. In some embodiments, different granularities may be used, such as by defining sub-levels or sub classifications for each privacy level/class.

In various embodiments, data items, data containers, and/or data elements can be tagged with an indication (or tag) of an associated privacy hierarchy level discussed above.

FIG. 26 illustrates and example Privacy Hierarchy Level Frame 2600 for User Data, according to various embodiments. The Frame 2600 includes a Privacy Hierarchy Level Tag field 2602 that includes a Privacy Hierarchy Level Tag. The Privacy Hierarchy Level Tag may be any type of data or information that may be used to refer to a privacy level for the corresponding user data included in the user data field 2604. For example, the Privacy Hierarchy Level Tag 2602 may be one or more bits, one or more integers, a Boolean value, character or character string, and/or any other type of data.

7.2. Security Channel for Device Authorization and Secure Information Exchange

Depending on the Privacy Hierarchy Level discussed above, user data needs to be transported on a dedicated channel including specific protection mechanisms. In various embodiments, the Broadcast Channel may only be used to carry data having a lowest privacy hierarchy level, and the Data Channel may be used to transport data with a medium privacy hierarchy level. Depending on the sensitivity specific protection mechanisms that may be employed (e.g., obfuscation, anonymization, encryption, etc.), data with higher privacy hierarchy levels are transported on a specific Security Channel.

In order to be able to receive and detect the Security Channel, an RE includes a dedicated unit and position embedded in a communication protocol before communication establishment between two devices can take place. An equipment can have one or more Security Channels defined, depending on application, equipment classification, and/or equipment type (e.g., commercial, government, medical, etc.). An example Security Channel is shown by FIG. 27.

Figure 27:
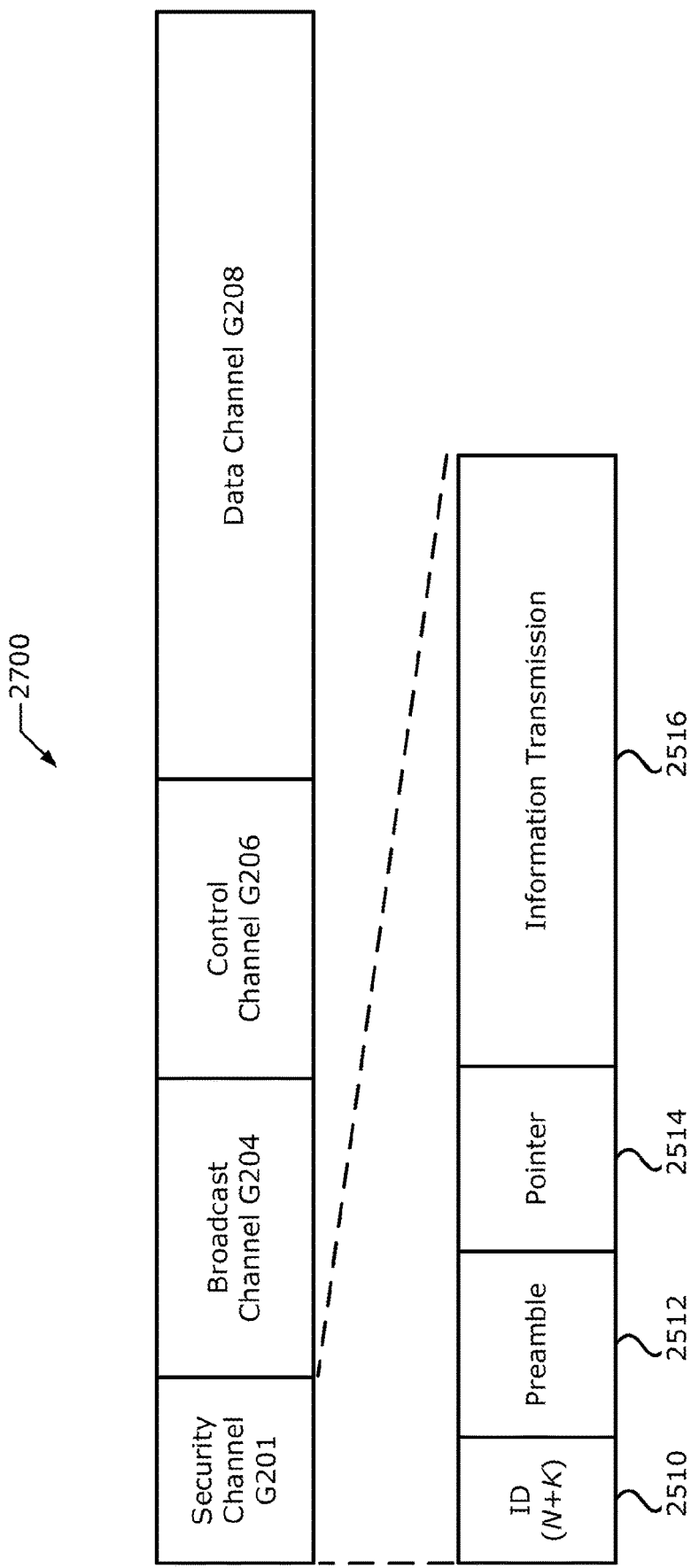
FIG. 27 illustrates an example Security Channel according to various embodiments.

FIG. 27 illustrates an example Security Channel architecture 2700 according to various embodiments. The Security Channel architecture 2700 includes a security channel 2701, a broadcast channel 2704, control channel 2706, and data channel 2708. The broadcast channel 2704, control channel 2706, and data channel 2708 may be the same or similar to the broadcast channel 1004, control channel 1006, and data channel 1008 of FIG. 10, respectively. The security channel 2701 includes an ID (N+K) data element/field 2710 that carries a security ID, a preamble data element/field 2712 to carry a security preamble, a pointer data element/field 2714 to carry a security pointer, and an information transmission data element/field 2716 to carry information for transmission. Aspects of these data items are discussed infra.

7.3. Security Channel Protocol

Embodiments include a protocol mechanism that makes sure no (or almost no) sensitive user information leaks to non-authorized users or devices. This is accomplished by anonymizing this information in the Security Channel 2701 during signaling exchanges related to the establishment and maintenance of the communication link between the peer devices.

7.3.1. ID Obscuration

During the session/connection establishment phase of a communication session, a device ID (or other sensitive or private information) of a Tx device can be leaked to peers that are connected to the Tx device. An approach to avoid this leakage would be to encrypt the message so that only intended receivers (with the right decryption credentials) can decode it. Although encryption requires that all devices have established or obtained encryption/decryption credentials (keys), encryption in and of itself does not stop information from being leaked in the first place.

In various embodiments, rather than exchanging the device ID explicitly, a bit string representation of the device ID is created. This bit string may be referred to as a "security ID" or the like, which may be conveyed in the ID (N+K) data element/field 2710. The bit string representation of the device ID has K active bits (e.g., bits set at one) and N additional active bits to obscure the representation of the device ID, wherein K and N are numbers. In embodiments, the N bits are only known to authorized devices. Other information in addition to the device ID may be obscured using these embodiments.

7.3.2. Security Preamble

For highly sensitive User Data to be communicated over the security channel 2701, a specific (security) preamble, which is only known to authorized devices, is used by the authorized devices to detect and/or monitor the security channel 2701. In this way, only authorized devices will be capable of discovering or detecting the security frame, and unauthorized devices will be unable to access the information because the unauthorized devices will not be able to synchronize with the security frame.

7.3.3. Security Pointer

Furthermore, the security channel 2701 is used to carry out an information negotiation exchange between the Tx and the Rx devices. For example, once a connection/link is established, the security channel performs authorization based on the ID obscuration and/or security preamble discussed above; requests available information; status on available information is exchanged completely or by providing security pointers (discussed infra) is applied; and then only conveys the missing information.

The process can be further improved by conveying security pointers to requested information instead of conveying the information itself. The security pointer points to a safe location or trusted resource that stores the requested information.

Figure 28:
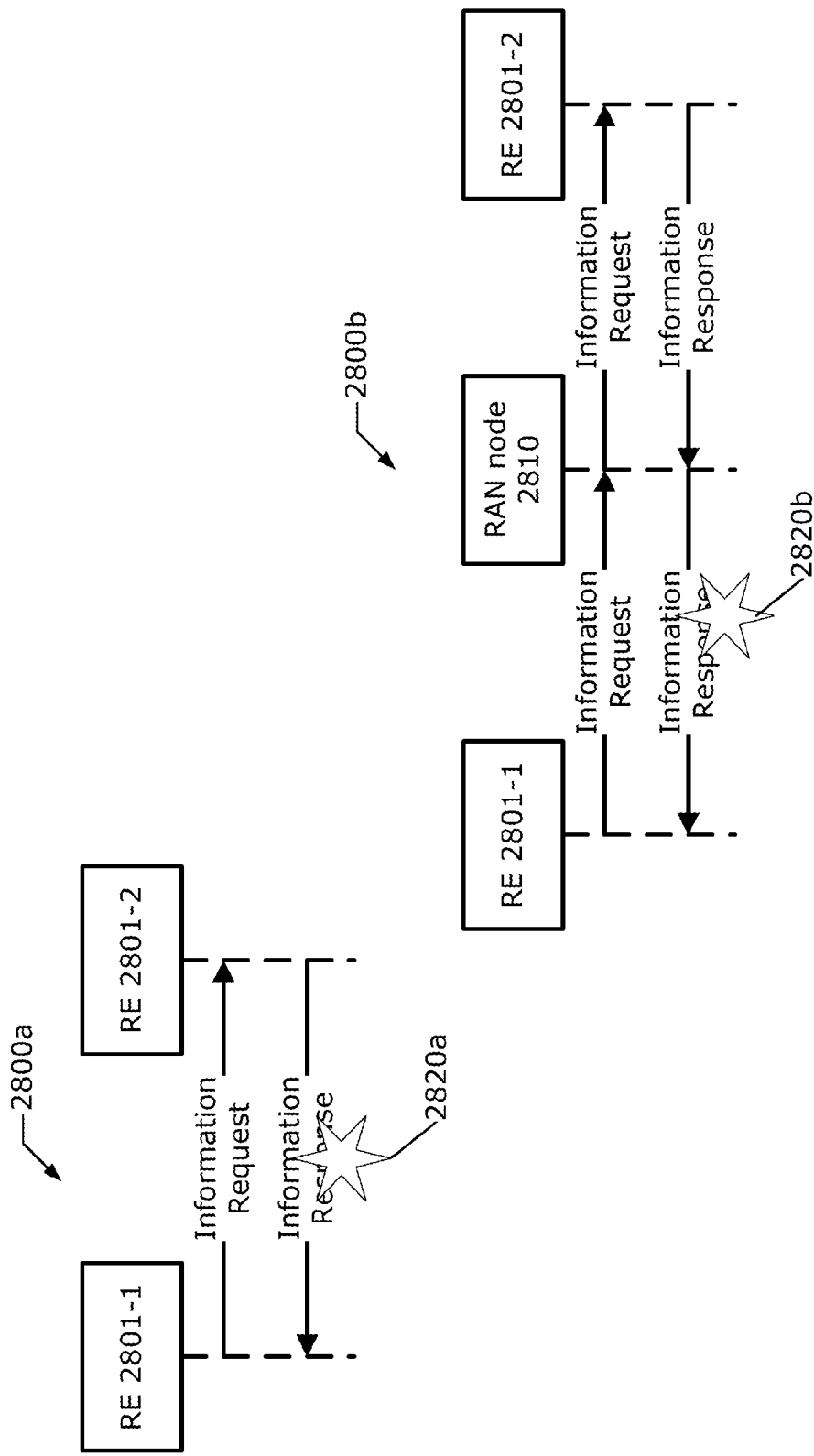
FIG. 28 illustrates example scenarios not utilizing the present security channel embodiments.

FIG. 28 shows example scenarios 2800a and 2800b wherein the present security channel embodiments are not used, which may result in a malicious interceptor intercepting requested information/data. In the first scenario 2800a, RE 2801-1 sends an information request to RE 2801-2, and RE 2801-2 sends an information response to RE 2801-1. However, a malicious actor may access (intercept) the information in the information response at interception 2820a. In the second scenario 2800b, RE 2801-1 sends an information request to RAN node 2810, the RAN node 2810 forwards the information request to RE 2801-2. RE 2801-2 sends an information response to the RAN node 2810, and the the RAN node 2810 forwards the information response to RE 2801-1. However, a malicious actor may access (intercept) the information in the information response being forwarded to the RE 2801-1 at interception 2820b.

Figure 29:
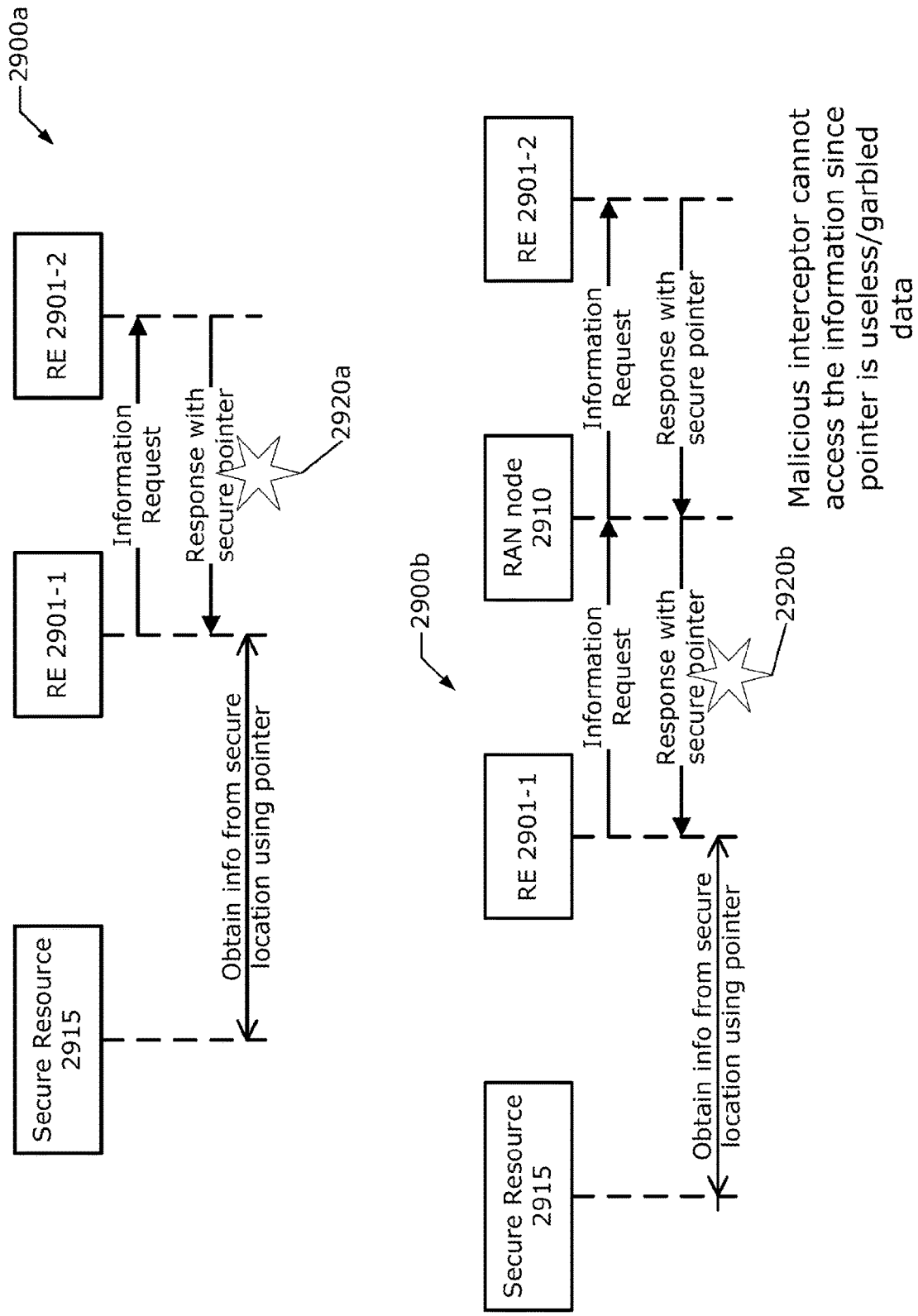
FIG. 29 illustrates an example procedure for conveying information using security pointers according to various embodiments.

FIG. 29 shows an example procedure 2900 for conveying information using security pointers to requested information, according to various embodiments. In this example, the requested information is stored at a secure resource 2915, which may be a secure remote storage device, system, database (DB), and/or some other entity that can be found in a certain location using a suitable identifier (e.g., Uniform Resource Identifier (URI), Uniform Resource Locator (URL), Uniform Resource Names (URNs), data/file path, and/or the like).

In the first scenario 2900a, RE 2901-1 sends an information request to RE 2901-2, and RE 2901-2 sends an information response to RE 2801-1, which includes a secure pointer to secure resource 2915. RE 2801-1 uses the secure pointer to access data stored at/by the secure resource 2915. When a malicious actor accesses (intercept) the information in the information response at interception 2920a, the malicious actor cannot access the information since pointer is useless/garbled data (from the perspective of the malicious actor).

In the second scenario 2900b, RE 2901-1 sends an information request to RAN node 2910, the RAN node 2910 forwards the information request to RE 2901-2. RE 2901-2 sends an information response including a secure pointer to the RAN node 2910, and the the RAN node 2910 forwards the information response to RE 2901-1. RE 2801-1 uses the secure pointer to access data stored at/by the secure resource 2915. When a malicious actor accesses (intercept) the information in the information response at interception 2920b, the malicious actor cannot access the information since pointer is useless/garbled data (from the perspective of the malicious actor)

The requested information may be obtained from the secure resource 2915 over a (wired or wireless) secure channel. The secure channel refers to any secure means of communication. The term, "channel" refers to any means for bidirectional communication between two entities or elements, and the term "secure channel" may refer to any means for transferring data over a channel that is resistant to overhearing and/or tampering. In other words, a "secure channel" refers to employing data confidentiality and data integrity protection measures to data being communicated over a channel. In one example implementation, communications may take place over a network (e.g., the Internet) using Secure Socket Layer (SSL) or Transport Layer Security (TLS) between one or more devices (e.g., RE 2901-1 and RE 2901-2 in FIG. 29), one or more RAN nodes (e.g., RAN node 2910 FIG. 29), and/or nodes/storage elements provided by a cloud computing service (e.g., secure resource 2915, which may be provided by cloud 4344 of FIG. 43). Additionally or alternatively, a suitable point-to-point encryption (P2PE) or end-to-end encryption (E2EE) mechanism may be used, which involves endpoint applications handling the encryption and decryptio of messages on their own. In this implementation, the endpoints can encrypt data using a pre-shared secret (e.g., as in Pretty Good Privacy (PGP)) or a one-time secret derived from such a pre-shared secret (e.g., using a derived unique key per transaction (DUKPT)). In another example implementation, end-to-end encrypted tunnels (EETs) may be established using any suitable tunneling protocol that uses an encryption algorithm to (re)package data traffic for communication between computer systems/devices. EETs may generally refer to communications traveling over a virtual private network (VPN) or communications using Internet Protocol Security (IPsec). Any suitable cryptographic protocol may be used for the secure channel including SSL, TLS, IPsec, PGP and/or OpenPGP, SSH, Kerberos, and/or the like. For purposes of the present disclosure, the terms "end-to-end encrypted tunnel," "secure channel," "encrypted channel," "point-to-point encryption," "end-to-end encryption," and the like may be used interchangeably throughout the present disclosure even though these terms may refer to different concepts.

In these embodiments, any malicious interceptor of the wireless exchange will only get access to the pointer information (see e.g., 2920a and 2920b). Since the malicious interceptor typically does not have access to the secure location (e.g., secure resource 2915 with specific security mechanisms), the secure pointer is worthless information. In this way, an increased level of protection of sensitive information is achieved.

7.4. Examples for Security Through Diversity

[RED] Article 3(3)(e) and Article 3(3)(f) relate to privacy and protection against fraud respectively. Both Articles are expected to be in focus for upcoming discussions in the European Commission Expert Group. It is expected that Article 3(3)(e) will be considered in relation to the EU GDPR and Article 3(3)(f) in relation to the EU Cybersecurity Act. These articles may be seen as a rupture with the classical linkage of the R&TTE Directive (1999/5/EC) and [RED] to mainly RF parameters, such as output power levels, emission masks, etc. Compliance to RF parameters can indeed be straightforwardly determined through appropriate measurements. It is currently unclear how "soft" requirements related to Privacy and Cybersecurity may be verified and which test cases will be defined. Ideally, corresponding solutions will not to require full compliance to GDPR and the Cybersecurity Act, since corresponding compliance tests would impose a substantial burden to manufacturers in terms of certification cost and longer time to market. Rather, simplified models should be identified limiting certification tests to the most relevant and essential requirements.

In the following description, a typical example is given assuming that a user is requiring secure access to a target service through a Mobile Device/RE, such as a banking service, for example. Indeed, mobile devices are an attractive target for hackers. Through installing malicious code on the victim devices, unauthorized persons can gain access to private and sensitive user data. Downloading malicious applications and receiving phishing messages coming from short messages, email messages, social networks, and phone calls increase the vulnerability of users to many security or Privacy-related threats.

Among multiple possibilities to address corresponding security threats, various embodiments utilize Security through Diversity. While state of the art solutions address corresponding concepts in generic terms, specific implementation solutions meeting essential requirements and related testing scenarios need to be developed in order to make the concepts applicable to related [RED] Articles. Below, we will outline how related concepts can be implemented supporting Article 3(3)(e) and 3(3)(f) requirements through the reconfiguration architecture designs currently developed by ETSI.

In some embodiments, first, various privacy requirements are identified and differentiated. As an example, the privacy requirements may be as follows:
a. public data that can be freely shared;
b. data indirectly related to a user, which is data with no direct relationship to a user, but some limited data related to the user may be extracted through inference;
c. historical data related to the context of a user;
d. current data related to the context of a user; and
e. intimate user Privacy Data.

Hierarchy levels of privacy can also be introduced, and each data element might be assigned to a different hierarchy level. The processing of data may depend to the related privacy hierarchy level.

Next, stakeholders and/or threat scenarios are defined. As examples, the stakeholders and threat scenarios may include the threat scenarios illustrated by Figure G.IV-2 and FIG. G.IV-3.

Figure 30:
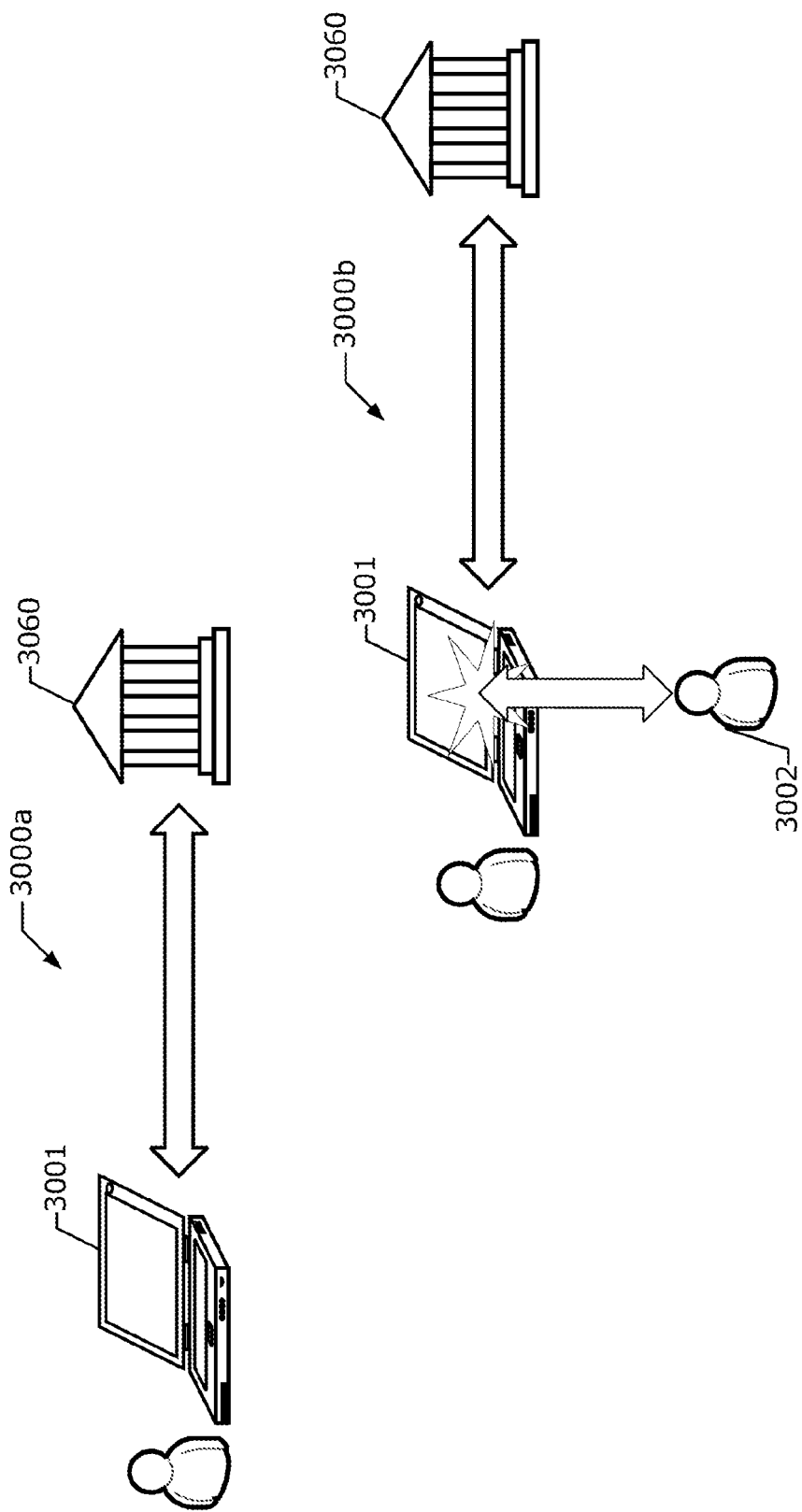
FIGS. 30 and 31 illustrate examples of malicious interactions.

FIG. 30 shows an example of a malicious 3rd party accessing a host platform through malware. Scenario 3000a shows an intended operation where a user device 3001 manages interaction(s) with target system 3060. Scenario 3000b shows a compromised operation where a malicious actor 3002 alters the interaction with target system. Here, the malicious actor 3002 gains control of the user device 3001 through the use of malware. In this example, malicious code or a malicious resource (e.g., a "virus", "malware", etc.) is present on the host, and the malicious 3rd party is able to gain access to the RE through a corresponding back door provided by the malicious resource.

Figure 31:
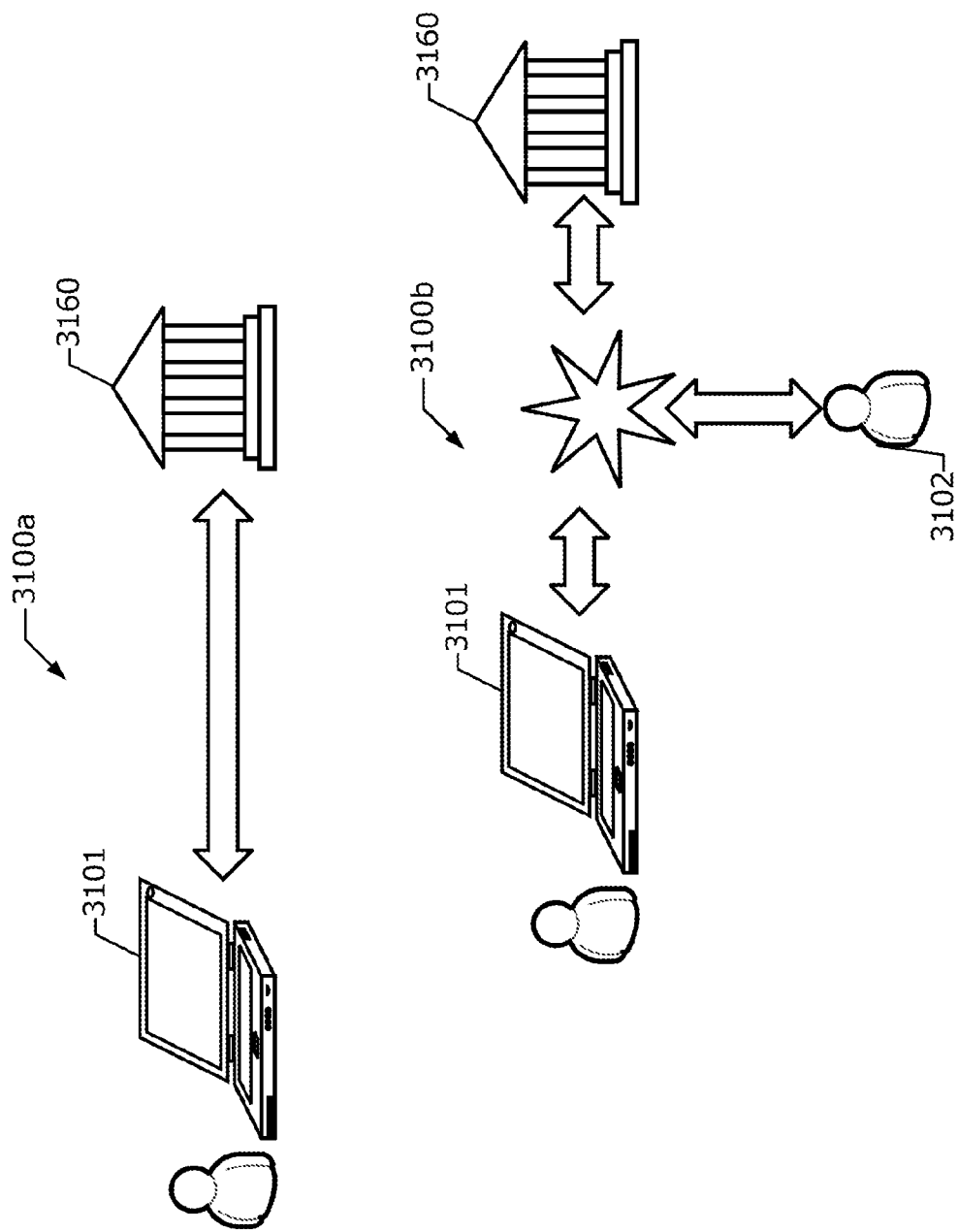

FIG. 31 shows an example of a malicious 3rd party intercepting a radio link. In FIG. 31, a wireless link is intercepted by the malicious 3rd party, which is able to gain access to the RE through hacking the respective radio link. Scenario 3100a shows an intended operation where a user device 3101 manages interaction(s) with target system 3160. Scenario 3100b shows a compromised operation where a malicious actor 3102 alters the interaction with target system. Here, the malicious actor 3102 intercepts wireless transmission between the user device 3101 and the target system 3160.

One way to overcome the threat through such malicious attacks is to apply the Security through Diversity principle by separating communication and processing entities from each other and to use redundant software components. This can be realized by using distinct execution environments or systems assuming that they are sufficiently separated from each other. For example, two different radio computers controlled through independent radio operating systems can be used as shown by FIG. 32.

Figure 32:
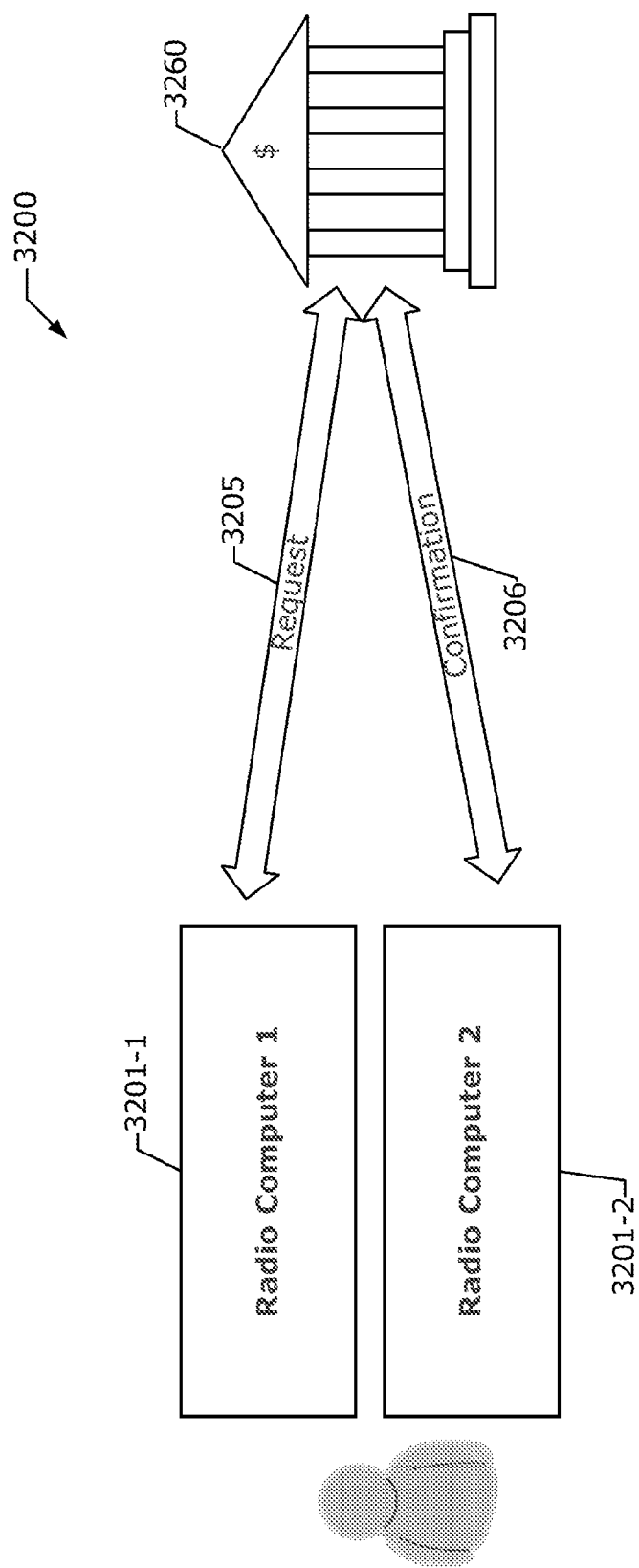
FIG. 32 illustrates an example communication and task splitting to combat malicious attacks according to various embodiments.

FIG. 32 shows an example 3200 of communication and task splitting between various sources to combat malicious attacks at the host and/or at the communication link according to various embodiments. In FIG. 32, a user request 3205 is allocated on one radio computer 3201-1 and the confirmation process 3206 on another radio computer 3201-2. The radio computers 3201 may be implemented by an individual RE and/or may be the same or similar as the radio computers 3820 of FIG. 38 (discussed infra).

Different and/or redundant RATs can be also used to distribute tasks over multiple air links, where a task will be only executed if one of the links is still under control of the users. Assuming that one of the REs 3201 and/or one of the communication links 3205, 3206 is compromised by an attacker, part of the system is still fully functional. This entity may indeed be used to identify the attack and initiate appropriate countermeasures. Vulnerabilities may, for example, be addressed through new Radio Application Packages and/or Radio Applications that are uploaded and installed in accordance to [RED] Article 3(3)(i) and [RED] Article 4, and/or as discussed in [EN302969], ETSI TR 103 087 v1.2.1 (2017 November) ("[TR103087]"), ETSI TR 103 585 V1.1.1 (2018 February) ("[TR103585]"), ETSI EN 303 095 V1.3.1 (2018 May) ("[EN303095]") and/or the like. Due to the availability of related standards, specific implementation requirements and test cases can be defined in ETSI Harmonized Standards to support various [RED] Articles.

8. COMBINATION OF RED REQUIREMENTS ON SW UPLOAD WITH REQUIREMENTS TO PROTECT PERSONAL DATA AND PRIVACY OF USERS AND SUBSCRIBERS (AD1329)

[RED] Article 3 requirements, which are split up into various sub-articles are not yet "activated". Focusing on [RED] Article 3(3)(i) and [RED] Article 4, a first Expert Group has been set up by the European Commission in order to prepare a new "Delegated Act" and "Implementing Act" for [RED] Article 3(3)(i) regulating equipment using a combination of HW & SW, which will affect all radio equipment today and to be produced in the future. [RED] Article 4 requires that a (Commission) Database is provided with related SW/HW configuration information.

The Commission is currently proposing that all of [RED] Article 3(3)(e) on protection of personal data, [RED], Article 3(3)(i) on SW upload, and [RED] Article 4 on providing configuration information to a Database, should be applied jointly. This means that any SW addressing user privacy needs to undergo certification processes and needs to register to a (commission) database. The embodiments herein provide various implementations for the aforementioned [RED] Articles.

While the application of [RED] Articles have so far only been considered independently of one another, embodiments herein fulfill the requirements for the joint application/ implementation of the following articles:

[RED] Article 3(3)(e): . . . radio equipment incorporates safeguards to ensure that the personal data and privacy of the user and of the subscriber are protected;

[RED] Article 3(3)(i): . . . radio equipment supports certain features in order to ensure that software can only be loaded into the radio equipment where the compliance of the combination of the radio equipment and software has been demonstrated;

[RED] Article 4(1): . . . Manufacturers of radio equipment and of software allowing radio equipment to be used as intended shall provide the Member States and the Commission with information on the compliance of intended combinations of radio equipment and software with the essential requirements set out in Article 3 . . . .

Currently, there is no [RED] related and/or Market Access related requirements on the joint implementation of privacy protection mechanisms in combination with SW upload mechanisms. This means that no related joint protection requirements are implemented as of today. Rather, existing solutions that have requirements related to privacy protection are implemented independent of SW uploads.

If the joint implementation of the aforementioned articles is required, an implementation would be to require each SW component to undergo compliance examinations. Otherwise, it would not be allowed on the target platform. This would be infeasible for open platforms such as those of commonly available laptops, desktops, smartphones, tablets, and/or the like.

According to various embodiments, strict separation between privacy-related processing components and non-privacy related components is enforced. Embodiments also include an API that allows non-privacy-related components to interact with privacy-related components, and vice versa. In these embodiments, "privacy-related components" may refer to SW components that handle or process PII and/or sensitive data. The PII and/or sensitive data may be classified according to the embodiments discussed previously with respect to section 7. Here, 'processing' may refer to any operation or set of operations performed on personal data or on sets of personal data, whether or not by automated means, such as collection, recording, organization, structuring, storage, adaptation or alteration, retrieval, consultation, use, disclosure by transmission, dissemination or otherwise making available, alignment or combination, restriction, erasure or destruction.

Embodiments also include a registration and authorization mechanism for privacy-related components. In these embodiments, a Certification Authority can be contacted for obtaining related certificates for a specific usage or specific processing function (e.g., general use, processing of medical data, etc.). Embodiments also provide procedures for interactions between the full SW package, the privacy-related component(s), and the Certification Authority. In some embodiments, the Certification Authority may be a computing system or service that certifies or otherwise authorizes use of privacy-related components. In some embodiments, the Certification Authority may be associated with or capable of accessing an EC database. For purposes of the present disclosure, an "EC database" may be a database that complies with Directive 96/9/EC of the European Parliament and of the Council of 11 Mar. 1996 on the legal protection of databases.[2]

[2] Available at: https://eur-lex.europa.eu/LexUriServ/LexUriServ.do?uri=CELEX:31996L0009:EN:HTML.

While traditional SW development approaches do not typically separate privacy and non-privacy related components. According to various embodiments, privacy-related components are strictly separated from non-privacy-related components such that the non-privacy-related components either have access to no user privacy related data at all and/or have access to anonymized or pseudonymised user privacy data.

The privacy data may be anonymized or pseudonymized using any number of data anonymization or pseudonymization techniques including, for example, data encryption, substitution, shuffling, number and date variance, and nulling out specific fields or data sets. Data encryption is an anonymization or pseudonymization technique that replaces personal/sensitive/confidential data with encrypted data. In some embodiments, anonymization or pseudonymization may take place through an ID provided by the privacy-related component. Any action which requires the linkage of data or dataset to a specific person or entity takes place inside the privacy-related component.

Anonymization is a type of information sanitization technique that removes PII and/or sensitive data from data or datasets so that the person described or indicated by the data/datasets remain anonymous Pseudonymization is a data management and de-identification procedure by which PII and/or sensitive data within information objects (e.g., fields and/or records, data elements, documents, etc.) is/are replaced by one or more artificial identifiers, or pseudonyms. In most pseudonymization mechanisms, a single pseudonym is provided for each replaced data item or a collection of replaced data items, which makes the data less identifiable while remaining suitable for data analysis and data processing. Although "anonymization" and "pseudonymization" refer to different concepts, these terms may be used interchangeably throughout the present disclosure.

Figure 33:
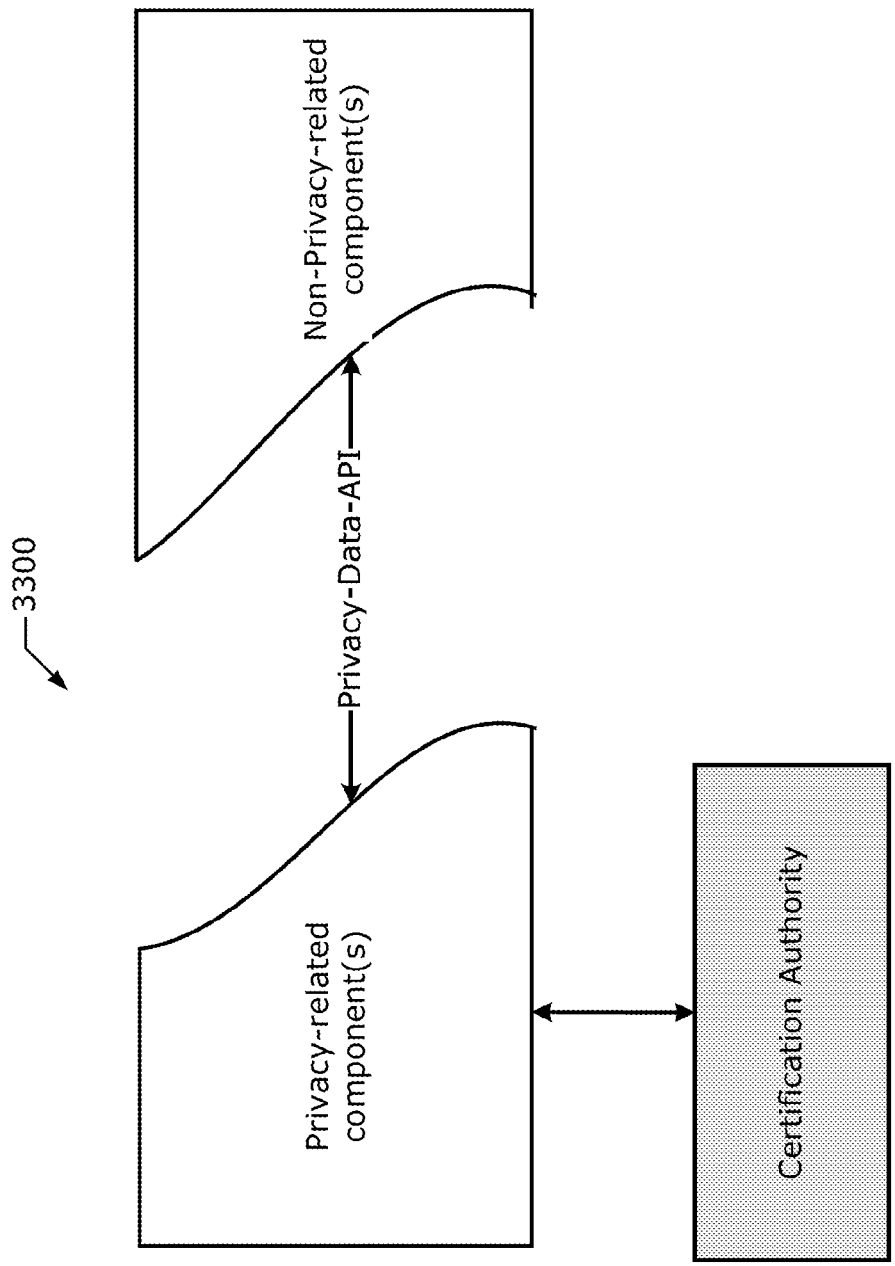
FIG. 33 illustrates an example privacy component reference architecture including privacy and non-privacy-related software components according to various embodiments.

FIG. 33 illustrates an example privacy component reference architecture 3300 according to various embodiments. The privacy component reference architecture 3300 may represent an individual application or SW unit that includes at least one privacy-related component and at least one non-privacy-related component. The privacy-related component and/or the non-privacy-related component may also interact with a Certification Authority (e.g., an EC database).

In existing SW development approaches (not shown by FIG. 33), privacy-related components and non-privacy-related components are interwinded and are not separated from one another. By contrast, the privacy component reference architecture 3300 involves privacy-related components and non-privacy-related components that are separated from one another, and communicate with one another via a Privacy-Data-API. Additionally, at least the privacy-related components seek certification from a Certification Authority, and in some embodiments, the non-privacy-related components seek certification to access privacy-data processed by the privacy-related components.

The privacy-related components and the non-privacy-related components may be reusable code elements. The components run ontop of an application platform, such as the radio platform and/or radio virtual machine as discussed infra with respect to FIGS. 38 and 39, and multiple components may run within the same application (e.g., a Radio-App discussed infra with respect to FIGS. 38 and 39). These components may also come from multiple different sources and may be developed by different parties. The component model can be thought of as being the same or similar as the mobile app store model within individual applications.

According to various embodiments, the Privacy-Data-API connects the privacy-related component(s) and the non-privacy-related component(s) in the privacy component reference architecture 3300. The Privacy-Data-API is/are source code specification(s) or a collection of libraries, routines, methods, data structures, fields, objects, classes, variables, remote calls, and the like that defines how the non-privacy-related component(s) may access or interact with the privacy-related component(s), and vice versa. Developers and programmers can use the Privacy-Data-API by importing the relevant classes and writing statements that instantiate the classes and call their methods, fields, etc. In some implementations, the Privacy-Data-API may be implemented as or part of a generalized Unified Radio Application Interface (gURAI) (discussed infra with respect to FIGS. 38 and 39). In embodiments, the Privacy-Data-API defines an access point to a particular function or service, and such access points may be Service Access Points (SAP) as shown and described with respect to FIG. 34.

Figure 34:
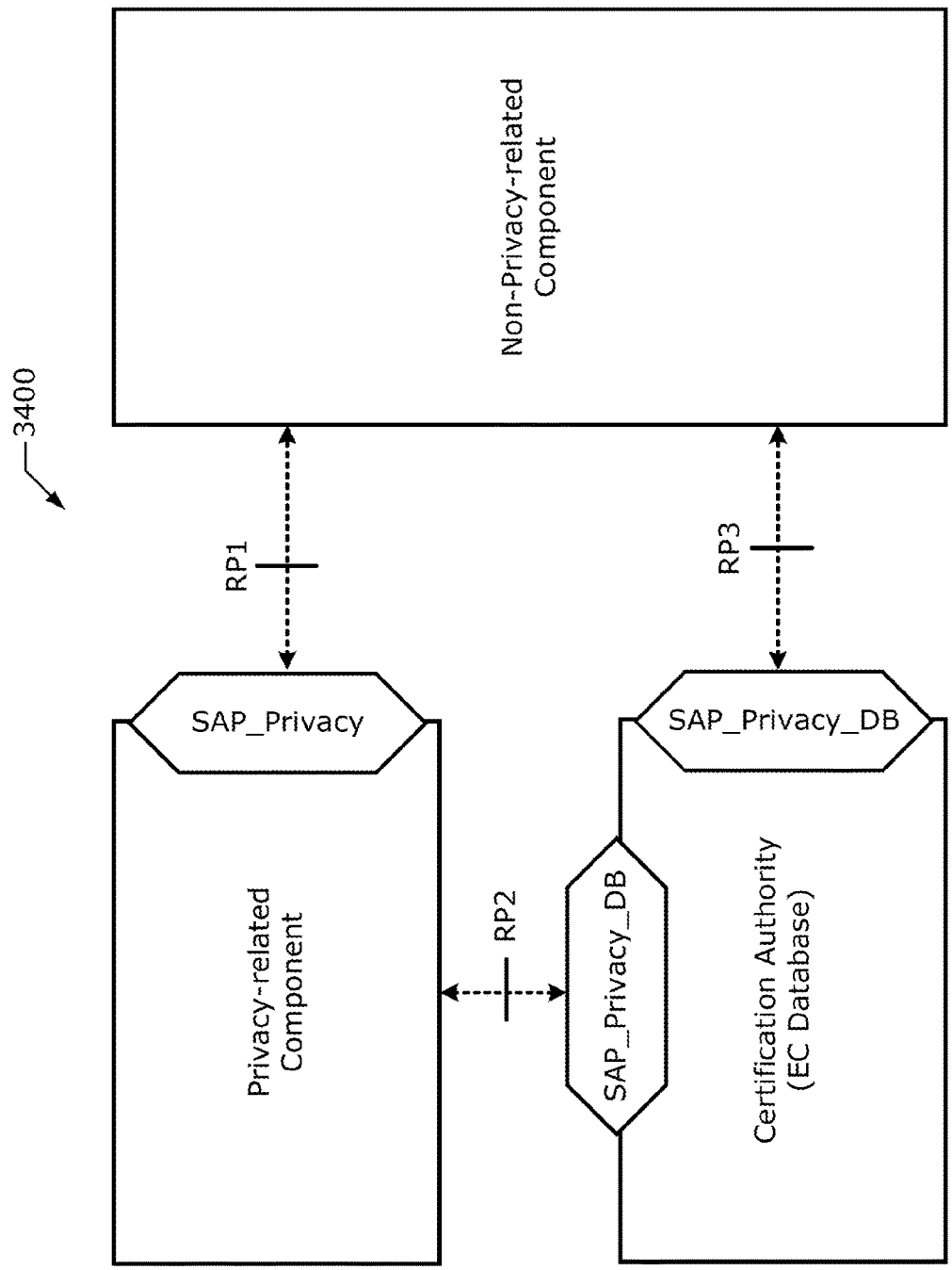
FIG. 34 illustrates an example privacy component Service Access Point architecture according to various embodiments.

FIG. 34 illustrates example privacy component SAP architecture 3400 according to various embodiments. In the SAP architecture 3400, the privacy-related component is communicatively coupled with the non-privacy-related component via a first Reference Point (RP1). The privacy-related component includes a privacy SAP (SAP_Privacy). The RP1 and/or SAP_Privacy allows the privacy-related component to interact with the non-privacy-related component, and vice versa. The SAP_Privacy is a conceptual location at which the non-privacy-related component can request the services and/or data from the privacy-related component. For example, RP1 allows the non-privacy-related component to access anonymized user privacy data from the privacy-related component using a request/response messaging model or a publish/subscribe (pub/sub) messaging model.

Additionally, the privacy-related component is communicatively coupled with the Certification Authority via a second Reference Point (RP2). An SAP is also defined for the Certification Authority called "SAP_Privacy_DB". The RP2 and/or SAP_Privacy_DB allows the privacy-related component to interact with the Certification Authority, and vice versa. The SAP_Privacy_DB is a conceptual location at which the privacy-related component can request services and/or data from the Certification Authority.

In some embodiments, the services/data requested from the Certification Authority via the RP2 and/or SAP_Privacy_DB may include a certification, certificate, DoC, or other like data. For example, the privacy-related component may require a certificate issued by a component developer, device manufacturer, third party certificate authority, etc., authorizing usage of the privacy-related component for a given application, task, or combination of applications/tasks including for in all cases.

In some embodiments, the privacy-related component may request permission to share data with the non-privacy-related component via the RP2 and/or SAP_Privacy_DB. In one example, RP2 is used by the privacy-related component to obtain authorization from the Certification Authority to use the privacy-related component in a specific context. In another example, RP2 is used by the privacy-related component to inform the Certification Authority about a final configuration (e.g., for market surveillance).

Furthermore, the non-privacy-related component is communicatively coupled with the Certification Authority via a third Reference Point (RP3). The same or different SAP_Privacy_DB may be defined for the Certification Authority (e.g., EC database) to enable the non-privacy-related component to interact with the Certification Authority, and vice versa. The SAP_Privacy_DB is a conceptual location at which the non-privacy-related component can request services and/or data from the Certification Authority.

The RP3 and/or SAP_Privacy_DB allows the non-privacy-related component to request authorization to use and connect to a specific privacy-related component. For example, the non-privacy-related component may request permission via the RP3 and/or SAP_Privacy_DB to access data from the privacy-related component.

The Reference Points (RPs) in the SAP architecture 3400 are summarized by Table X1, and the service primitives for each of the SAPs are summarized by Table X2 and Table X3.

TABLE X1

| Reference Point Name | Description |
|---|---|
| Reference Point RP1 | RP1 connects a privacy-related component and a non-privacy-related component to allow the non-privacy-related component to access anonymized user privacy related data. |
| Reference Point RP2 | RP2 connects the privacy-related component with Certification Authority (EC Database). Used to obtain authorization from the Certification Authority (EC Database) to use the privacy-related component in a specific context and to inform the Certification Authority (EC Database) about the final configuration (for market surveillance). The privacy-related component may require a certificate (issued by the manufacturer, by the Certification Authority (EC Database), etc.) authorizing its usage for a given application or in all cases. |

TABLE X1-continued

Reference Points ("RP")

| Reference Point Name | Description |
| --- | --- |
| Reference Point RP3 | RP3 connects the non-privacy-related component with Certification Authority (EC Database). It allows the non-privacy-related component to request authorization to use and connect to a specific privacy-related component. |

TABLE X2

SAP Services Primitives for SAP_Privacy

| Service Primitives | Comments |
| --- | --- |
| SAP_PRIVACY_Register | Register to the privacy-related component. |
| SAP_PRIVACY_Deregister | De-register from the privacy-related component. |
| SAP_PRIVACY_request_anonymized_information | Request information related to the privacy of a user. The data will be anonymized and provided under a "user ID" (e.g., a random ID, hash, etc.) |
| SAP_PRIVACY_provide_updated_information | Provides updates on the information related to a specific user. The non-privacy-related component only has access to an anonymized user ID, but the privacy-related component is able to link the data to the specific user. |
| SAP_PRIVACY_request_certificate | Requests certificate information, typically to check with Certification Authority (EC Database) whether the privacy-related component is authorized to operate together with the non-privacy-related component (e.g., for a specific application). Certificates may restrict the usage of the non-privacy-related component to certain applications (e.g., general, medical, mission critical, etc.). The certificate may be provided through an ID which is used to access the Certification Authority (EC Database). |
| SAP_PRIVACY_request_output | The non-privacy-related component can request the privacy-related component to insert user information into a specific output, for example on the screen, on the printer, or similar. In this way, the final responsibility on managing the privacy data always stays with the privacy-related component. The information may be inserted into a placeholder such that the non-privacy-related component does not have access to the privacy data. |

TABLE X3

SAP Services Primitives for SAP_Privacy_DB

| Service Primitives | Comments |
| --- | --- |
| SAP_PRIVACY_DB_Register | Register to the EC RED Database. |
| SAP_PRIVACY_DB_Deregister | De-register from the EC RED Database. |
| SAP_PRIVACY_DB_validate_certificate | A certificate from a privacy-related component can be checked, typically to check whether the privacy related SW is authorized to operate together with a specific non-privacy component, e.g., for a specific application (certificates may strict the usage of the non-privacy component to certain applications, e.g., general, medical, mission critical, etc.). The database typically validates the certificate and thus authorizes the usage in the specific context or rejects the certificate and does not authorize the usage of the privacy-related component. |

TABLE X3-continued

SAP Services Primitives for SAP_Privacy_DB

| Service Primitives | Comments |
|---|---|
| SAP_PRIVACY_DB_provide_configuration_information | A privacy related (or non privacy related) SW component may provide information on the equipment configuration to the EC RED Database, e.g., which privacy-related components are used in conjunction with non-privacy-related components. |

Figure 35:
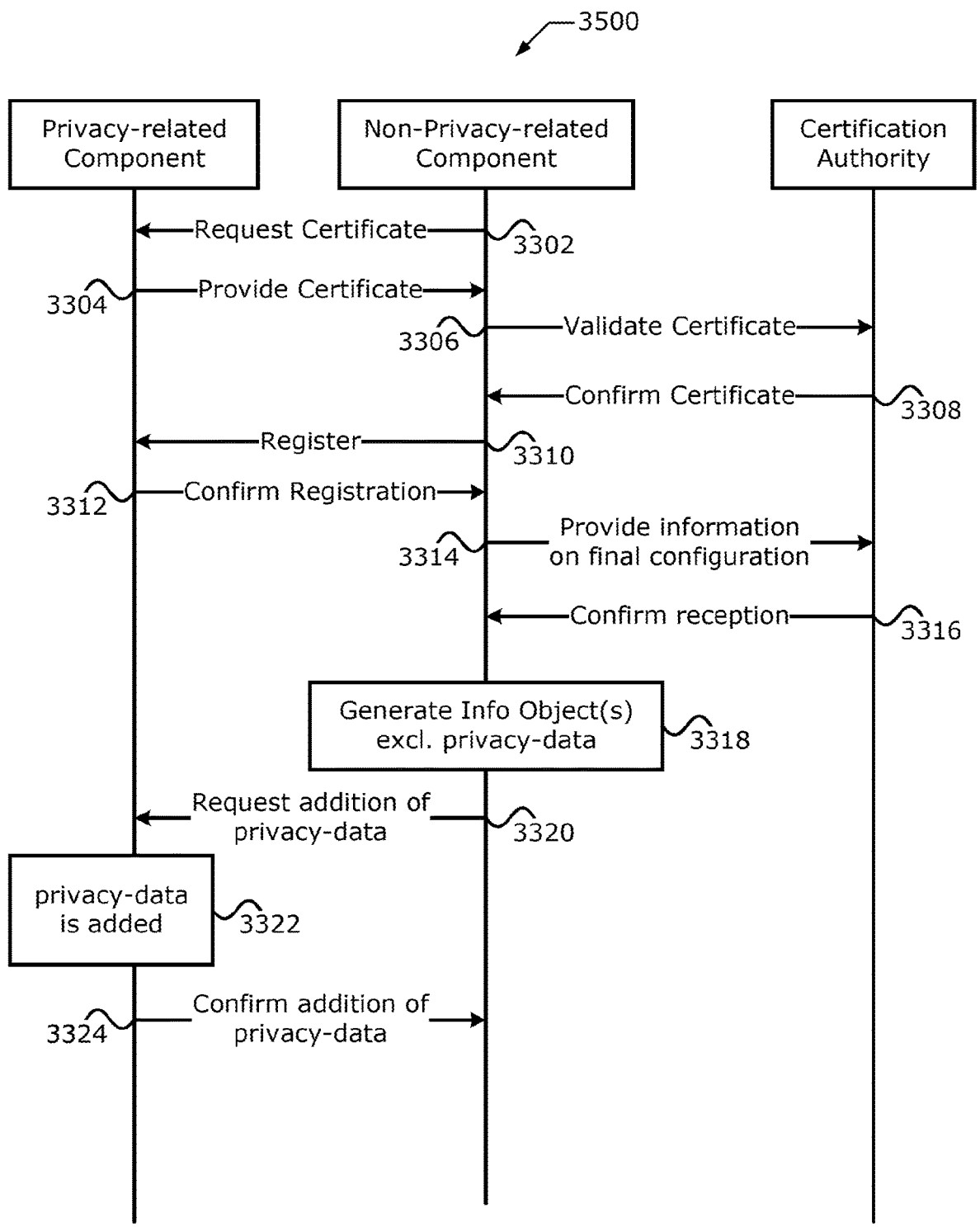
FIG. 35 illustrates an example procedure for ensuring User Privacy according to various embodiments.

FIG. 35 illustrates an example procedure 3500 for communication among the various elements of the SAP architecture 3400 of FIG. 34 according to various embodiments. Procedure 3500 begins at operation 3502 where the non-privacy-related component (NPC) sends a request for a certificate to the privacy-related component (PC), and at operation 3504, the PC provides the certificate to the NPC. At operation 3506, the NPC sends the certificate to the Certification Authority for validation, and at operation 3508, the Certification Authority sends an indication to the NPC confirming the validity of the certificate (or indicating an invalid certificate).

At operation 3510, the NPC sends a registration request to the PC based on the validity of the certificate, and at operation 3512, the PC sends an indication to the NPC confirming the registration (or indicating failure or error during the registration procedure). When registered, the NPC provides information regarding a final configuration to the Certification Authority at operation 3514, and at operation 3516, the Certification Authority sends an indication to the NPC confirming receipt of the final configuration information (or indicates error(s)/failure(s) of receipt or processing of the final configuration).

At operation 3518, the NPC generates one or more outputs excluding privacy data (e.g., personal, sensitive, or confidential information). The one or more outputs may be one or more information objects. At operation 3520, the NPC sends, to the PC, a request for the addition of privacy data to the generated information object(s). This request may include the generated information object(s) and/or some information/data identifying the privacy data required to supplement the generated information object(s). At operation 3522, the PC adds the privacy data to the generated information object(s). In some embodiments, the privacy data may be or include anonymized or pseudonymized data rather than the privacy data itself.

At operation 3524, the PC sends, to the NPC, a confirmation to add the privacy data. In some embodiments, the confirmation sent at operation 3524 comprises the generated information object(s) with the added privacy data (or anonymized or pseudonymized data). In other embodiments, the confirmation sent at operation 3524 includes anonymized or pseudonymized data that the NPC is to add to the generated output(s) (e.g., a code or code(s) for each type of privacy data for each user that is a subject of the generated information object(s)). In other embodiments, the confirmation sent at operation 3524 includes permission for the NPC to use a anonymization or pseudonymization technique for generating anonymized or pseudonymized data for inclusion in the generated information object(s). In these embodiments, the confirmation may indicate the specific anonymization/pseudonymization algorithm to be used, a set of anonymization/pseudonymization algorithms that may be used (and selected by the NPC), or permit the NPC to use a desired anonymization/pseudonymization algorithm.

9. MODULAR SOFTWARE RECONFIGURATION FOR RADIO EQUIPMENT EMBODIMENTS

The software reconfiguration approaches discussed herein enable reconfiguration of REs through software as specified in ETSI EN 303 641 V1.1.2 (2020 March) ("[EN303641]"), ETSI EN 303 648 V1.1.2 (2020 March) ("[EN303648]"), ETSI EN 303 681-1 V1.1.2 (2020 June) ("[EN303681-1]"), ETSI EN 303 681-2 V1.1.2 (2020 June) ("[EN303681-2]"), and ETSI EN 303 681-4 V1.1.2 (2020 June) ("[EN303681-4]"), and the use cases discussed in [TR103585]; the overall framework is complemented by security solutions such as those discussed in ETSI TS 103 436 V1.2.1 (2018 February) ("[TS103436]"). The specific case of Mobile Device reconfiguration is addressed in [EN303095], ETSI EN 303 146-1 V1.3.1 (2018 June) ("[EN303146-1]"), ETSI EN 303 146-2 V1.1.5 (2016 March) ("[EN303146-2]"), ETSI EN 303 146-4 V1.1.1 (2017 January) ("[EN303146-4]"), [TR103087], and [TS103436]. The software reconfiguration approaches have been designed from a holistic perspective with an emphasis on the needs of commercial equipment, addressing: technical requirements (e.g., code portability and efficiency), security requirements (e.g., security delivery and installation of software components), and regulatory requirements (e.g., technical solutions for re-certification of platforms when radio characteristics are modified).

In various implementations, reconfiguration can be performed on an individual level (e.g., users choosing among new features for their respective component) or en-mass (e.g., automatic upgrade of all platforms). Reconfigurable REs may also be tailored to the needs of the [RED], which includes articles on software reconfiguration. Specific attention is given to security requirements, addressing in particular: proof of conformance of the radio platform and radio applications to the regulatory Declaration of Conformity, considering that the set of installed radio applications can change over time; proof of the integrity of radio applications; proof of the identity of the developer of radio applications; built-in support for security updates; and prevention of code theft.

Moving from today's hardware design principles to software reconfiguration solutions will likely require a paradigm change, which can take place in a gradual step-wise approach. For example, in a first-generation implementation, the functionality may be limited to a replacement of specific (hardwired) components by executable software, designed specifically for a given target platform. Features such as secure delivery of software components and installation will be sufficient to address this need. Hardware resources (e.g., FPGA resources) are typically added to the original design to enable the replacement. Second-generation implementations may build on the first-generation implementations to design portable and yet highly (power) efficient code thanks to the Radio Virtual Machine (RVM). The RVM is a representation of a radio algorithm and may be somewhat different from other virtual machine concepts as generally applied in the computer science and IT arts. Furthermore, the level of autonomy of the platform may evolve over time, including distributed selection of the most relevant features and dynamic replacement of corresponding software components.

With the above features, the software reconfiguration solution is suited to meet the requirements of 5G and beyond applications. For example, it will enable automotive communication platforms to remain relevant over the lifetime of a vehicle and to address platform vulnerabilities which may arise over the lifetime of a vehicle, enable product adaptation to specific market needs for Internet of Things (IoT) solutions, etc.

9.1. Use Case 1—Smartphone Reconfiguration

Figure 36:
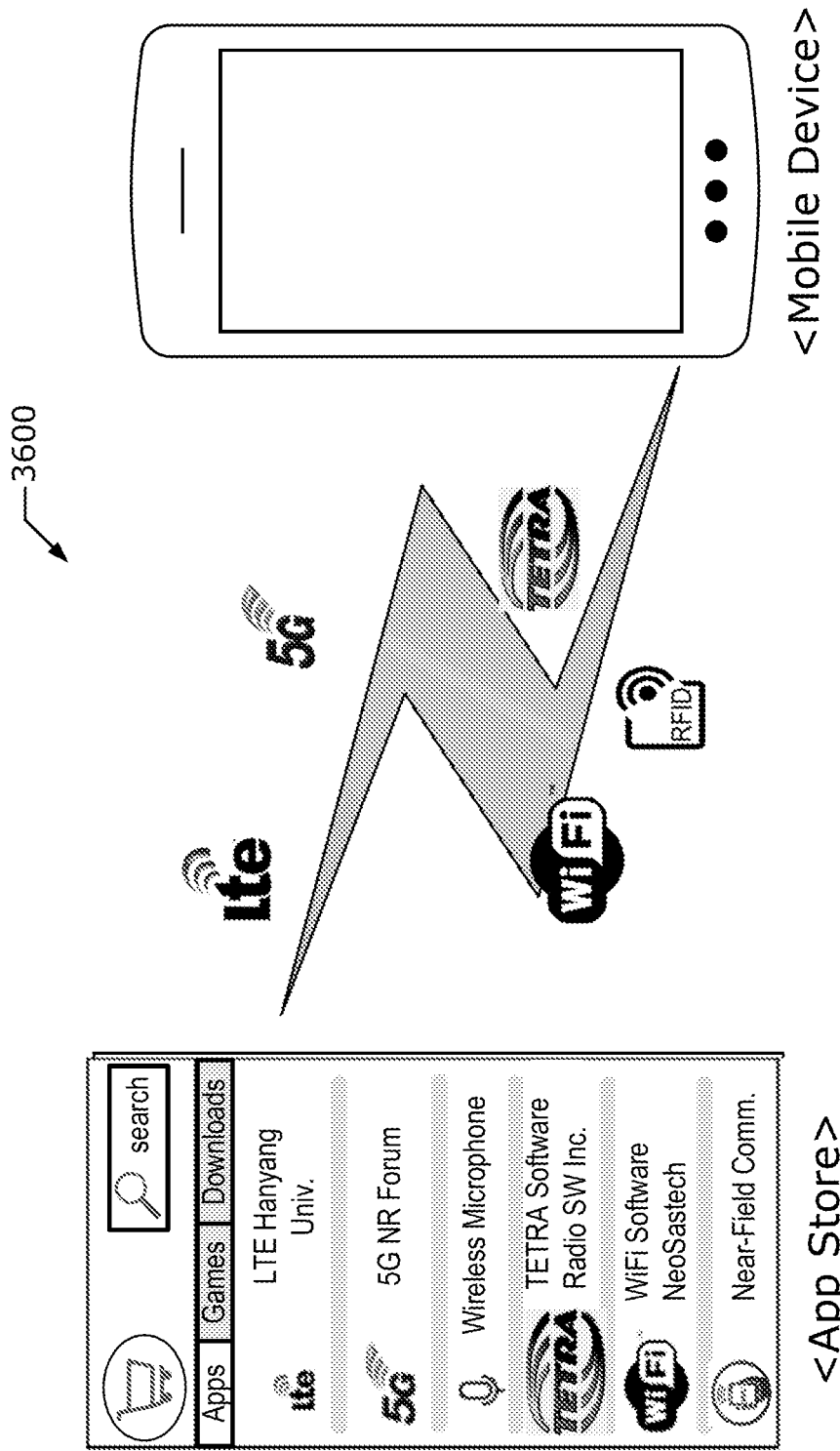
FIG. 36 illustrates an example smartphone reconfiguration use case according to various embodiments.

FIG. 36 shows an example smartphone reconfiguration use case 3600 according to various embodiments. In today's world, the usage of smartphone apps is ubiquitous. These applications, however, typically provide new tools or games to the end-user without altering any radio parameters. The ETSI software reconfiguration solution provides a framework for introducing RadioApps, i.e. applications which extend or modify existing radio features and define solutions for technical, certification and security needs.

Such RadioApps will be used to optimize the operation of a smartphone in general or for usage in a specific market with special needs. In a typical example of case i) RadioApps will be used to optimize the operation of a smartphone in response to the introduction of new features on the network side as they evolve in future releases of the 3GPP standard. In addition, the optimum configuration is identified (e.g., new power-efficient modulation and coding schemes, etc.) to meet power efficiency (see e.g., Siaud et al., "Green-oriented multi-techno link adaptation metrics for 5G heterogeneous networks", EURASIP J Wireless Com Networking, 2016, Art. No. 92, pp. 1-13 (1 Apr. 2016), available at: https://doi.org/10.1186/s13638-016-0588-2), predictable QoS and other requirements. To give an example of specific market usages, in an industrial environment, new mechanisms may be added through software reconfiguration taking the specific characteristics of the usage environment into account. Beyond the provisioning of additional modules, the ETSI framework also allows for the replacement of entire RATs in cases where sufficient computational resources are available.

9.2. Use Case 2—Automotive Applications

Automotive communication is currently a key trend in the industry. Solutions for Vehicle-to-Everything (V2X) communications, including Vehicle-to-Vehicle (V2V), Vehicle-to-Infrastructure (V2I), etc., are currently being developed with the objective to guarantee a safe(r) driving environment for the future. The challenge is to ensure that a radio communications component remains relevant over the entire lifetime of a vehicle, i.e. ten years and beyond. It is almost certain that a V2X framework feature-set will evolve within this period. Software reconfiguration will enable manufacturers to replace specific software and thus maintain related feature-sets up to date without requiring changes to the hardware. This approach reduces the overall cost for change since a vehicle does not need to be upgraded by an authorized dealer (as it would be required for hardware changes), but the process is handled through over-the-air remote control.

9.3. Use Case 3—Radio Access Network (Ran) Reconfiguration

With the evolution of wireless standards, network functions need to be updated. In this use case, the installation of RadioApps can be used to provide updated or new features which address the radio characteristics of the network. Network functions are distributed across a variety of physical entities which all require dedicated software updates for the provisioning of a specific new service. Such equipment may then be further connected to a larger network, for example through wireless or cabled backbone network access. In this use case, the network operator is able to alter or extend the functionalities of this equipment through installation of suitable RadioApps.

9.4. Use Case 4—Internet-of-Things Device Reconfiguration

Future IoT devices, including 5G and beyond, will address a substantial variety of use cases, encompassing for example gaming, voice communication, medical applications, industrial automation, etc. Each such application has its particular needs in terms of features, form factors, etc. Due to quasi-infinite possibilities, it is unlikely that chipmakers will offer tailored components for each application. Rather, a limited number of generic and reconfigurable components will be made available which are suitably tailored to the target market through software components. The ETSI software reconfiguration solution provides a suitable ecosystem to support the future IoT market needs.

9.5. Use Case 5—Radio Reconfiguration Through an External Component (e.g., USB Stick)

This use case concerns standalone radio external components that embed all the capabilities necessary to radio processing. The host device is not involved in radio processing but may configure operational parameters as allowed by the external component (e.g., a USB Stick). Thus, the separation between the host device and the external component is clear and embodied by the physical interface between the two. On the host device, only a device driver is necessary to operate the external component and integrate it into the networking stack. In order to reconfigure the external component, the host device may be used as a staging area to store Radio Applications which are then loaded on the external component via the device driver (e.g., the device driver may leverage the Administrator).

9.6. Use Case 6—Reconfigurable Satellite Telecom Payload

Figure 37:
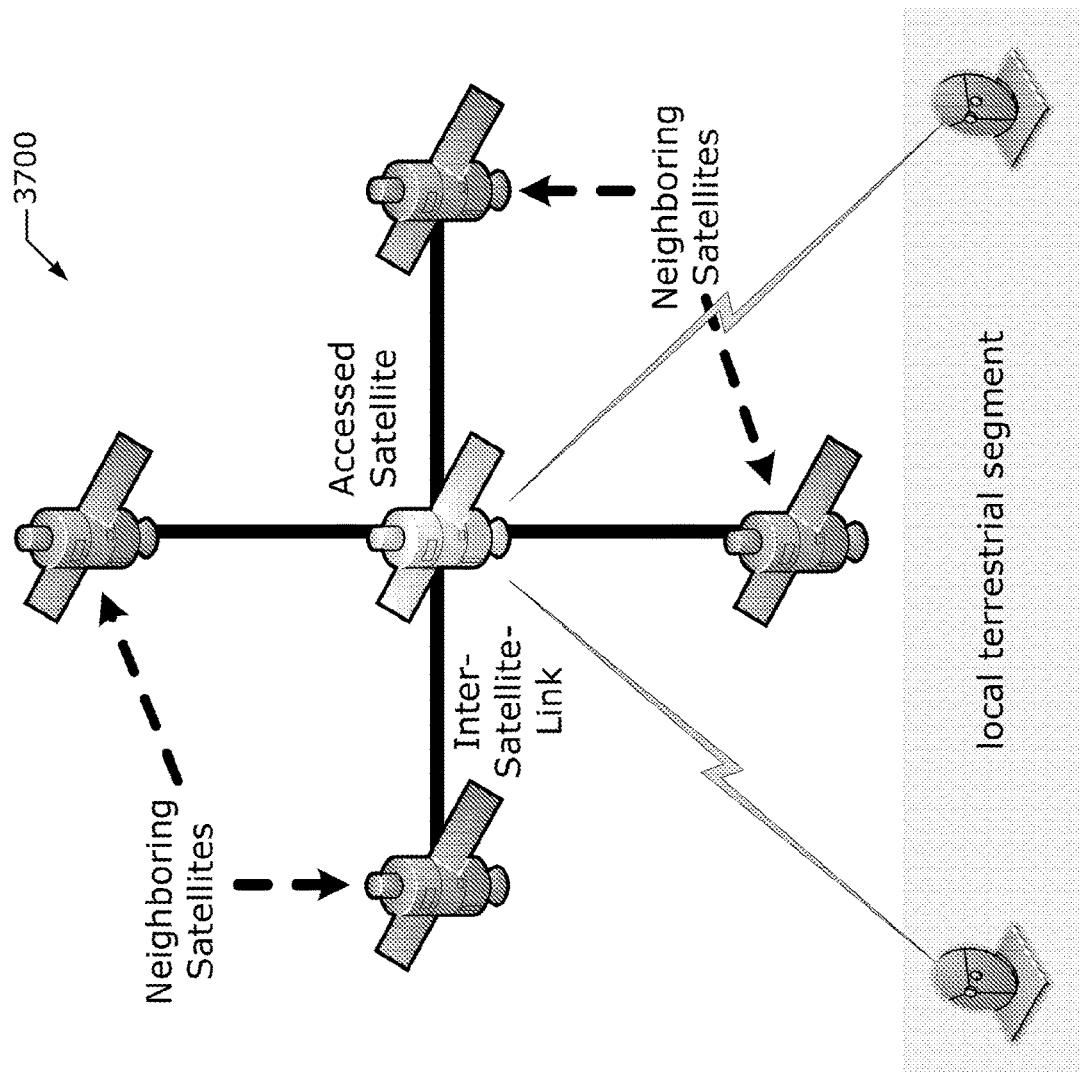
FIG. 37 illustrates an example of software reconfiguration enabling satellite telecom payload according to various embodiments.

FIG. 37 shows an example of software reconfiguration enabling satellite telecom payload according to various embodiments. The lifetime of satellites varies from a few years for Low Earth Orbiting (LEO) satellites until 10 or even 15 years for Geostationary Earth Orbit (GEO) satellites. This fact and the rapid progress in the field of digital communications raise the problem of technological obsolescence of onboard telecom payload. The emergence of new signal processing algorithms and new standards that provide reliable and high-speed transmission of information requires the reconfiguration of the onboard equipment. Satellite communication systems are considered as a part of the global network infrastructure with the integrated satellite segment. Therefore, they should be provisioned within the same management framework as the terrestrial segment, including the management approach for radio software reconfiguration.

9.7. Use Case 7—Bug-Fix and Security Updates

Bug-fixes and security updates are essential to the maintenance of software, and as such also for a Radio Application throughout its lifecycle. Bug-fixes help ensure that Radio Applications will behave according to specification even after the Radio Application has been installed on a device. Security updates help ensure the integrity of an implementation. Application security is an evolving field and implementations believed to be secure at some point in time may later become insecure as new attack methods are devised.

9.8. Use Case 8—Medical Applications

Medical applications, such as remote surgery, monitoring of patient's life support data, etc. require highly reliable and stable communication systems. Still, software reconfiguration is expected to be broadly applied in order to enable users to have access to latest software updates and best possible functionalities. For example, in this context it is of specific importance to immediately remedy any incorrect behavior or security vulnerabilities in order to ensure a maximum level of protection.

10. COMPUTING SYSTEM AND HARDWARE CONFIGURATIONS

Figure 38:
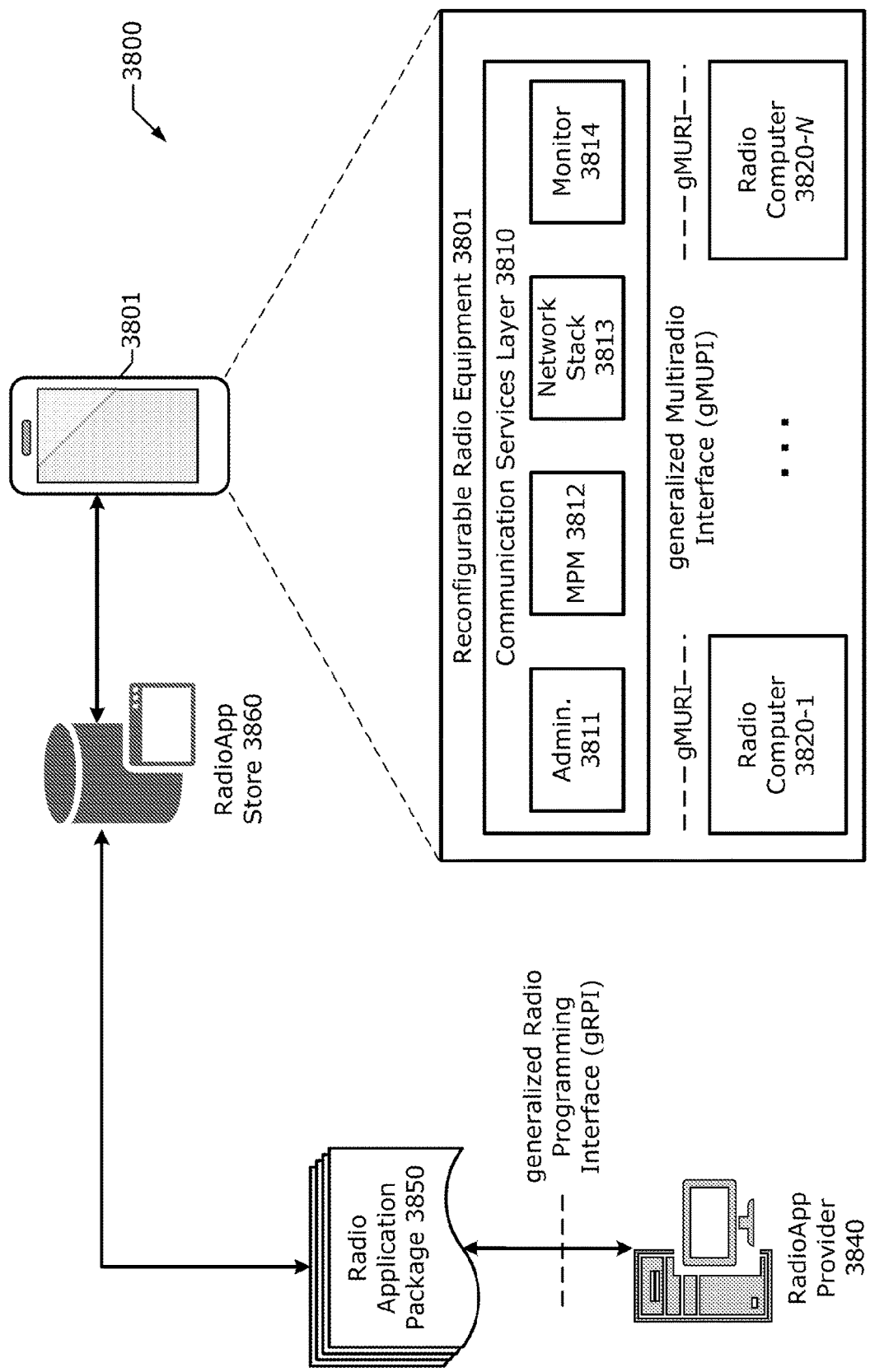
FIG. 38 illustrates an example reconfigurable radio equipment architecture according to various embodiments.

FIG. 38 shows an example reconfigurable RE (RRE) architecture 3800 including four sets of interfaces, according to various embodiments.

The RRE 3801 may include one or more radio computers 3820 (including radio computers 3820-1 to 3820-N where N is a number) for supporting distributed computations (see e.g., [EN303648]). The RRE 3801 is capable of running multiple radios simultaneously (e.g., Radio Computers 1-N, where N is a number), changing the set of radios by loading new Radio Application Packages (RAP) 3850 and setting their parameters. For the specific case of Mobile Device Reconfiguration as given in [EN303095], [EN303146-1] to [EN303146-4], [TR103087], and [TS103436], only a single Radio Computer is used in the target platform.

Each radio computer 3820 can execute the Radio Application (RA) code including various functional blocks of which the granularities might be all different depending upon hardware platform vendors—depending on the features provided by radio equipment manufacturers, the (3rd party) software manufacturer develops the entire or partial RA code using the standard programming interfaces as depicted in FIG. 38. A modular software approach is applied in order to maximize the reusability of software components. The evolution of RATs can be supported by adding and/or replacing the functional blocks on a given hardware platform.

A RAP 3850 is a delivery unit of a Radio Application (RA), which may, upon execution of the RA, reconfigure the radio communications technologies of the RE 3801. An RA is software that enforces the generation of the transmit radiofrequency (RF) signals or the decoding of the receive RF signals The software is executed on a particular radio platform or an radio virtual machine (RVM) as part of the radio platform.

RAs are applications (apps) that may access low-level parameters of REs 3801 in order to update or otherwise alter how the RE 3801 uses its radio technology or individual radio computer(s) 3820. In this example, RE 3801 reconfiguration through RAs is implemented via the RadioApp Store 3860, which is an extension of the app store concept used for most mobile device platforms, such as smartphones and tablet computers, wherein a user may access an RA from the RadioApp Store 3860 through a gRPI to download and install RAs.

RAs may have different forms of representation including, for example, source code including Radio Library calls of Radio Library native implementation and Radio HAL calls; as Intermediate Representations (IRs) including Radio Library calls of Radio Library native implementation and radio HAL calls; and/or as executable codes for a particular radio platform. All RAs are called Unified Radio Applications (URAs) when they exhibit a common behaviour from the RRE's 3801 point of view in [EN303648]. A URA is an RA that complies with the RRE framework defined in the present disclosure and/or a suitable standard/specification such as ETSI EN 303 681-3 V1.1.2 (2020 March) ("[EN303681-3]") and/or the like. In order to run multiple URAs, the RRE 3801 includes a Communication Services Layer (CSL) 3810 and one or more radio computers 3820, each of which includes a Radio Control Framework (RCF) (see e.g., radio platform 3910 of FIG. 39) and Radio Platform (see e.g., radio platform 3920 of FIG. 39).

The CSL 3810 is a layer related to communication services supporting generic applications. The CSL 3810 supports generic applications like Internet access, enterprise network access, and/or the like. The CSL 3810 introduces functionalities for the (de-)installation, selection and configuration of software components and the management of the data flows (see e.g., [EN303648]). The CSL 3810 includes Administrator entity (admin) 3811, Mobility Policy Manager entity (MPM) 3812, a networking stack entity (NetStack) 3813, and a monitor entity 3814.

The admin 3811 may request installation or uninstallation of URAs, and create or delete instances of URAs. This includes provisioning information about the URAs, URA statuses, and/or other like URA-related information. Additionally, the admin 3811 includes two sub-entities: an Administrator Security Function (ASF) and an RRS Configuration Manager (RRS-CM). The ASF is sub-entity of the admin 3811 on the device end-point responsible for ensuring confidentiality, integrity, and authenticity of assets such as the RE Configuration Policy, and RAP(s), and supporting the non-repudiation, remote attestation, and configuration enforcement strategies. This may include direct and indirect interactions related to security with the RadioApp Store 3860 and other security related entities associated with the RadioApp Store 3860. In addition to supporting operations related to asset protection, the ASF acts as a proxy to other security functions on the platform, as detailed in [TR103087]. The RRS-CM is sub-entity of the admin 3811 in charge of long-term management as discussed in clause 11 of [TR103087]. In case that a snapshot function is required, the admin 3811 may store relevant RAPs, their configuration parameters and information on the URA installation and execution history. When required, the same steps can be executed by the admin 3811 to fall back to a previous snapshot.

The MPM 3812 includes functions for monitoring of the radio environments and RE capabilities, functions for requesting activation or deactivation of URA, and functions for providing information about URA lists. The MPM 3812 also makes selections among different RATs and discover peer communication equipment and arrangement of associations. Here, the "association" is a logical communication link to a RAN or a peer equipment. Some control signalling may be necessary to maintain the association, and no user data transfer may occur with only an association present, but a data flow may be established into an association for this purpose. Additionally, "peer equipment" refers to any communication counterpart of a RRE 3801, which can be reached by establishing a logical communication link (e.g., an association) between the RRE 3801 and peer equipment. In addition, the MPM 3812 may request a computational/spectral load balancing among baseband processors and RF transceivers in one or more radio platforms (see e.g., FIG. 39) when the number of baseband processors and RF transceivers in radio platform exceeds one. The requirement for computational and/or spectral resources varies depending on the situation of each base station in the case of network application. For example, the required traffic of each base station can rapidly and unexpectedly vary due to natural disasters, sports games, accidents, etc. When the RRE 3801 is shared with multiple stakeholders (e.g., multiple network operators share a single network infrastructure), the policy of using both computational and spectral resources may have to be controlled for a desired performance requirement at each operation.

The NetStack 3813 includes functions for sending and receiving user data. The NetStack 3813 translates radio computer identifiers (IDs) to corresponding target network addresses, and vice versa. The NetStack 3813 also manages data flows for basic TX/RX operation. The requirement is described in clause 6.2.4 of [EN303641]. The monitor 3814 includes functions to transfer information from URAs to user or proper destination entities in the RE 3801. In addition, in case that distributed computation is applied, the monitor 3814 receives the computational/spectral resource usage status. In some implementations, a non-real time OS is used for execution of the admin 3811, MPM 3812, NetStack 3813, and monitor 3814 which are part of the CSL 3810 as described previously.

A Radio Controller (RC) is a functional component of an RA for transferring context information from corresponding RAs to monitor. The RC in an RA ensures the availability of context information (see e.g., clause 6.2.5 of [EN303641]). An RC, which may operate in computational resources in non real-time, accesses RAs which operates in radio computer in real time. The monitor 3814, to which the context information is transferred using an RC, provides context information to the admin 3811 and/or MPM 3812 for application(s) to be performed using the context information, for example, terminal-centric configuration.

Figure 39:
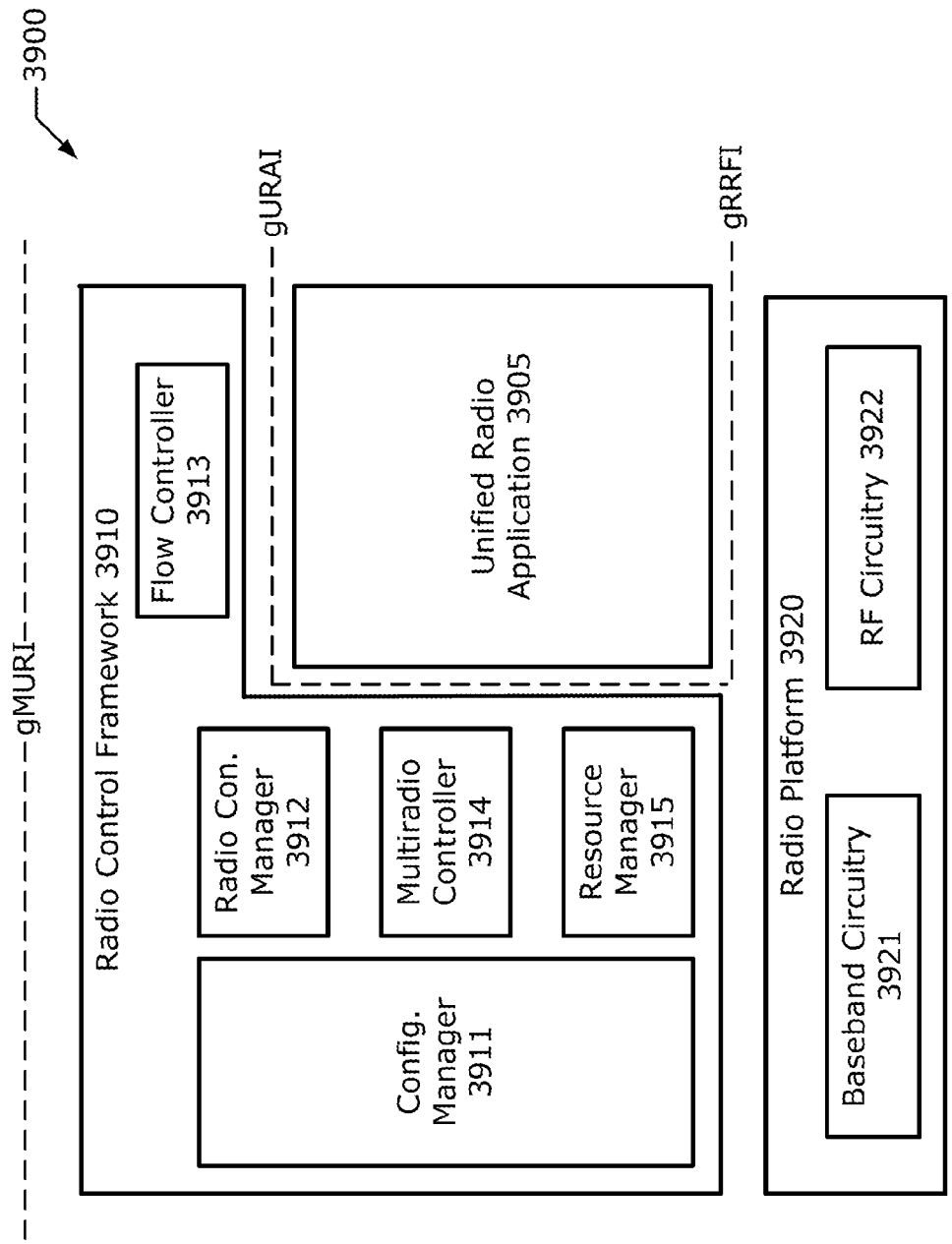
FIG. 39 illustrates an example radio computer architecture according to various embodiments.

A radio computer 3820 is the part of the RE 3801 hardware working under ROS control and on which RAs are executed. The part of RE 3801 hardware working under operating system (OS) control and on which Applications, among others, are executed are referred to as "Computational Resources". The operation of Computational Resources is performed by a given OS, which is performed on non-real-time basis, whereas radio computer(s)'s 3820 operation is performed by another OS, which should support real-time operations of URA. The OS of radio computer(s) 3820 is referred to as a Radio OS (ROS) and/or Real-time OS (RTOS) in the present disclosure and can belong to its own radio computer 3820. The radio computer(s) 3820 include the following components: an ROS and/or RTOS and the five entities of the RCF 3910, specified in clause 4.2.3 of [EN303648] and discussed infra with respect to FIG. 39, are classified into two groups. One group relates to realtime execution and the other group to non-real-time execution as shown by FIG. 4.3.1-1 of [EN303648]. The particular entities of the RCF interface related to real-time and non-real-time execution, can be determined by each vendor. The ROS/RTOS enables management of timing constraints and provides interface between URA and the Radio Platform. The requirements are described in clauses 6.4.9 and 6.2.6 of [EN303641]. Other aspects of the radio computer(s) 3820 are discussed in [EN303648].

The RRE 3801 also includes four sets of interfaces or reference points for the interconnections among the elements of the RRE 3801. These interfaces include the generalized Multiradio Interface (gMURI), which is an interface CSL 3810 and an RCF 3910 of each radio computer 3820 (see e.g., [EN303681-1]).

The generalized Radio Programming Interface (gRPI) is an interface/reference point allowing an independent and uniform production of RAs (see e.g., [EN303681-4]). For example, a RadioApp provider 3840 (e.g., an RA developer, etc.) may produce one or more Ras and/or RAPs 3850, which may be provided to the RadioApp store 3860. One or more RAPs 3850 may be provided to the RadioApp Store 3860 via the gRPI, and the RE 3801 may request and download RAPs 3850 generated by the RadioApp provider 3840 from the RadioApp Store 3860 via a predetermined link. The other interfaces are discussed infra with respect to FIG. 39.

FIG. 39 shows an example radio computer architecture 3900 according to various embodiments. The radio computer architecture 3900 may correspond to each of the radio computer(s) 3820 of FIG. 38. The radio computer architecture 3900 includes a Radio Control Framework (RCF) 3910, a URA 3905, and a radio platform 3920

The RCF 3910 is control framework which, as a part of the OS (e.g., ROS, RTOS, and/or platform/application OS), extends OS capabilities in terms of radio resource management. The RCF 3910 provides a generic environment for the execution of URA 3905, and a uniform way of accessing the functionality of the radio computer 3900 and individual RAs. The RCF 3910 provides services to CSL 3810 via the gMURI. The RCF 3910 manages the actual software execution through a number of functionalities discussed in [EN303648].

The RCF 3910 is a control framework that includes Configuration Manager entity (CM) 3911, Radio Connection Manager entity (RCM) 3912, Flow Controller entity (FC) 3913, and Multiradio Controller entity (MRC) 3914. The RCF 3910 may also include a Resource Manager entity (RM) 3915, however in some implementations the RM 3915 is part of an OS (e.g., ROS, RTOS, and/or platform/application OS). The CM 3911 includes functions for installing/uninstalling and creating/deleting instances of URA 3905 as well as management of and access to the radio parameters of the URA 3905. The RCM 3912 includes functions for activating/deactivating URA 3905 according to user requests, and to management of user data flows, which can also be switched from one RA to another. A "data flow" refers to a logical channel between the FC 3913 and the URA 3905 created by the FC 3913 to send to or receive data elements (octets, packets or other granularity) from the URA 3905. The FC 3913 includes functions for sending and receiving user data packets and controlling the flow of signalling packets (e.g., data flows and the like). The MRC 3914 include at least functions to schedule the requests for radio resources issued by concurrently executing URA 3905, and to detect and manage the interoperability problems among the concurrently executed URA 3905. In addition, for distributed computation cases, the MRC 3914 includes a function to report spectral resource usage status. The RM 3915 includes functions to manage the computational resources, to share them among simultaneously active URA, and to guarantee their real-time execution. In addition, for distributed computation cases, RM 3915 includes a function to report computational resource usage status.

The RCF 3910 may represent functionalities provided by the radio computer 3900, and may require all RAs to be subject to a common reconfiguration, multiradio execution and resource sharing strategy framework depending on the concerned Radio Equipment Reconfiguration Class (RERC). Since all RAs exhibit a common behaviour from the RRE perspective, those RAs are called URAs 3905. The services relate to activation and deactivation, peer equipment discovery and maintenance of communication over user data flows are provided at generalized Unified Radio Application Interface (gURAI), which is an interface between the URA 3905 and the RCF 3910 (see e.g., [EN303681-3]). The URA 3905 represents the software downloaded and installed onto the target platform as in discussed in [EN303648]. A URA 3905 includes one or more RAs, and a plurality of RAs may be referred to as URA when the RAs exhibit common attributes, characteristics, or requirements related to the reconfiguration of the MD. As used herein, "URA" may be used interchangeably with "RA". An "RA" may also be referred to as "RA component(s)", "RRS component(s)", and the like.

The services provided by the URA 3905 may be related to activation and deactivation, peer equipment discovery, and/or maintenance of communication over user data flows, which may be provided at the gURAI interface between the URA 3905 and the RCF 3910. In some cases, these services may be provided to the CSL 3810 via the gMURI between the RCF 3910 and the CSL 3810.

Figure 41:
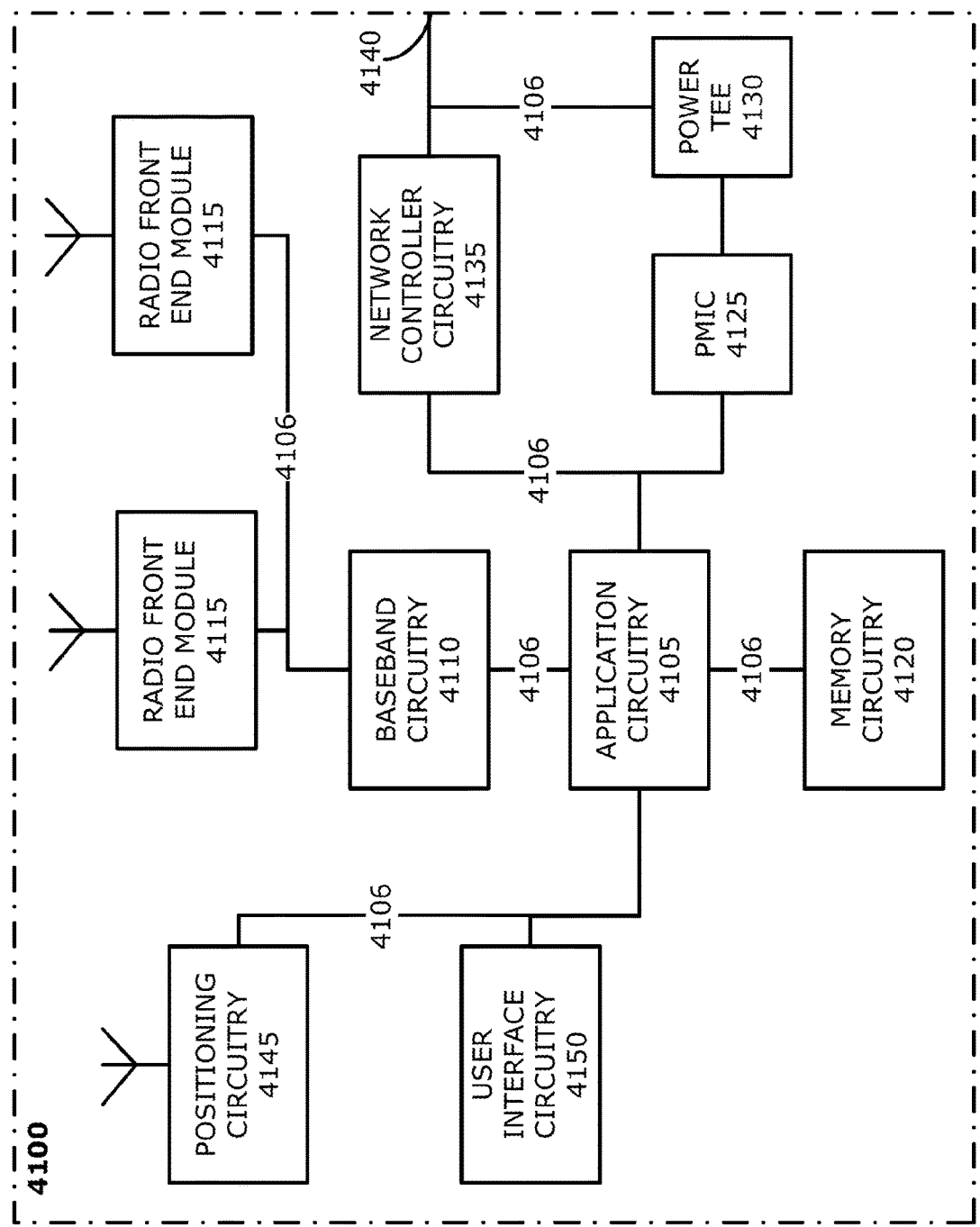
FIGS. 41 and 42 depict example components of various compute nodes in edge computing system(s).

The RAs are applications that, when executed by one or more processors (e.g., baseband circuitry 3921 or the processor circuitry discussed infra with respect to FIGS. 41 and/or 42) may control generation and transmission of transmit (Tx) RF signals, control receipt of receive (Rx) RF signals, and the decode the Rx RF signals. The RAs may be executed/operated in a radio virtual machine (RVM) that is part of the radio platform 3920. The RVM is a controlled execution environment that allows RAs to access low-level radio parameters. The RVM may be an abstract machine independent of the hardware, which is capable of executing configcodes. In some implementations, the RVM may be an abstract machine that can be configured by configcodes into an RA. The implementation of the RVM is radio computer-specific and may include a compiler (e.g., a front-end compiler or back-end compiler), which may provide Just-in-Time (JIT) or Ahead-of-Time (AOT) compilation of configcodes into executable codes.

The RAs may have different forms of representation including, for example, source codes (also referred to as "RA codes"), intermediate representations (IRs), and executable codes for a particular radio platform. The RAs may comprise RA codes including of User Defined Functional Blocks (UDFBs), Standard Functional Blocks (SFBs), radio controller (RC) codes, and/or executable codes depending on the RA design choice. In some implementations, an RA may be expressed as a set of interconnecting SFBs together with one or more UDFBs. In some implementations, a radio library may include some or all of the SFBs, and the SFBs to be provided from the radio library may be represented in a platform-independent normative language. The native implementation of the radio library may be provided as platform-specific codes of the SFBs for the radio platform 3920. The radio library may be located in the radio computer circuitry 3820, and in some implementations, the radio library may be a part of the RVM. The RC codes may be used to send context information to the monitor 3814 and send/receive data to/from the net stack 3813. The RC codes may be executed in a non-real-time environment (e.g., application/host circuitry of the UE/RE 3801), and the remaining portion of the RAs may be executed in the real-time environment (e.g., the radio platform 3920).

Compiling the source codes of an RA may yield configcodes. When an RA provider develops high level code based on a target platform (e.g., radio platform 3920), a result of compiling the RA source codes or URA 3905 codes is configcodes that is executable on the target platform (e.g., radio platform 3920). In addition, the RE 3801 may support different types of RA source codes or URA 3905 codes wherein some RAs and/or URA 3905 may run directly on the ROS as executable codes while others may run as an RVM configured by configcodes. When the RA provider develops high level code without considering a target platform, a result of front-end compiling of RA source codes is an IR, which may be back-end compiled for operating on a specific target platform. In this case, the configcodes may be configuration codes of an RVM instance. Back-end compilation may occur within the radio computer circuitry 3900 or by a cloud computing service.

According to various embodiments, an RA provider may generate an RAP 3850, which may be a delivery unit of an RA from the RadioApp Store 3860 to the RE 3801. As used herein, the term "RAP" may be used interchangeably with RA and may be referred to as RAP 3850. A RAP 3850 may include RA codes of an RA and configuration metadata for the RE 3801. The metadata may include radio programming interface (RPI) information, which is a descriptive interface detailing how the RA is structured and how its sub-components are synchronized together; bindings to the hardware abstraction layer (HAL), when applicable; bindings to linkable libraries, when applicable; and a pipeline configuration. RAPs 3850 may be provided to the RadioApp Store 3860 via the RPI, and the RE 3801 may request and download RAPs 3850 generated by an RA provider from the RadioApp Store 3860 via a predetermined link. According to various embodiments, the configuration metadata may include a DoC that is associated with the RE 3801 and also indicates installation parameters of the RA component included in the RAP 3850. In other embodiments, the DoC may be separate from the RAP 3850, but provided to the RE 3801 in a same digital signature as the RAP 3850. In other embodiments, the DoC may be access from a remote resource.

In some implementations, the RE 3801 may compile a RAP 3850 to generate executable code for the radio platform 3920. In such implementations, URA 3905 configcodes may be downloaded to the radio computer circuitry 3900 in the form of source code or IR, and may be transformed into corresponding executable code through the compiler. Where URA 3905 configcodes are source codes or IR, the source codes or IR may be compiled at a RE 3801 or compiled by a cloud computing service. When the compilation process is performed by a cloud computing service (not within the radio computer), the URA 3905 configcodes may be downloaded into the radio computer circuitry 3900 in the form of executable code as a result of the compilation at the cloud (not shown). In this case, the compiler and radio library may not be included in the RE 3801, and instead, the vendor of the radio platform 3920 may provide the compiler and the radio library at the cloud in accordance with the radio platform 3920.

The radio platform 3920 is the part of RE 3801 hardware that relates to radio processing capability, including programmable hardware components, hardware accelerators, RF transceiver, and antenna(s). The radio platform 3920 comprises hardware capable of generating RF signals or receiving RF signals, including baseband and RF processing. By nature, it is heterogeneous hardware including different processing elements such as fixed accelerators (e.g., ASICs, or reconfigurable accelerators such as FPGAs, programmable SoCs, etc.). In case of multiple radio computers 3900, there is an independent radio platform 3920 for each of the radio computers 3900.

The radio platform 3920 comprises baseband circuitry 3921 and radiofrequency (RF) circuitry 3922 (or RF transceiver 3922). The baseband circuitry 3922 may be processor circuitry that may implement one or more layer operations that are "below" layer operations of a network protocol stack 3813. These operations may include, for example, PHY operations, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The RF transceiver 3922 is the part of radio platform 3920 that converts baseband signals from the baseband circuitry 3922 into radio signals for transmission, and converts received radio signals into baseband signals for processing by the baseband circuitry 3922. The RF transceiver 3922 manages input/output signals from/to one or several RAs. Several RAs that are simultaneously in active state may be served by one or multiple RF transceivers 3922. The generalized Reconfigurable Radio Frequency Interface (gRRFI) is an interface between URA 3905 and RF Transceiver(s) 3922 (see e.g., [EN303681-2]). This interface enables the exchange of control and data information between the RAs and the RF transceiver 3922.

The baseband circuitry 3921 and/or RF circuitry 3922 may include hardware elements such as digital signal processors (DSPs), Application Specific Integrated Circuit (ASICs), a field-programmable gate array (FPGAs), radiofrequency integrated circuits (RFICs), and/or other hardware element.

Figure 40:
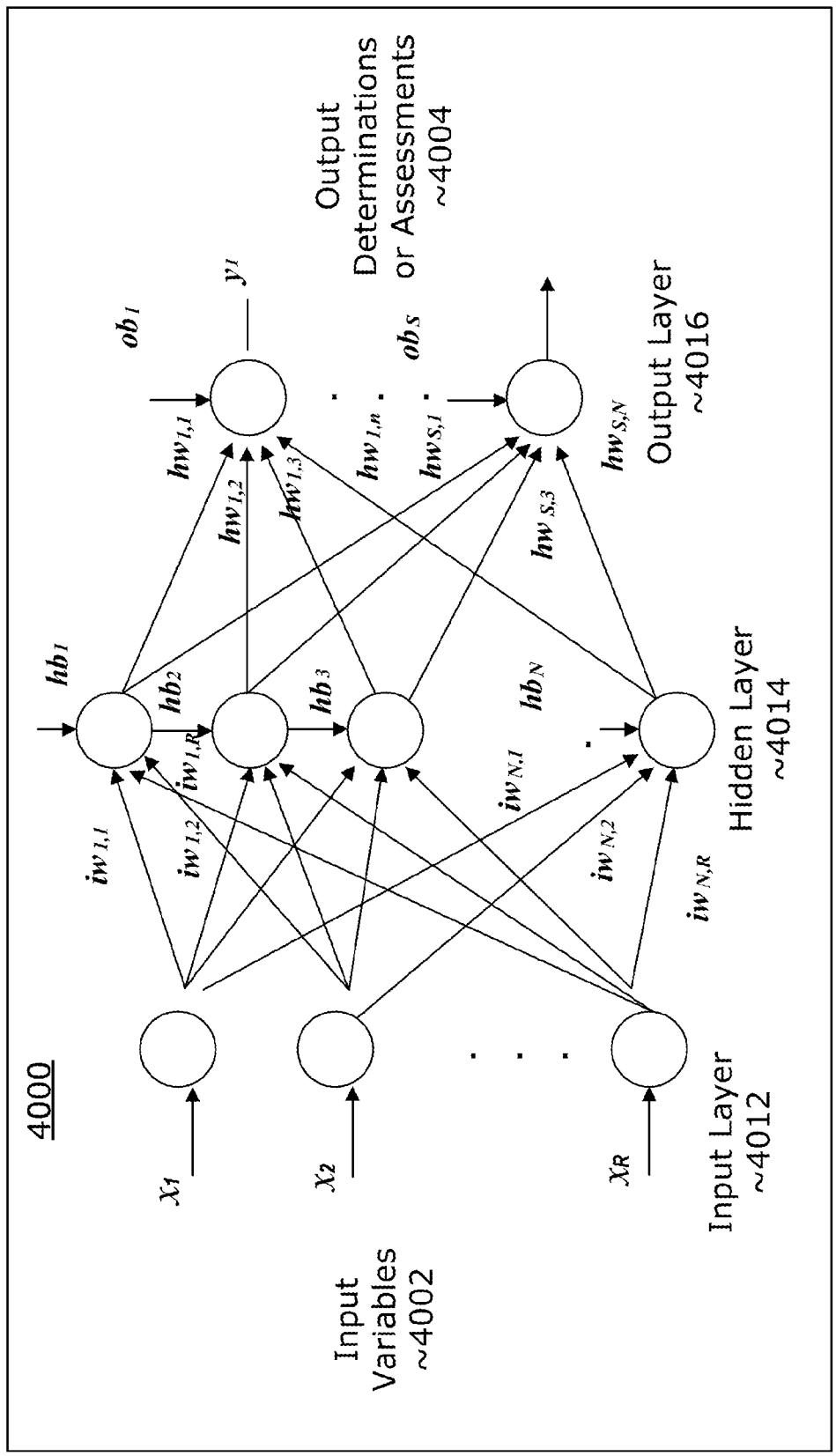
FIG. 40 illustrates an example neural network suitable for practicing the various embodiments discussed herein.

FIG. 40 illustrates an example NN 4000 suitable for use by a UVCS and/or an ITS-S (such as those discussed previously), in accordance with various embodiments. NN 4000 may be suitable for use by one or more of the subsystems and/or the various embodiments discussed herein, implemented in part by a hardware accelerator of a UVCS module. As shown, example NN 4000 may be a multi-layer feedforward NN (FNN) comprising an input layer 4012, one or more hidden layers 4014 and an output layer 4016. Input layer 4012 receives data of input variables ($x_i$) 4002. Hidden layer(s) 4014 processes the inputs, and eventually, output layer 4016 outputs the determinations or assessments ($y_i$) 4004. In one example implementation the input variables ($x_i$) 4002 of the NN are set as a vector containing the relevant variable data, while the output determination or assessment ($y_i$) 4004 of the NN are also as a vector. As an example, the multi-layer FNN may be expressed through the following equations:

$$ho_i = f(\Sigma_{j=1}^{R}(iw_{i,j}x_j) + hb_i), \text{ for } i=1,\ldots,N$$

$$y_i = f(\Sigma_{k=1}^{N}(hw_{i,k}ho_k) + ob_i), \text{ for } i=1,\ldots,S$$

In these equations, $ho_i$ and $y_i$ are the hidden layer variables and the final outputs, respectively. $f(\ )$ is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

In this equation, $y_{kp}$ and $t_{kp}$ are the predicted and the target values of pth output unit for sample k, respectively, and m is the number of samples.

In embodiments, the NN 4000 is used for one or more subsystems, such as subsystems of an RE such as those discussed herein. The input variables ($x_i$) 4002 may include various sensor data collected by various embedded or accessible sensors, data obtained via the message exchanges (e.g., the various MCMs discussed previously), as well as data describing relevant factors to a decision. The output variables ($y_i$) 4004 may include determined response (e.g., adjusting speed, braking, changing lane(s), and so forth). The network variables of the hidden layer(s) for the NN 4000, are determined by the training data.

In one example, the NN 4000 is used for the motion detection based on the y sensor data obtained from the one or more sensors. In another example, the NN 4000 is used for object detection/classification. The object detection or recognition models may include an enrollment phase and an evaluation phase. During the enrollment phase, one or more features are extracted from the sensor data (e.g., image or video data). A feature is an individual measureable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

In another example, the NN 4000 is used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and/or the like.

In the example of FIG. 40, for simplicity of illustration, there is only one hidden layer in the NN. In some other embodiments, there can be many hidden layers. Furthermore, the NN can be in some other types of topology, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), and so forth.

Figure 42:
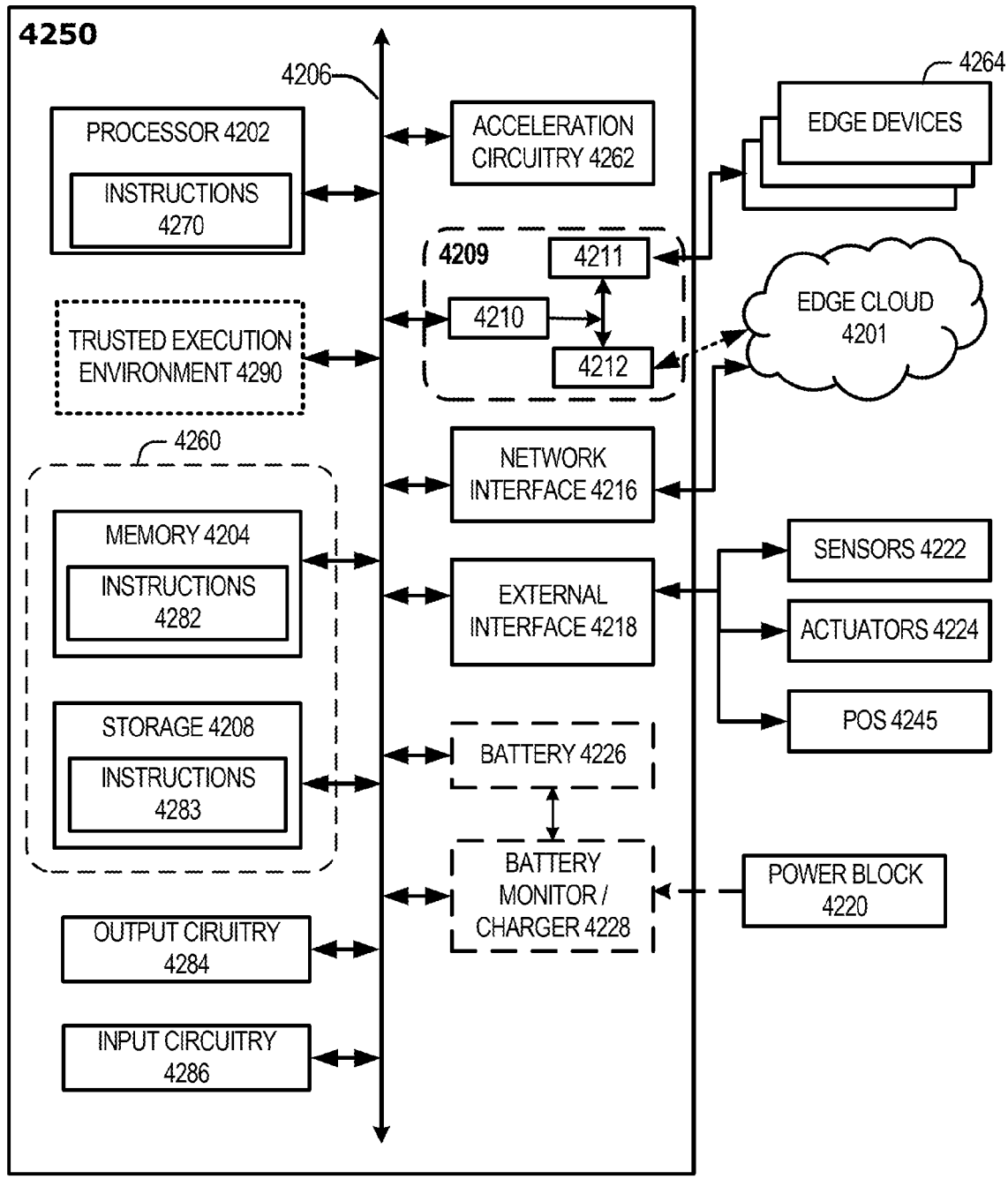

FIGS. 41 and 42 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

FIG. 41 illustrates an example of infrastructure equipment 4100 in accordance with various embodiments. The infrastructure equipment 4100 (or "system 4100") may be implemented as (or correspond to) NANs 4331-4333 of FIG. 43, the NANs shown by various ones of FIGS. 1-37, a base station, RSU, R-ITS-S, radio head, relay station, server, gateway, a network appliance, an IoT device, an edge compute node (e.g., edge server/host, MEC host, etc.), and/or any other element/device discussed herein.

The system 4100 includes application circuitry 4105, baseband circuitry 4110, one or more radio front end modules (RFEMs) 4115, memory circuitry 4120, power management integrated circuitry (PMIC) 4125, power tee circuitry 4130, network controller circuitry 4135, network interface connector 4140, positioning circuitry 4145, and user interface 4150. In some embodiments, the device 4100 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 4105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 4105 may be coupled with or may include memory/storage elements and may be configured to execute instructions stored in the memory/storage to enable various applications or operating systems to run on the system 4100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 4105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 4105 may comprise, or may be, a special-purpose processor/controller to operate according to the various embodiments herein. As examples, the processor(s) of application circuitry 4105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 4100 may not utilize application circuitry 4105, and instead may include a special-purpose processor/controller to process IP data received from an EPC or 5GC, for example.

In some implementations, the application circuitry 4105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 4105 may comprise logic blocks or logic fabric, and other interconnected resources that may be programmed to perform various functions, such as the procedures, methods, functions, etc. of the various embodiments discussed herein. In such embodiments, the circuitry of application circuitry 4105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. XS1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 4105 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 4110 may be implemented, for example, as a solder-down substrate including one or more integrated circuits, a single packaged integrated circuit soldered to a main circuit board or a multi-chip module containing two or more integrated circuits. The baseband circuitry 4110 includes one or more processing devices (e.g., baseband processors) to carry out various protocol and radio control functions. Baseband circuitry 4110 may interface with application circuitry of system 4100 for generation and processing of baseband signals and for controlling operations of the RFEMs 4115. The baseband circuitry 4110 may handle various radio control functions that enable communication with one or more radio networks via the RFEMs 4115. The baseband circuitry 4110 may include circuitry such as, but not limited to, one or more single-core or multi-core processors (e.g., one or more baseband processors) or control logic to process baseband signals received from a receive signal path of the RFEMs 4115, and to generate baseband signals to be provided to the RFEMs 4115 via a transmit signal path. In various embodiments, the baseband circuitry 4110 may implement a an Radio OS (ROS) and/or real-time OS (RTOS) to manage resources of the baseband circuitry 4110, schedule tasks, etc. Examples of the ROS/RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 41, in one embodiment, the baseband circuitry 4110 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 4115 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 4115 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 4110 and/or RFEMs 4115. The baseband circuitry 4110 may also support radio communications for more than one wireless protocol.

Continuing with the aforementioned embodiment, the baseband circuitry 4110 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 4150 may include one or more user interfaces designed to enable user interaction with the system 4100 or peripheral component interfaces designed to enable peripheral component interaction with the system 4100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 4115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 4115, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 4110 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 4120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 4120 may be implemented as one or more of solder down packaged integrated circuits, socketed memory modules and plug-in memory cards.

The memory circuitry 4120 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 4100, an operating system of infrastructure equipment 4100, one or more applications, and/or for carrying out the embodiments discussed herein. The computational logic may be stored or loaded into memory circuitry 4120 as instructions for execution by the processors of the application circuitry 4105 to provide or perform the functions described herein. The various elements may be implemented by assembler instructions supported by processors of the application circuitry 4105 or high-level languages that may be compiled into such instructions. The permanent copy of the programming instructions may be placed into persistent storage devices of memory circuitry 4120 in the factory during manufacture, or in the field through, for example, a distribution medium (not shown), through a communication interface (e.g., from a distribution server), and/or over-the-air (OTA).

As discussed in more detail infra, infrastructure equipment 4100 may be configured to support a particular V2X RAT based on the number of vUEs 121 that support (or are capable to communicate) the particular V2X RAT. In embodiments, the memory circuitry 4120 may store a RAT configuration control module to control the (re)configuration of the infrastructure equipment 4100 to support a particular RAT and/or V2X RAT. The configuration control module provides an interface for triggering (re)configuration actions. In some embodiments, the memory circuitry 4120 may also store a RAT software (SW) management module to implement SW loading or provisioning procedures, and (de)activation SW in the infrastructure equipment 4100. In either of these embodiments, the memory circuitry 4120 may store a plurality of V2X RAT software components, each of which include program code, instructions, modules, assemblies, packages, protocol stacks, software engine(s), etc., for operating the infrastructure equipment 4100 or components thereof (e.g., RFEMs 4115) according to a corresponding V2X RAT. When a V2X RAT component is configured or executed by the application circuitry 4105 and/or the baseband circuitry 4110, the infrastructure equipment 4100 operates according to the V2X RAT component.

In a first example, a first V2X RAT component may be an C-V2X component, which includes LTE and/or C-V2X protocol stacks that allow the infrastructure equipment 4100 to support C-V2X and/or provide radio time/frequency resources according to LTE and/or C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP TS 36.300 and/or 3GPP TS 38.300, as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 4100 is acting as a relay. In some embodiments, the user plane protocol stack may be the PC5 user plane (PC5-U) protocol stack discussed in 3GPP TS 23.303 v15.1.0 (2018 June).

In a second example, a second V2X RAT component may be a ITS-G5 component, which includes ITS-G5 (IEEE 802.11p and/or IEEE 802.11bd) and/or Wireless Access in Vehicular Environments (WAVE) (IEEE 1609.4) protocol stacks, among others, that allow the infrastructure equipment to support ITS-G5 communications and/or provide radio time-frequency resources according to ITS-G5 and/or other WiFi standards. The ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over ITS-G5 channels from higher layers, as well as receiving raw data over the ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 4120 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 4100 to convert or translate a first message obtained according to the first V2X RAT (e.g., C-V2X) into a second message for transmission using a second V2X RAT (e.g., ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 4100 (e.g., memory map, instruction set, programming model, etc.).

The PMIC 4125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 4130 may provide for electrical power drawn from a network cable to provide both power supply and data connectivity to the infrastructure equipment 4100 using a single cable.

The network controller circuitry 4135 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 4100 via network interface connector 4140 using a physical connection, which may be electrical (commonly referred to as a "copper interconnect"), optical, or wireless. The network controller circuitry 4135 may include one or more dedicated processors and/or FPGAs to communicate using one or more of the aforementioned protocols. In some implementations, the network controller circuitry 4135 may include multiple controllers to provide connectivity to other networks using the same or different protocols. In various embodiments, the network controller circuitry 4135 enables communication with associated equipment and/or with a backend system (e.g., server(s), core network, cloud service, etc.), which may take place via a suitable gateway device.

The positioning circuitry 4145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 4145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 4145 may include a Micro-Technology for Positioning, Navigation, and Timing (Micro-PNT) IC that uses a master timing clock to perform position tracking/estimation without GNSS assistance. The positioning circuitry 4145 may also be part of, or interact with, the baseband circuitry 4110 and/or RFEMs 4115 to communicate with the nodes and components of the positioning network. The positioning circuitry 4145 may also provide position data and/or time data to the application circuitry 4105, which may use the data to synchronize operations with various other infrastructure equipment, or the like.

The components shown by FIG. 3 may communicate with one another using interface circuitry 306 or interconnect (IX) 4106, which may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

FIG. 42 illustrates an example of components that may be present in an edge computing node 4250 for implementing the techniques (e.g., operations, processes, methods, and methodologies) described herein. This edge computing node 4250 provides a closer view of the respective components of node 4200 when implemented as or as part of a computing device such as a mobile device/station or UE, a base station, a server, a gateway, network appliance, and/or some other computing device such as those discussed herein.

As examples, the node 4200 may correspond to the radio equipment (RE) 601, 701, 801 (e.g., either as MMkE or PCE), the InfoSrc and/or Entity_1 to Entity_N of FIG. 9, an interference observing RE/UE 1105, interference generating UE 1115, UE 1301 of FIG. 13, REs 1401 of FIG. 14, the REs of FIGS. 16-21, UEs 2201 of FIG. 22, devices 2301 and 2302 of FIG. 23, REs 2801 of FIG. 28, REs 2901 of FIG. 29, REs 3001 of FIG. 30, RE 3101 of FIG. 31, radio computers 3201 of FIG. 32, the mobile device of FIG. 36, satellites of FIG. 37, the UEs 4321, 4311, and/or some other devices such as those discussed herein.

The edge computing node 4250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 4250, or as components otherwise incorporated within a chassis of a larger system.

The edge computing node 4250 includes processing circuitry in the form of one or more processors 4252. The processor circuitry 4252 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 4252 may include one or more hardware accelerators (e.g., same or similar to acceleration circuitry 4264), which may be microprocessors, programmable processing devices (e.g., FPGA, ASIC, etc.), or the like. The one or more accelerators may include, for example, computer vision and/or deep learning accelerators. In some implementations, the processor circuitry 4252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 4252 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 4252 may be coupled with or may include memory/storage and may be configured to execute instructions stored in the memory/storage to enable various applications or operating systems to run on the node 4250. The processors (or cores) 4252 is configured to operate application software to provide a specific service to a user of the node 4250. In some embodiments, the processor(s) 4252 may be a special-purpose processor(s)/controller(s) configured (or configurable) to operate according to the various embodiments herein.

As examples, the processor(s) 4252 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 4252 may be a part of a system on a chip (SoC), System-in-Package (SiP), a multi-chip package (MCP), and/or the like, in which the processor(s) 4252 and other components are formed into a single integrated circuit, or a single package, such as the Edison™ or Galileo™ SoC boards from Intel® Corporation. Other examples of the processor(s) 4252 are mentioned elsewhere in the present disclosure.

The processor(s) 4252 may communicate with system memory 4254 over an interconnect (IX) 4256. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 4258 may also couple to the processor 4252 via the IX 4256. In an example, the storage 4258 may be implemented via a solid-state disk drive (SSDD) and/or high-speed electrically erasable memory (commonly referred to as "flash memory"). Other devices that may be used for the storage 4258 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 4254 and/or storage circuitry 4258 may also incorporate three-dimensional (3D) cross-point (XPOINT) memories from Intel® and Micron®.

In low power implementations, the storage 4258 may be on-die memory or registers associated with the processor 4252. However, in some examples, the storage 4158 may be implemented using a micro hard disk drive (HDD). Further, any number of new technologies may be used for the storage 4258 in addition to, or instead of, the technologies described, such resistance change memories, phase change memories, holographic memories, or chemical memories, among others.

The storage circuitry 4258 store computational logic 4282 (or "modules 4282") in the form of software, firmware, or hardware commands to implement the techniques described herein. The computational logic 4282 may be employed to store working copies and/or permanent copies of computer programs, or data to create the computer programs, for the operation of various components of node 4250 (e.g., drivers, etc.), an OS of node 4250 and/or one or more applications for carrying out the embodiments discussed herein. The computational logic 4282 may be stored or loaded into memory circuitry 4254 as instructions 4282, or data to create the instructions 4288, for execution by the processor circuitry 4252 to provide the functions described herein. The various elements may be implemented by assembler instructions supported by processor circuitry 4252 or high-level languages that may be compiled into such instructions (e.g., instructions 4288, or data to create the instructions 4288). The permanent copy of the programming instructions may be placed into persistent storage devices of storage circuitry 4258 in the factory or in the field through, for example, a distribution medium (not shown), through a communication interface (e.g., from a distribution server (not shown)), or over-the-air (OTA).

In an example, the instructions 4288 provided via the memory circuitry 4254 and/or the storage circuitry 4258 of FIG. 42 are embodied as one or more non-transitory computer readable storage media (see e.g., NTCRSM 4260) including program code, a computer program product or data to create the computer program, with the computer program or data, to direct the processor circuitry 4258 of node 4250 to perform electronic operations in the node 4250, and/or to perform a specific sequence or flow of actions, for example, as described with respect to the flowchart(s) and block diagram(s) of operations and functionality depicted previously. The processor circuitry 4252 accesses the one or more non-transitory computer readable storage media over the interconnect 4256.

In alternate embodiments, programming instructions (or data to create the instructions) may be disposed on multiple NTCRSM 4260. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 4260 may be embodied by devices described for the storage circuitry 4258 and/or memory circuitry 4254. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 4282, instructions 4282, instructions 4288 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 4250, partly on the system 4250, as a stand-alone software package, partly on the system 4250 and partly on a remote computer or entirely on the remote computer or server. In the latter scenario, the remote computer may be connected to the system 4250 through any type of network, including a LAN or WAN, or the connection may be made to an external computer (e.g., through the Internet using an Internet Service Provider).

In an example, the instructions 4288 on the processor circuitry 4252 (separately, or in combination with the instructions 4282 and/or logic/modules 4282 stored in computer-readable storage media) may configure execution or operation of a trusted execution environment (TEE) 4290.

The equipment 4200 (as well as the equipment 4100 of FIG. 41) may include one or more execution environments. An Execution Environment (EE) is a set of hardware and software components providing facilities that support running of client applications (apps). As examples, an EE may include a hardware processing device (e.g., processor circuitry 4252, application circuitry 4205, etc.); a set of connections between the processing device and other hardware resources; a physical volatile memory; a physical non-volatile memory; and peripheral interfaces.

One such EE is a Rich EE (REE), which is an EE comprising at least one Rich (device) OS and one or more other components of the equipment 4200 (or equipment 4100) (e.g., SoCs, other discrete components/hardware elements, firmware, and software) that execute, host, and support the rich OS. As used herein, the term "platform" may refer to an EE within a device or computing system (e.g., equipment 4200, equipment 4100, or the like), such as the REE, a secure element (SE), TEE 4290, or combinations thereof. The rich OS a high-level OS with a rich capability set that allows consumers/users to download and run applications. Examples of rich operating systems include Microsoft® Windows®, Apple® macOS® and iOS®, Google® Android®, Linux®, Symbian OS®, and/or other like OSs such as those discussed herein. In other words, the REE includes one or more discrete elements included in the equipment 4200 (or equipment 4100) excluding a secure element and/or the TEE 4290.

The equipment 4200 (as well as the equipment 4100 of FIG. 41) includes Trusted Compute resources that preserve data confidentiality, execution integrity and enforces data access policies. The Trusted Compute resources may be used to store cryptographic keys, digital certificates, credentials, payment credentials, and/or other sensitive information (e.g., personally identifying information (PII)), and could be used to operate some aspects of one or more applications. The Trusted Compute resources can be implemented using software-based cryptographic security guarantees (e.g., Zero-Knowledge Proofs), user-level or OS-level isolated instances (e.g., "containerization") or virtualization (e.g., using VMs), Trusted Multi-Party-Compute (MPC) resources, or using TEE 4290. In either implementation, applications running on the REE/host platform may be capable of interfacing with the Trusted Compute resources using a suitable (secure) application programming interface (API). Where the Trusted Compute resources is/are implemented using secure enclaves, the applications running on the REE can also interface directly with the enclave of a secure application or other like entity, and/or interface with other enclaves.

The TEE 4290 is an EE that runs alongside but is isolated from the REE. The TEE 4290 has security capabilities and meet certain security related requirements. The TEE 4290 protects TEE 4290 assets from general software attacks, defines rigid safeguards as to data and functions that a program can access, and resists a set of defined threats. The TEE 4290 operates as a protected area accessible to the processor circuitry 4252 to enable secure access to data and secure execution of instructions.

In some embodiments, the TEE 4290 is a physical hardware device that is separate from other components of the equipment 4200 (or equipment 4100) such as a secure-embedded controller, a dedicated SoC, or a tamper-resistant chipset or microcontroller with embedded processing devices and memory devices. In these embodiments, the TEE 4290 is a hardware-based technology that executes only validated tasks, produces attested results, provides protection from malicious host software, and ensures confidentiality of shared encrypted data. In various embodiments, TEE 4290 may include one or more physically tamper-resistant embedded chipset including processors (e.g., trusted processing core(s), trusted crypto accelerators, etc.) and memory devices (e.g., trusted RAM, trusted ROM, etc.) that communicate with an REE (e.g., host platform, application circuitry, etc.) of the equipment 4200 (or equipment 4100). In such embodiments, applications that are not within the TEE 4290 may communicate with the physically tamper-resistant embedded processors and memory devices via a security (secure) API or some other suitable interface such as those discussed in various GlobalPlatform® TEE API standards such as GlobalPlatform, TEE Client_API Specification v1.0 (July 2010); GlobalPlatform, TEE Internal Core API Specification v1.2.1 (May 2019); GlobalPlatform, TEE Secure Element API v1.1.1 (November 2016); and the like. In these implementations, the TEE 4290 may include a secure cryptoprocessor, which is a dedicated computer on a chip or a microprocessor designed to secure hardware by integrating cryptographic keys into devices and/or components of the equipment 4200 (or equipment 4100). In such embodiments, the TEE 4290 may operate in accordance with the International Organization for Standardization (ISO) and International Electrotechnical Commission (IEC) specification ISO/IEC 11889:2009. In some implementations, the TEE 4290 may have an architecture in accordance with the GlobalPlatform, TEE System Architecture standard version 1.2 (November 2018).

Examples of TEE 4290 for these embodiments may include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), a financial-grade Secure Element microcontroller, Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express 3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

The TEE 4290 is not constrained to an embedded platform or subsystem, and in various embodiments, the TEE 4290 may be implemented as access card circuitry including, for example, an integrated circuit card (ICC) (also referred to as a "chip card" or "smart card"), universal ICC (UICC), Subscriber Identity Module (SIM) card, embedded UICC (eUICC), a form-factor secure element (e.g. SD cards, smart microSDs, USB tokens, etc.), and/or the like. In these embodiments, the access card circuitry may include an acceptance driver and one or more applet. The access card is removable or detachable security circuitry (e.g., smart card, UICC, SIM card, etc.), and the equipment 4200 (or equipment 4100) may include a card reader or card slot that is an input device configured to accept the access card (e.g., usually card shaped) and reads data from the access card's storage medium. Such access cards are usually implemented as a plastic (e.g., PVC) card containing semiconductors and embedded contacts, which can be inserted into and communicatively coupled with corresponding contacts in the card reader. In some implementations, the access card circuitry is non-removable access card (e.g., eUICC, SoC-based secure element, etc.), where the access card circuitry is embedded on a motherboard of the equipment 4200 (or equipment 4100) or on some other chip or component in the equipment 4200 (or equipment 4100). In either implementation, the access card may perform various access card functions, such as those defined by ISO/IEC 7816, European Telecommunications Standards Institute (ETSI) technical standard (TS) 102 221, ETSI TS 102 225, ETSI TS 102 226, ETSI TS 102 241, ETSI TS 102 600, 3GPP TS 31.101, 3GPP TS 31.116, 3GPP TS 31.121, 3GPP TS 31.220, 3GPP TS 31.828, Groupe Speciale Mobile Association (GSMA), "Remote Provisioning Architecture for Embedded UICC," TS version 3.0, 30 Sep. 2015, and/or any other like standards. Additionally, the access card (e.g., SIM card) may securely stores access network information (e.g., an international mobile subscriber identity (IMSI) number and related keys or access credentials) which is used to identify and authenticate subscribers using radio equipment (e.g., smartphones, satellite phones, tablets, wearables, etc.). The access network information (or SIM) is registered and activated by a mobile network operator (MNO), and the access network information is then used to authenticate the subscriber during a connection or session establishment procedure.

In other embodiments, the TEE 4290 may be implemented as secure enclaves. An "enclave" is an instantiation of trusted compute resources within a hardware based environment, such as the REE (e.g., host platform, application processor circuitry) or within a hardware-based TEE 4290. For purposes of the present disclosure, the terms "TEE" and "enclave" may be used interchangeably. Secure enclaves are isolated regions of code and/or data within the processor and/or memory/storage circuitry of the system 4250. Only code executed within a secure enclave may access data within the same secure enclave, and the secure enclave may only be accessible using the secure application (which may be implemented by an application processor or a tamper-resistant microcontroller). Various implementations of the TEE 4250, and an accompanying secure area in the processor circuitry 4252 or the memory circuitry 4254 and/or storage circuitry 4258 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 4250 through the TEE 4290 and the processor circuitry 4252.

In some embodiments, the memory circuitry 4254 and/or storage circuitry 4258 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 4254 and/or storage circuitry 4258 may be divided into one or more trusted memory regions for storing applications or software modules of the TEE 4290.

Although the instructions 4282 are shown as code blocks included in the memory circuitry 4254 and the computational logic 4282 is shown as code blocks in the storage circuitry 4258, it should be understood that any of the code blocks may be replaced with hardwired circuits, for example, built into an FPGA, ASIC, or some other suitable circuitry. For example, where processor circuitry 4252 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 4254 and/or storage circuitry 4258 may store program code of an operating system (OS), which may be a general purpose OS or an OS specifically written for and tailored to the computing node 4250. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be an ROS and/or RTOS, such as Apache Mynewt provided by the Apache Software Foundation®, Windows For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 4250, attached to the node 4250, or otherwise communicatively coupled with the node 4250. The drivers may include individual drivers allowing other components of the node 4250 to interact or control various I/O devices that may be present within, or connected to, the node 4250. For example, the drivers may include a display driver to control and allow access to a display device, a touchscreen driver to control and allow access to a touchscreen interface of the node 4250, sensor drivers to obtain sensor readings of sensor circuitry 4272 and control and allow access to sensor circuitry 4272, actuator drivers to obtain actuator positions of the actuators 4274 and/or control and allow access to the actuators 4274, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the node 4250 (not shown).

The components of edge computing device 4250 may communicate over the IX 4256. The IX 4256 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 4256 may be a proprietary bus, for example, used in a SoC based system.

The IX 4256 couples the processor 4252 to communication circuitry 4266 for communications with other devices, such as a remote server (not shown) and/or the connected edge devices 4262. The communication circuitry 4266 is a hardware element, or collection of hardware elements, used to communicate over one or more networks (e.g., cloud 4263) and/or with other devices (e.g., edge devices 4262).

The transceiver 4266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 4262. For example, a wireless local area network (WLAN) unit may be used to implement WiFi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 4266 (or multiple transceivers) may communicate using multiple standards or radios for communications at a different range. For example, the edge computing node 4250 may communicate with close devices, e.g., within about 10 meters, using a local transceiver based on BLE, or another low power radio, to save power. More distant connected edge devices 4262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 4266 (e.g., a radio transceiver) may be included to communicate with devices or services in the edge cloud 4263 via local or wide area network protocols. The wireless network transceiver 4266 may be an LPWA transceiver that follows the IEEE 802.15.4, or IEEE 802.15.4g standards, among others. The edge computing node 4263 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 4266, as described herein. For example, the transceiver 4266 may include a cellular transceiver that uses spread spectrum (SPA/SAS) communications for implementing high-speed communications. Further, any number of other protocols may be used, such as WiFi® networks for medium speed communications and provision of network communications. The transceiver 4266 may include radios that are compatible with any number of 3GPP specifications, such as LTE and 5G/NR communication systems, discussed in further detail at the end of the present disclosure. A network interface controller (NIC) 4268 may be included to provide a wired communication to nodes of the edge cloud 4263 or to other devices, such as the connected edge devices 4262 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 4268 may be included to enable connecting to a second network, for example, a first NIC 4268 providing communications to the cloud over Ethernet, and a second NIC 4268 providing communications to other devices over another type of network.

Given the variety of types of applicable communications from the device to another component or network, applicable communications circuitry used by the device may include or be embodied by any one or more of components 4264, 4266, 424168, or 4270. Accordingly, in various examples, applicable means for communicating (e.g., receiving, transmitting, etc.) may be embodied by such communications circuitry.

The edge computing node 4250 may include or be coupled to acceleration circuitry 4264, which may be embodied by one or more A1 accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 4264 may comprise logic blocks or logic fabric and other interconnected resources that may be programmed (configured) to perform various functions, such as the procedures, methods, functions, etc. of the various embodiments discussed herein. In such implementations, the acceleration circuitry 4264 may also include memory cells (e.g., EPROM, EEPROM, flash memory, static memory (e.g., SRAM, anti-fuses, etc.) used to store logic blocks, logic fabric, data, etc. in LUTs and the like.

The IX 4256 also couples the processor 4252 to a sensor hub or external interface 4270 that is used to connect additional devices or subsystems. The additional/external devices may include sensors 4272, actuators 4274, and positioning circuitry 4245.

The sensor circuitry 4272 includes devices, modules, or subsystems whose purpose is to detect events or changes in its environment and send the information (sensor data) about the detected events to some other a device, module, subsystem, etc. Examples of such sensors 4272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 4274, allow node 4250 to change its state, position, and/or orientation, or move or control a mechanism or system. The actuators 4274 comprise electrical and/or mechanical devices for moving or controlling a mechanism or system, and converts energy (e.g., electric current or moving air and/or liquid) into some kind of motion. The actuators 4274 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 4274 may include one or more electro-mechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The node 4250 may be configured to operate one or more actuators 4274 based on one or more captured events and/or instructions or control signals received from a service provider and/or various client systems The positioning circuitry 4245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 4245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 4245 may include a Micro-Technology for Positioning, Navigation, and Timing (Micro-PNT) IC that uses a master timing clock to perform position tracking/estimation without GNSS assistance. The positioning circuitry 4245 may also be part of, or interact with, the communication circuitry 4266 to communicate with the nodes and components of the positioning network. The positioning circuitry 4245 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 4245 is, or includes an INS, which is a system or device that uses sensor circuitry 4272 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 4250 without the need for external references.

In some optional examples, various input/output (I/O) devices may be present within or connected to, the edge computing node 4250, which are referred to as input circuitry 4286 and output circuitry 4284 in FIG. 42. The input circuitry 424186 and output circuitry 4284 include one or more user interfaces designed to enable user interaction with the node 4250 and/or peripheral component interfaces designed to enable peripheral component interaction with the node 4250. Input circuitry 4286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 4284 may be included to show information or otherwise convey information, such as sensor readings, actuator position(s), or other like information. Data and/or graphics may be displayed on one or more user interface components of the output circuitry 4284. Output circuitry 4284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the node 4250. The output circuitry 4284 may also include speakers or other audio emitting devices, printer (s), and/or the like. In some embodiments, the sensor circuitry 4272 may be used as the input circuitry 4284 (e.g., an image capture device, motion capture device, or the like) and one or more actuators 4274 may be used as the output device circuitry 4284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 4276 may power the edge computing node 4250, although, in examples in which the edge computing node 4250 is mounted in a fixed location, it may have a power supply coupled to an electrical grid, or the battery may be used as a backup or for temporary capabilities. The battery 4276 may be a lithium ion battery, or a metal-air battery, such as a zinc-air battery, an aluminum-air battery, a lithium-air battery, and the like.

A battery monitor/charger 4278 may be included in the edge computing node 4250 to track the state of charge (SoCh) of the battery 4276, if included. The battery monitor/charger 4278 may be used to monitor other parameters of the battery 4276 to provide failure predictions, such as the state of health (SoH) and the state of function (SoF) of the battery 4276. The battery monitor/charger 4278 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 4278 may communicate the information on the battery 4276 to the processor 4252 over the IX 4256. The battery monitor/charger 4278 may also include an analog-to-digital (ADC) converter that enables the processor 4252 to directly monitor the voltage of the battery 4276 or the current flow from the battery 4276. The battery parameters may be used to determine actions that the edge computing node 4250 may perform, such as transmission frequency, mesh network operation, sensing frequency, and the like.

A power block 4280, or other power supply coupled to a grid, may be coupled with the battery monitor/charger 4278 to charge the battery 4276. In some examples, the power block 4280 may be replaced with a wireless power receiver to obtain the power wirelessly, for example, through a loop antenna in the edge computing node 4250. A wireless battery charging circuit, such as an LTC4020 chip from Linear Technologies of Milpitas, California, among others, may be included in the battery monitor/charger 4278. The specific charging circuits may be selected based on the size of the battery 4276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 4258 may include instructions 4282 in the form of software, firmware, or hardware commands to implement the techniques described herein. Although such instructions 4282 are shown as code blocks included in the memory 4254 and the storage 4258, it may be understood that any of the code blocks may be replaced with hardwired circuits, for example, built into an application specific integrated circuit (ASIC).

In an example, the instructions 4182 provided via the memory 4254, the storage 4258, or the processor 4252 may be embodied as a non-transitory, machine-readable medium 4260 including code to direct the processor 4252 to perform electronic operations in the edge computing node 4250. The processor 4252 may access the non-transitory, machine-readable medium 4260 over the IX 4256. For instance, the non-transitory, machine-readable medium 4260 may be embodied by devices described for the storage 4258 or may include specific storage units such as optical disks, flash drives, or any number of other hardware devices. The non-transitory, machine-readable medium 4260 may include instructions to direct the processor 4252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 41 and 42 are intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The respective compute platforms of FIGS. 41 and 42 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

11. EXAMPLE EDGE COMPUTING SYSTEM CONFIGURATIONS AND ARRANGEMENTS

Figure 43:
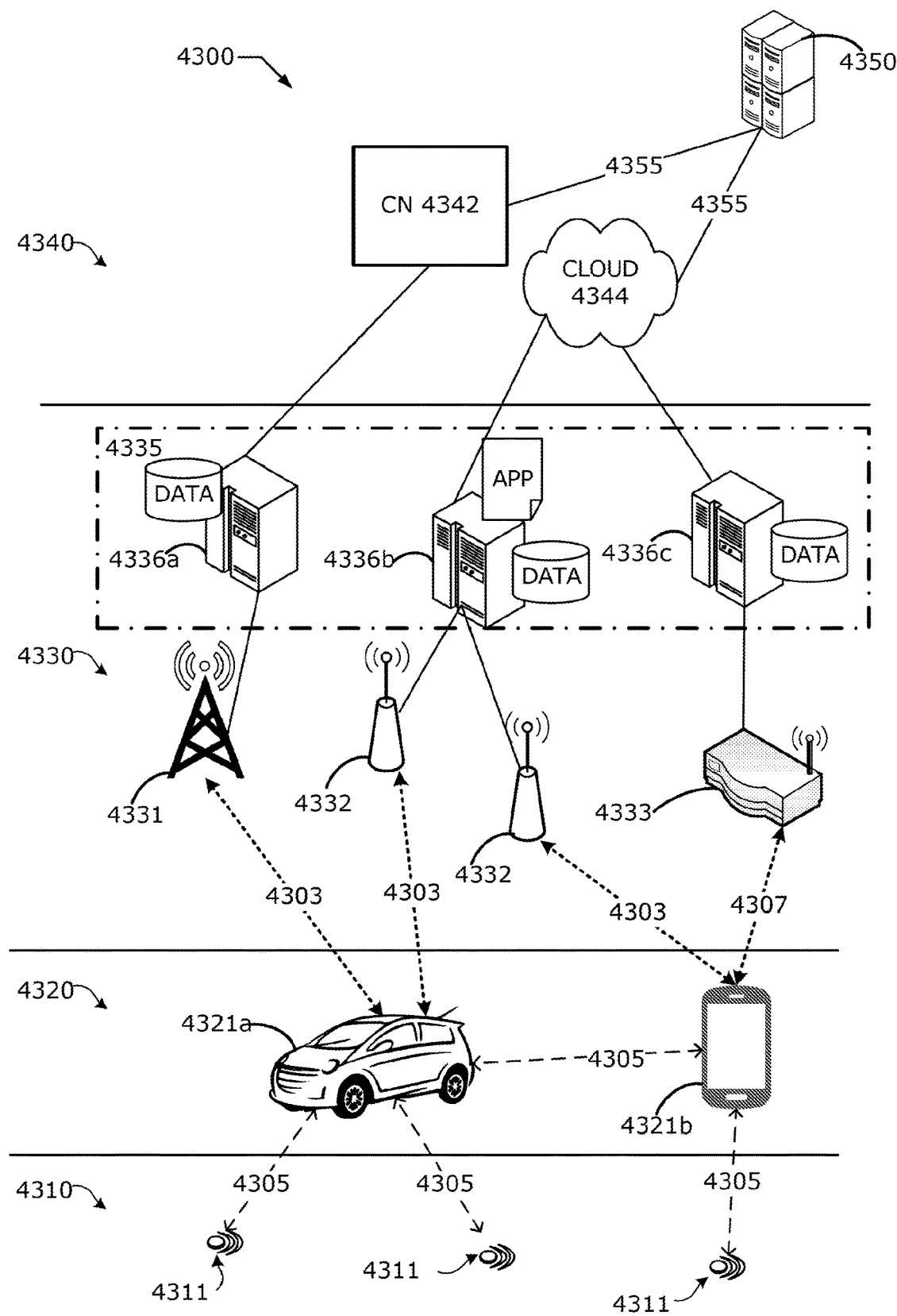
FIG. 43 illustrates an example edge computing environment in accordance with various embodiments.

FIG. 43 illustrates an example edge computing environment 4300 in accordance with various embodiments. FIG. 43 specifically illustrates the different layers of communication occurring within the environment 4300, starting from endpoint sensors or things layer 4310 (e.g., operating in an Internet of Things (IoT) network topology) comprising one or more IoT devices 4311 (also referred to as edge endpoints 4310 or the like); increasing in sophistication to gateways or intermediate node layer 4320 comprising one or more user equipment (UEs) 4321a and 4321b (also referred to as intermediate nodes 4320 or the like), which facilitate the collection and processing of data from endpoints 4310; increasing in processing and connectivity sophistication to access node layer 4330 (or "edge node layer 4330") comprising a plurality of network access nodes (NANs) 4331, 4332, and 4333 (collectively referred to as "NANs 4331-4333" or the like) and a plurality of edge compute nodes 4336a-c (collectively referred to as "edge compute nodes 4336" or the like) within an edge computing system 4335; and increasing in connectivity and processing sophistication to a backend layer 4310 comprising core network (CN) 4342 and cloud 4344. The processing at the backend layer 4310 may be enhanced by network services as performed by a remote application server 4350 and/or other cloud services. Some or all of these elements may be equipped with or otherwise implement some or all aspects of the various embodiments discussed herein.

The environment 4300 is shown to include end-user devices, such as intermediate nodes 4320 and endpoints 4310, which are configured to connect to (or communicatively couple with) one or more multiple communication networks (also referred to as "access networks," "radio access networks," or the like) based on different access technologies (or "radio access technologies") for accessing application services. These access networks may include one or more of NANs 4331, 4332, and/or 4333. The NANs 4331-4333 are arranged to provide network connectivity to the end-user devices via respective links 4303, 4307 between the individual NANs and the one or more UEs 4311, 4321.

As examples, the communication networks and/or access technologies may include cellular technology such as LTE, MuLTEfire, and/or NR/5G (e.g., as provided by Radio Access Network (RAN) node 4331 and/or RAN nodes 4332), WiFi or wireless local area network (WLAN) technologies (e.g., as provided by access point (AP) 4333 and/or RAN nodes 4332), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 4320 include UE 4321a and UE 4321b (collectively referred to as "UE 4321" or "UEs 4321"). In this example, the UE 4321a is illustrated as a vehicle UE, and UE 4321b is illustrated as a smartphone (e.g., handheld touchscreen mobile computing device connectable to one or more cellular networks). However, these UEs 4321 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 4310 include UEs 4311, which may be IoT devices (also referred to as "IoT devices 4311"), which are uniquely identifiable embedded computing devices (e.g., within the Internet infrastructure) that comprise a network access layer designed for low-power IoT applications utilizing short-lived UE connections. The IoT devices 4311 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 4311 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 4311 can utilize technologies such as M2M or MTC for exchanging data with an MTC server (e.g., a server 4350), an edge server 4336 and/or edge computing system 4335, or device via a PLMN, ProSe or D2D communication, sensor networks, or IoT networks. The M2M or MTC exchange of data may be a machine-initiated exchange of data.

The IoT devices 4311 may execute background applications (e.g., keep-alive messages, status updates, etc.) to facilitate the connections of the IoT network. Where the IoT devices 4311 are, or are embedded in, sensor devices, the IoT network may be a WSN. An IoT network describes an interconnecting IoT UEs, such as the IoT devices 4311 being connected to one another over respective direct links 4305. The IoT devices may include any number of different types of devices, grouped in various combinations (referred to as an "IoT group") that may include IoT devices that provide one or more services for a particular user, customer, organizations, etc. A service provider (e.g., an owner/operator of server 4350, CN 4342, and/or cloud 4344) may deploy the IoT devices in the IoT group to a particular area (e.g., a geolocation, building, etc.) in order to provide the one or more services. In some implementations, the IoT network may be a mesh network of IoT devices 4311, which may be termed a fog device, fog system, or fog, operating at the edge of the cloud 4344. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 4344 to Things (e.g., IoT devices 4311). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 4330) and/or a central cloud computing service (e.g., cloud 4344) for performing heavy computations or computationally burdensome tasks. On the other hand, edge cloud computing consolidates human-operated, voluntary resources, as a cloud. These voluntary resource may include, inter-alia, intermediate nodes 4320 and/or endpoints 4310, desktop PCs, tablets, smartphones, nano data centers, and the like. In various implementations, resources in the edge cloud may be in one to two-hop proximity to the IoT devices 4311, which may result in reducing overhead related to processing data and may reduce network delay.

In some embodiments, the fog may be a consolidation of IoT devices 4311 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 4344. The fog operating at the edge of the cloud 4344 may overlap or be subsumed into an edge network 4330 of the cloud 4344. The edge network of the cloud 4344 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 4336 or edge devices). The Fog layer resides on top of the edge layer and is a consolidation of networking devices such as the intermediate nodes 4320 and/or endpoints 4310 of FIG. 43.

Data may be captured, stored/recorded, and communicated among the IoT devices 4311 or, for example, among the intermediate nodes 4320 and/or endpoints 4310 that have direct links 4305 with one another as shown by FIG. 43. Analysis of the traffic flow and control schemes may be implemented by aggregators that are in communication with the IoT devices 4311 and each other through a mesh network. The aggregators may be a type of IoT device 4311 and/or network appliance. In the example of FIG. 43, the aggregators may be edge nodes 4330, or one or more designated intermediate nodes 4320 and/or endpoints 4310. Data may be uploaded to the cloud 4344 via the aggregator, and commands can be received from the cloud 4344 through gateway devices that are in communication with the IoT devices 4311 and the aggregators through the mesh network. Unlike the traditional cloud computing model, in some implementations, the cloud 4344 may have little or no computational capabilities and only serves as a repository for archiving data recorded and processed by the fog. In these implementations, the cloud 4344 centralized data storage system and provides reliability and access to data by the computing resources in the fog and/or edge devices. Being at the core of the architecture, the Data Store of the cloud 4344 is accessible by both Edge and Fog layers of the aforementioned edge-fog network.

As mentioned previously, the access networks provide network connectivity to the end-user devices 4320, 4310 via respective NANs 4331-4333. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 4331, 4332. This virtualized framework allows the freed-up processor cores of the NANs 4331, 4332 to perform other virtualized applications, such as virtualized applications for the various embodiments discussed herein.

The UEs 4321, 4311 may utilize respective connections (or channels) 4303, each of which comprises a physical communications interface or layer. The connections 4303 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 4311, 4321 and the NANs 4331-4333 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 4311, 4321 and NANs 4331-4333 may operate using LAA, enhanced LAA (eLAA), and/or further eLAA (feLAA) mechanisms. The UEs 4321, 4311 may further directly exchange communication data via respective direct links 4305, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 4311, 4321 are capable of measuring various signals or determining/identifying various signal/channel characteristics. Signal measurement may be performed for cell selection, handover, network attachment, testing, and/or other purposes. The measurements collected by the UEs XE111, XE121 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN XE131-XE133 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in [i], [ii], [iii], and/or the like. The same or similar measurements may be measured or collected by the NANs 4331-4333.

The UE XE121b is shown to be configured to access an access point (AP) XE133 via a connection XE107. In this example, the AP XE133 is shown to be connected to the Internet without connecting to the CN XE142 of the wireless system. The connection XE107 can comprise a local wireless connection, such as a connection consistent with any IEEE 802.11 protocol, wherein the AP XE133 would comprise a wireless fidelity (WiFi®) router. In embodiments, the UEs XE121 and IoT devices XE111 can be configured to communicate using suitable communication signals with each other or with any of the AP XE133 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs XE131 and XE132 that enable the connections XE103 may be referred to as "RAN nodes" or the like. The RAN nodes XE131, XE132 may comprise ground stations (e.g., terrestrial access points) or satellite stations providing coverage within a geographic area (e.g., a cell). The RAN nodes XE131, XE132 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node XE131 is embodied as a NodeB, evolved NodeB (eNB), or a next generation NodeB (gNB), and the RAN nodes XE132 are embodied as relay nodes, distributed units, or Road Side Unites (RSUs). Any other type of NANs can be used.

Any of the RAN nodes XE131, XE132 can terminate the air interface protocol and can be the first point of contact for the UEs XE121 and IoT devices XE111. In some embodiments, any of the RAN nodes XE131/XE132 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs XE111, XE121 can be configured to communicate using OFDM communication signals with each other or with any of the NANs XE131, XE132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs XE131-XE132 organize downlink transmissions (e.g., from any of the RAN nodes XE131, XE132 to the UEs XE111, XE121) and uplink transmissions (e.g., from the UEs XE111, XE121 to RAN nodes XE131, XE132) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE XE111, XE121 at each transmission time interval (TTI). A TTI is the duration of a transmission on a radio link XE103, XE105, and is related to the size of the data blocks passed to the radio link layer from higher network layers.

The NANs XE131/XE132 may be configured to communicate with one another via respective interfaces or links (not shown), such as an X2 interface for LTE implementations (e.g., when CN XE142 is an Evolved Packet Core (EPC)), an Xn interface for 5G or NR implementations (e.g., when CN XE142 is an Fifth Generation Core (5GC)), or the like. The NANs XE131 and XE132 are also communicatively coupled to CN XE142. In embodiments, the CN XE142 may be an evolved packet core (EPC) network, a NextGen Packet Core (NPC) network, a 5G core (5GC), or some other type of CN. The CN XE142 may comprise a plurality of network elements, which are configured to offer various data and telecommunications services to customers/subscribers (e.g., users of UEs XE121 and IoT devices XE111) who are connected to the CN XE142 via a RAN. The components of the CN XE142 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN XE142 may be referred to as a network slice, and a logical instantiation of a portion of the CN XE142 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN XE142 components/functions.

The CN XE142 is shown to be communicatively coupled to an application server XE150 and a network XE150 via an IP communications interface XE155. the one or more server(s) XE150 comprise one or more physical and/or virtualized systems for providing functionality (or services) to one or more clients (e.g., UEs XE121 and IoT devices XE111) over a network. The server(s) XE150 may include various computer devices with rack computing architecture component(s), tower computing architecture component(s), blade computing architecture component(s), and/or the like. The server(s) XE150 may represent a cluster of servers, a server farm, a cloud computing service, or other grouping or pool of servers, which may be located in one or more datacenters. The server(s) XE150 may also be connected to, or otherwise associated with one or more data storage devices (not shown). Moreover, the server(s) XE150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) XE150 offer applications or services that use IP/network resources. As examples, the server(s) XE150 may provide traffic management services, cloud analytics, content streaming services, immersive gaming experiences, social networking and/or microblogging services, and/or other like services. In addition, the various services provided by the server(s) XE150 may include initiating and controlling software and/or firmware updates for applications or individual components implemented by the UEs XE121 and IoT devices XE111. The server(s) XE150 can also be configured to support one or more communication services (e.g., Voice-over-Internet Protocol (VoIP) sessions, PTT sessions, group communication sessions, social networking services, etc.) for the UEs XE121 and IoT devices XE111 via the CN XE142.

The cloud XE144 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud XE144 include application capabilities type, infrastructure capabilities type, and platform capabilities type. A cloud capabilities type is a classification of the functionality provided by a cloud service to a cloud service customer (e.g., a user of cloud XE144), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud XE144 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud XE144 may represent a network such as the Internet, a local area network (LAN) or a wide area network (WAN) including proprietary and/or enterprise networks for a company or organization, or combinations thereof. The cloud XE144 may be a network that comprises computers, network connections among the computers, and software routines to enable communication between the computers over network connections. In this regard, the cloud XE144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud XE144 may be via a wired or a wireless connection using the various communication protocols discussed infra. More than one network may be involved in a communication session between the illustrated devices. Connection to the cloud XE144 may require that the computers execute software routines which enable, for example, the seven layers of the OSI model of computer networking or equivalent in a wireless (cellular) phone network. Cloud XE144 may be used to enable relatively long-range communication such as, for example, between the one or more server(s) XE150 and one or more UEs XE121 and IoT devices XE111. In some embodiments, the cloud XE144 may represent the Internet, one or more cellular networks, local area networks, or wide area networks including proprietary and/or enterprise networks, TCP/Internet Protocol (IP)-based network, or combinations thereof. In such embodiments, the cloud XE144 may be associated with network operator who owns or controls equipment and other elements necessary to provide network-related services, such as one or more base stations or access points, one or more servers for routing digital data or telephone calls (e.g., a core network or backbone network), etc. The backbone links XE155 may include any number of wired or wireless technologies, and may be part of a LAN, a WAN, or the Internet. In one example, the backbone links XE155 are fiber backbone links that couple lower levels of service providers to the Internet, such as the CN XE112 and cloud XE144.

In embodiments, the edge compute nodes XE136 may include or be part of an edge system XE135 (or edge network XE135). The edge compute nodes XE136 may also be referred to as "edge hosts XE136" or "edge servers XE136." The edge system XE135 includes a collection of edge servers XE136 (e.g., MEC hosts/servers XE136-1 and XE136-2 of FIG. XP1) and edge management systems (not shown by FIG. XE1) necessary to run edge computing applications (e.g., MEC Apps XP136 of FIG. XP1) within an operator network or a subset of an operator network. The edge servers XE136 are physical computer systems that may include an edge platform (e.g., MEC platform XP137 of FIG. XP1) and/or virtualization infrastructure (e.g., VI XP138 of FIG. XP1), and provide compute, storage, and network resources to edge computing applications. Each of the edge servers XE136 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes XE120 and/or endpoints XE110. The VI of the edge servers XE136 provide virtualized environments and virtualized resources for the edge hosts, and the edge computing applications may run as VMs and/or application containers on top of the VI. One example implementation of the edge system XE135 is a MEC system XE135, which is discussed in more detail infra with respect to FIGs. XP1-XP2. It should be understood that the disclosed MEC systems and services deployment examples are only one illustrative example of edge computing systems/networks XE135, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like.

Further, the techniques disclosed herein may relate to other IoT edge network systems and configurations, and other intermediate processing entities and architectures may also be used to practice the embodiments herein.

As shown by FIG. XE1, each of the NANs XE131, XE132, and XE133 are co-located with edge compute nodes (or "edge servers") XE136a, XE136b, and XE136c, respectively. These implementations may be small-cell clouds (SCCs) where an edge compute node XE136 is co-located with a small cell (e.g., pico-cell, femto-cell, etc.), or may be mobile micro clouds (MCCs) where an edge compute node XE136 is co-located with a macro-cell (e.g., an eNB, gNB, etc.). The edge compute node XE136 may be deployed in a multitude of arrangements other than as shown by FIG. XE1. In a first example, multiple NANs XE131-XE133 are co-located or otherwise communicatively coupled with one edge compute node XE136. In a second example, the edge servers XE136 may be co-located or operated by RNCs, which may be the case for legacy network deployments, such as 3G networks. In a third example, the edge servers XE136 may be deployed at cell aggregation sites or at multi-RAT aggregation points that can be located either within an enterprise or used in public coverage areas. In a fourth example, the edge servers XE136 may be deployed at the edge of CN XE142. These implementations may be used in follow-me clouds (FMC), where cloud services running at distributed data centers follow the UEs XE121 as they roam throughout the network.

In any of the aforementioned embodiments and/or implementations, the edge servers XE136 provide a distributed computing environment for application and service hosting, and also provide storage and processing resources so that data and/or content can be processed in close proximity to subscribers (e.g., users of UEs XE121, XE111) for faster response times The edge servers XE136 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers XE136 from the UEs XE111/XE121, CN XE142, cloud XE144, and/or server(s) XE150, or vice versa. For example, a device application or client application operating in a UE XE121/XE111 may offload application tasks or workloads to one or more edge servers XE136. In another example, an edge server XE136 may offload application tasks or workloads to one or more UE XE121/XE111 (e.g., for distributed ML computation or the like).

Figure 44:
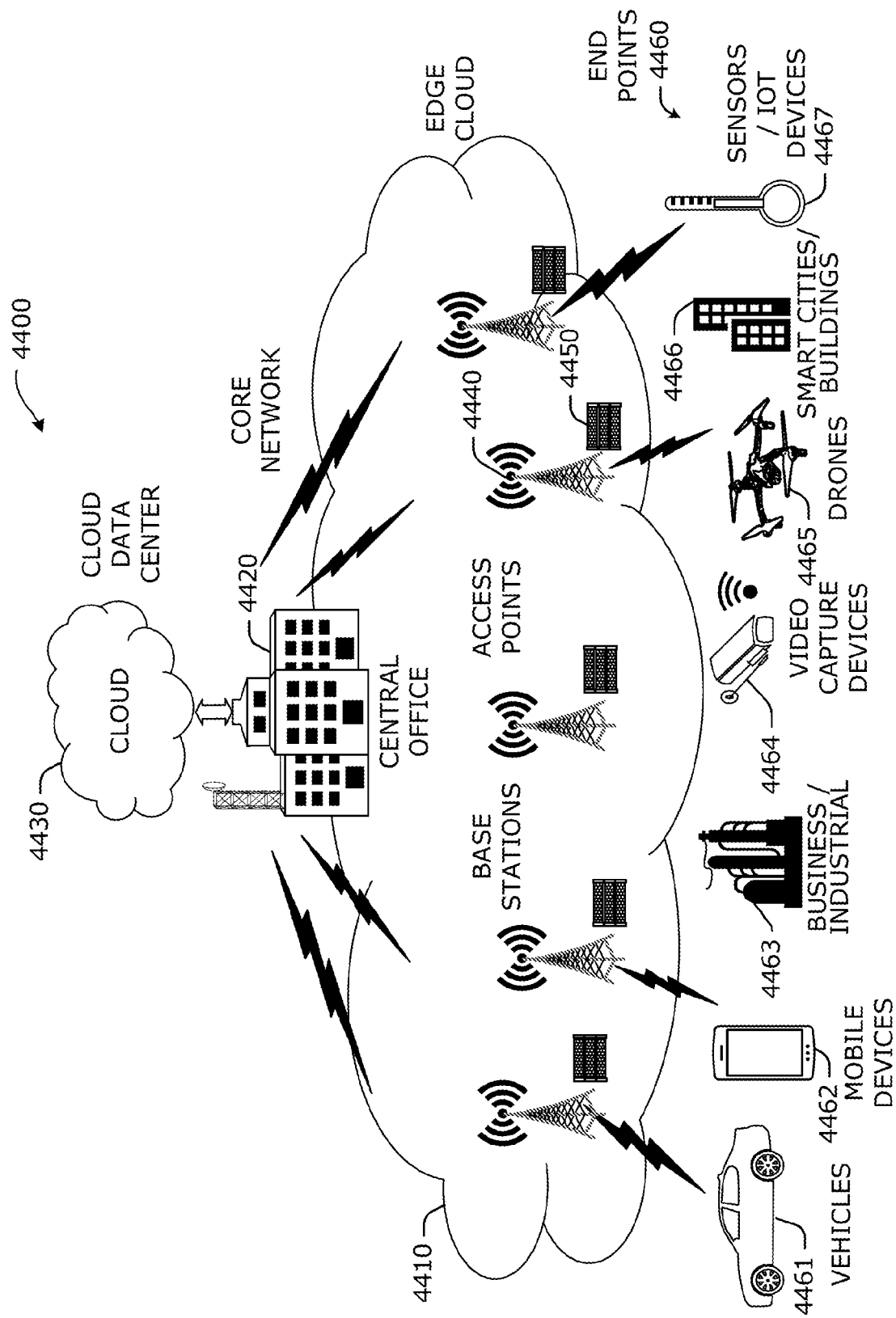
FIG. 44 illustrates an overview of an edge cloud configuration for edge computing.

FIG. 44 is a block diagram 4400 showing an overview of a configuration for edge computing, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the the edge cloud 4410, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 4410 is co-located at an edge location, such as an access point or base station 4440, a local processing hub 4450, or a central office 4420, and thus may include multiple entities, devices, and equipment instances. The edge cloud 4410 is located much closer to the endpoint (consumer and producer) data sources 4460 (e.g., autonomous vehicles 4461, user equipment 4462, business and industrial equipment 4463, video capture devices 4464, drones 4465, smart cities and building devices 4466, sensors and IoT devices 4467, etc.) than the cloud data center 4430. Compute, memory, and storage resources which are offered at the edges in the edge cloud 4410 are critical to providing ultra-low latency response times for services and functions used by the endpoint data sources 4460 as well as reduce network backhaul traffic from the edge cloud 4410 toward cloud data center 4430 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 45:
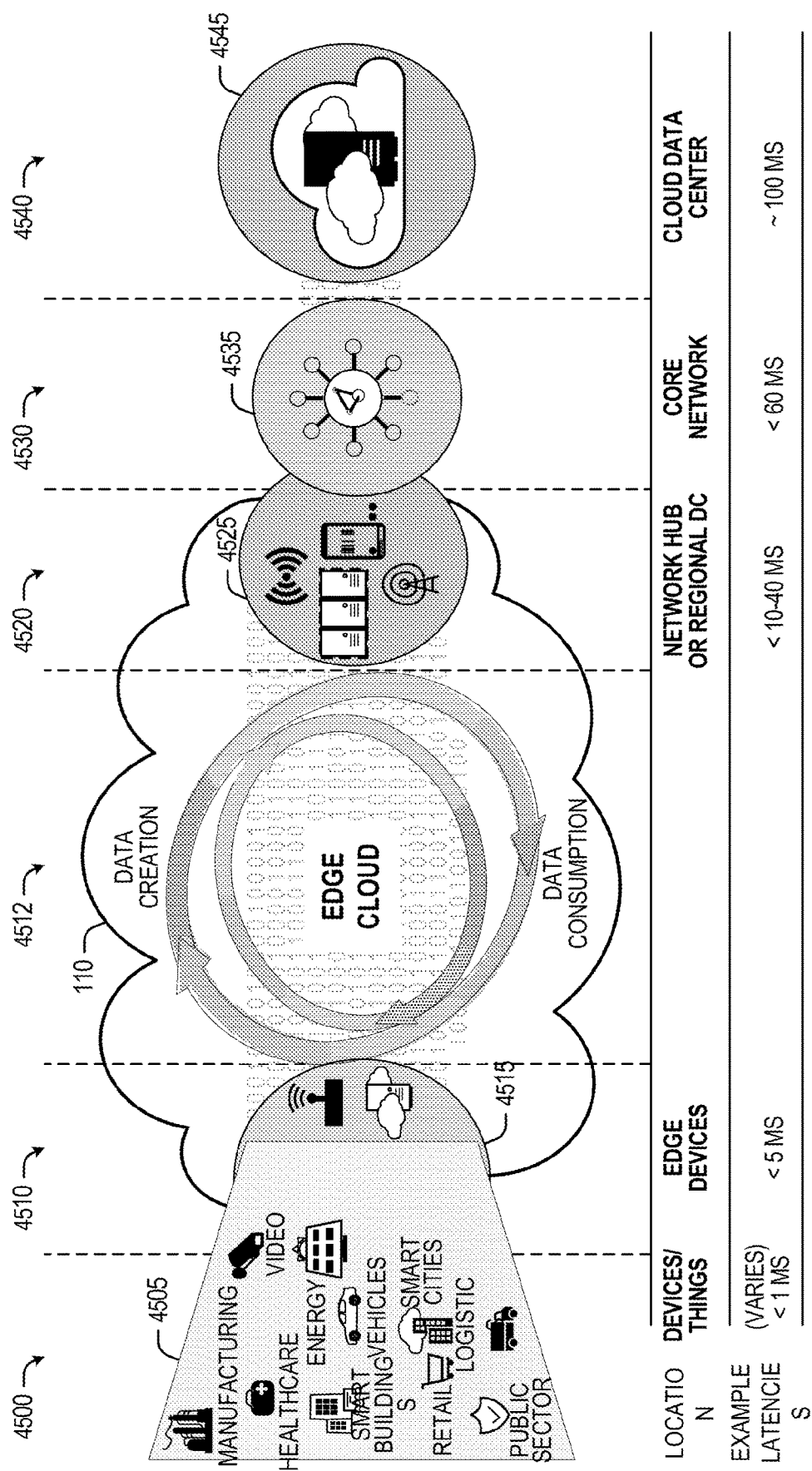
FIG. 45 illustrates operational layers among endpoints, an edge cloud, and cloud computing environments.

FIG. 45 illustrates operational layers among endpoints, an edge cloud, and cloud computing environments. Specifically, FIG. 45 depicts examples of computational use cases 4505, utilizing the edge cloud 4410 among multiple illustrative layers of network computing. The layers begin at an endpoint (devices and things) layer 4500, which accesses the edge cloud 4410 to conduct data creation, analysis, and data consumption activities. The edge cloud 4410 may span multiple network layers, such as an edge devices layer 4510 having gateways, on-premise servers, or network equipment (nodes 4515) located in physically proximate edge systems; a network access layer 4520, encompassing base stations, radio processing units, network hubs, regional data centers (DC), or local network equipment (equipment 4525); and any equipment, devices, or nodes located therebetween (in layer 4512, not illustrated in detail). The network communications within the edge cloud 4410 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 4500, under 5 ms at the edge devices layer 4510, to even between 10 to 40 ms when communicating with nodes at the network access layer 4520. Beyond the edge cloud 4410 are core network 4530 and cloud data center 4540 layers, each with increasing latency (e.g., between 50-60 ms at the core network layer 4530, to 100 or more ms at the cloud data center layer). As a result, operations at a core network data center 4535 or a cloud data center 4545, with latencies of at least 50 to 100 ms or more, will not be able to accomplish many time-critical functions of the use cases 4505. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 4535 or a cloud data center 4545, a central office or content data network may be considered as being located within a "near edge" layer ("near" to the cloud, having high latency values when communicating with the devices and endpoints of the use cases 4505), whereas an access point, base station, on-premise server, or network gateway may be considered as located within a "far edge" layer ("far" from the cloud, having low latency values when communicating with the devices and endpoints of the use cases 4505). It will be understood that other categorizations of a particular network layer as constituting a "close", "local", "near", "middle", or "far" edge may be based on latency, distance, number of network hops, or other measurable characteristics, as measured from a source in any of the network layers 4500-4540.

The various use cases 4505 may access resources under usage pressure from incoming streams, due to multiple services utilizing the edge cloud. To achieve results with low latency, the services executed within the edge cloud 4410 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 4410 may provide the ability to serve and respond to multiple applications of the use cases 4505 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 4410 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 4410 (network layers 4500-4540), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 4410.

As such, the edge cloud 4410 is formed from network components and functional features operated by and within edge gateway nodes, edge aggregation nodes, or other edge compute nodes among network layers 4510-4530. The edge cloud 4410 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 4410 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 4410 may be servers, multi-tenant servers, appliance computing devices, and/or any other type of computing devices. For example, the edge cloud 4410 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 41-42. The edge cloud 4410 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 46:
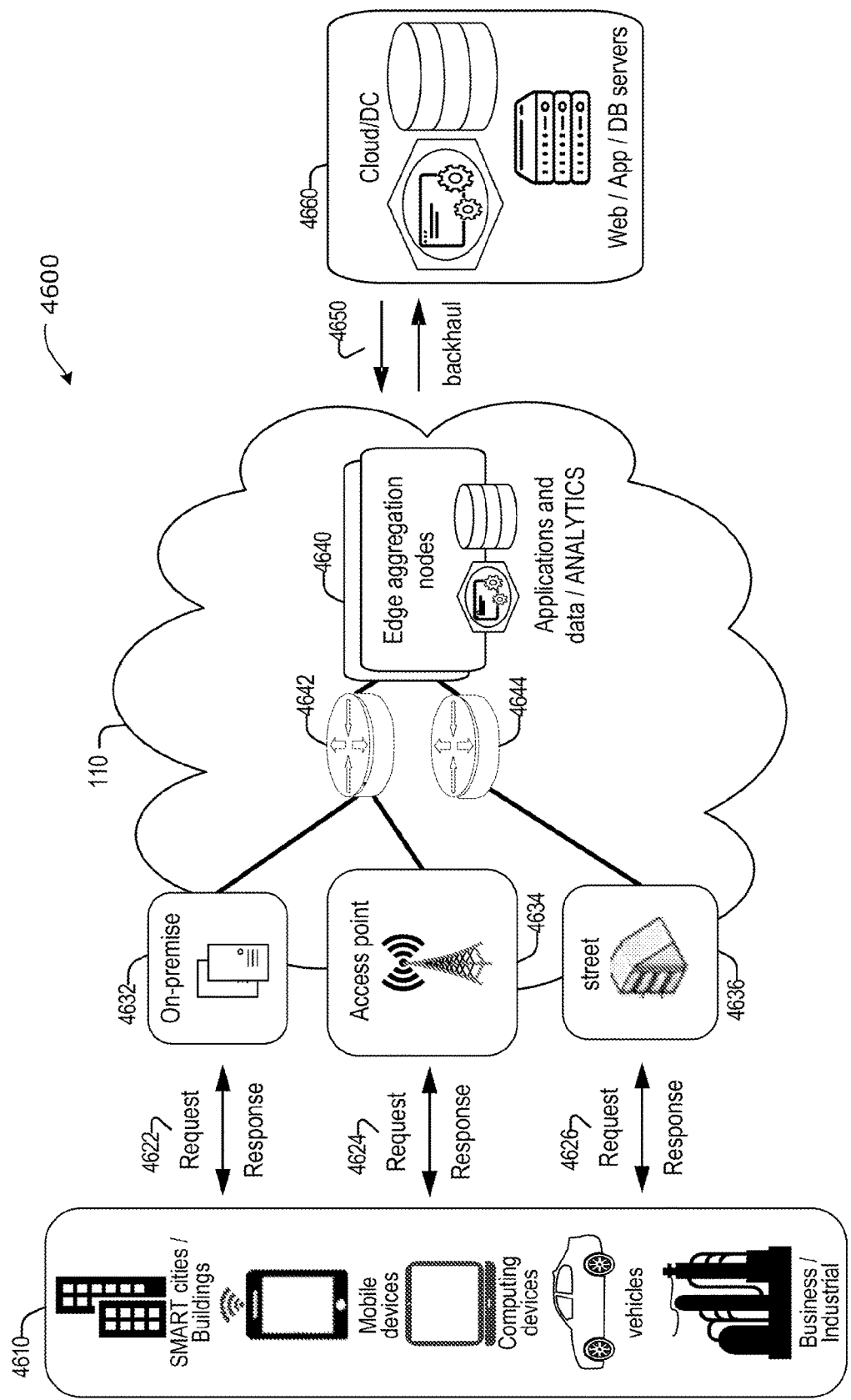
FIG. 46 illustrates an example approach for networking and services in an edge computing system.

In FIG. 46, various client endpoints 4610 (in the form of mobile devices, computers, autonomous vehicles, business computing equipment, industrial processing equipment) exchange requests and responses that are specific to the type of endpoint network aggregation. For instance, client endpoints 4610 may obtain network access via a wired broadband network, by exchanging requests and responses 4622 through an on-premise network system 4632. Some client endpoints 4610, such as mobile computing devices, may obtain network access via a wireless broadband network, by exchanging requests and responses 4624 through an access point (e.g., cellular network tower) 4634. Some client endpoints 4610, such as autonomous vehicles may obtain network access for requests and responses 4626 via a wireless vehicular network through a street-located network system 4636. However, regardless of the type of network access, the TSP may deploy aggregation points 4642, 4644 within the edge cloud 4410 to aggregate traffic and requests. Thus, within the edge cloud 4410, the TSP may deploy various compute and storage resources, such as at edge aggregation nodes 4640, to provide requested content. The edge aggregation nodes 4640 and other systems of the edge cloud 4410 are connected to a cloud or data center 4660, which uses a backhaul network 4650 to fulfill higher-latency requests from a cloud/data center for websites, applications, database servers, etc. Additional or consolidated instances of the edge aggregation nodes 4640 and the aggregation points 4642, 4644, including those deployed on a single server framework, may also be present within the edge cloud 4410 or other areas of the TSP infrastructure.

12. EXAMPLE IMPLEMENTATIONS

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes a method, comprising: generating request message related to registration of a device kind of radio equipment (RE) and/or a device type of the RE, the request message to include a device category of the RE; sending the request message to a registration system; and receiving a response message related to the registration based on the request message.

Example A02 includes the method of example A01 and/or some other example(s) herein, wherein the kind of RE indicates a final usage of the RE.

Example A03 includes the method of examples A01-A02 and/or some other example(s) herein, wherein the device type is a series or model of the device kind.

Example A04 includes the method of examples A01-A03 and/or some other example(s) herein, wherein the device category is a combination of the device type with one or more device classes.

Example A05 includes the method of example A04 and/or some other example(s) herein, wherein each of the one or more device classes indicates a specific capability of the RE Example A06 includes the method of examples A04-A05 and/or some other example(s) herein, further comprising: determining the one or more device classes associated with the RE; and generating the device category by concatenating the one or more device classes to the device type.

Example A07 includes the method of examples A01-A06 and/or some other example(s) herein, wherein the request message is a registration request message requesting to register the RE with the registration system, and the response message is a registration response message indicating whether the RE was successfully registered with the registration system.

Example A08 includes the method of examples A01-A06 and/or some other example(s) herein, wherein the request message is a registration query message querying the registration system for registered REs, and the response message is a registration response message indicating one or more REs registered with the registration system based on the device category.

Example A09 includes the method of examples A01-A08 and/or some other example(s) herein, wherein the registration system is a cloud computing service and/or a centralized data repository.

Example A10 includes the method of examples A01-A09 and/or some other example(s) herein, wherein the registration system is a part of the cloud computing service and/or a centralized data repository placed at an edge of the network.

Example A10.5 includes the method of example A10 and/or some other example(s) herein, wherein the edge of the network is implemented by one or more edge compute nodes deployed at or near radio infrastructure equipment.

Example A11 includes the method of examples A01-A10.5 and/or some other example(s) herein, wherein the registration system is a part of the cloud computing service and/or a centralized data repository placed on Earth Stations in Move (ESIM).

Example A12 includes the method of examples A01-A11 and/or some other example(s) herein, wherein the registration system is a part of the cloud computing service and/or a centralized data repository placed on one or more Satellites that are part of a Satellite Service.

Example A13 includes the method of examples A01-A12 and/or some other example(s) herein, wherein the registration system is a part of the cloud computing service and/or a centralized data repository placed on Aircrafts that are part of an Aeronautical Service.

Example A14 includes the method of examples A01-A13 and/or some other example(s) herein, wherein the registration system is a part of the cloud computing service and/or a centralized data repository placed on one or more High Attitude Platform Stations (HAPS).

Example A15 includes the method of examples A01-A14 and/or some other example(s) herein, wherein the registration system is a part of any computing service and/or a centralized data repository placed somewhere.

Example B01 includes a method, comprising: converting a radio equipment (RE) from a Mass Market Equipment (MMkE) into a Proof of Concept Equipment (PCE); or converting the RE from the PCE into the MMkE. Example B01 may be combined with any of examples A01-A15 and/or some other example(s) herein.

Example B02 includes the method of example B01 and/or some other example(s) herein, wherein the converting comprises: in response to determining that a radio equipment (RE) is a Mass Market Equipment (MMkE), activating a CE Marking flag, and storing a Document of Conformity (DoC) resource in a DoC resource memory location; and in response to determining that the RE is a Proof of Concept Equipment (PCE), deactivating the CE Marking flag, and deleting data in the DoC resource memory location.

Example B03 includes the method of example B02 and/or some other example(s) herein, wherein the CE Marking flag and the DoC resource memory location are respective memory structures within a trusted execution environment (TEE).

Example B04 includes the method of examples B02-B03 and/or some other example(s) herein, wherein the DoC Resource is a resource, a web address, a URL, or a URI of a location where a DoC is stored or located.

Example B05 includes the method of examples B01-B04 and/or some other example(s) herein, wherein setting the CE Marking flag indicates that the RE complies with one or more essential requirements of a relevant regulation or standard.

Example B06 includes the method of examples B02-B05 and/or some other example(s) herein, wherein the TEE includes a memory structure for storing a manufacturer identifier (ID) of a manufacturer taking responsibility of setting the CE Marking flag and/or storage of the DoC resource.

Example B07 includes the method of examples B01-B06 and/or some other example(s) herein, further comprising: obtaining an authorization code from an equipment manufacturer of the RE, and provisioning the authorization code in the RE for the converting.

Example B08 includes the method of example B06 and/or some other example(s) herein, wherein the provisioning comprises installation and activation of one or more software components in the RE.

Example B09 includes the method of examples B01-B08 and/or some other example(s) herein, wherein the TEE is a secure-embedded controller, a dedicated System-on-Chip (SoC), a tamper-resistant chipset, or secure enclaves of application processor circuitry.

Example B10 includes the method of examples B01-B09 and/or some other example(s) herein, wherein an authorization entity is part of an SoC, System-in-Package (SiP), or Multi-Chip Pakage (MCP), or provided as a separate chipset or separate entity that interacts with networking components.

Example C01 includes a method, comprising: generating a statistical model for facilitating access to a set of data items; and facilitating access to individual data items of the set of data items based on the statistical model. Example C01 may be combined with any of examples A01-A15, B01-B10, and/or some other example(s) herein.

Example C02 includes the method of example C01 and/or some other example(s) herein, wherein the generating comprises: generating the statistical model based on a number of times access for individual data items are requested, a reason for each request, and interdependencies or relationships between each request.

Example C03 includes the method of examples C01-C02 and/or some other example(s) herein, wherein each request for the individual data items comprises a category indicator indicating the reason for accessing the individual data items.

Example C04 includes the method of example C03 and/or some other example(s) herein, wherein the category indicator includes an identifier of entities requesting the individual data items, and an intended use for the individual data items.

Example C05 includes the method of example C04 and/or some other example(s) herein, wherein the category indicator further includes a certificate of the entities requesting the individual data items.

Example C06 includes the method of examples C01-C05 and/or some other example(s) herein, wherein the statistical model is a Probability Density Function (PDF).

Example C07 includes the method of examples C01-C06 and/or some other example(s) herein, wherein the statistical model is based on one or more of: a time since last access to any data item requested by any entity; a number of accesses to any data item within a given time interval requested by any entity; a time since a last access to a specific data item requested by a certain authorized entity; a number of accesses to specific data item within a given time interval requested by a certain authorized entity; a time since a last access to any data item requested by a certain authorized entity; a number of accesses to any data item within a given time interval and requested by a certain authorized entity; and/or a time since last access to a particular data item under a condition that one or more other data items had been accessed during a given time interval.

Example C08 includes the method of example C07 and/or some other example(s) herein, wherein the statistical model is further based on one or more of: a geographic area and/or a current location of a requesting entity, a geographic area and/or a current location of a requested data, mobility information (e.g., speed, acceleration, etc.) of the requesting entity, mobility information (e.g., speed, acceleration, etc.) of equipment storing the requested data item, one or more devices proximate or within a predefined distance of the requesting entity, and one or more devices proximate or within a predefined distance of the equipment storing the requested data item.

Example C09 includes the method of examples C01-C08 and/or some other example(s) herein, further comprising: updating the statistical model in response to receipt of each request for an individual data item, wherein the updating comprises updating the statistical model based on the individual data items that was requested, the reason for the request, and any interdependencies or relationships between the request and one or more other requests and/or other data items.

Example C10 includes the method of examples C01-C09 and/or some other example(s) herein, wherein the statistical data is arranged according to a hierarchicy, wherein statistical data of higher hierarchy level or originating from a source having a higher hierarchy level, is trusted more than data having a lower hierarchy level, and statistical data with more trusted data is considered with preference using a weighting factor that is higher than a weightingh factor used for less trusted data of a lower hierarchy level.

Example C11 includes the method of examples C01-C10 and/or some other example(s) herein, wherein the facilitating comprises: granting access to the individual data items when the requests for access to the individual data items are compatible with the statistical model; and denying access to the individual data items when the requests for access to the individual data items are not compatible with the statistical model.

Example C12 includes the method of examples C01-C11 and/or some other example(s) herein, wherein the entity for processing the statistical data is part of an SoC, SiP, or MCP; part of a separate entity directly connected to communication equipment; or managed fully remotely by a monitoring device or system.

Example D01 includes a method to be performed by a first device, the method comprising: generating an alert signal in response to detecting interference from a second device; and transmitting the alert signal to the second device in an alert channel. Example D01 may be combined with any of examples A01-A15, B01-B10, C01-C12, and/or some other example(s) herein.

Example D02 includes the method of example D01 and/or some other example(s) herein, further comprising: starting an alert retransmission timer in response to transmitting the alert signal; and retransmitting the alert signal upon expiration of the timer.

Example D03 includes the method of example D02 and/or some other example(s) herein, further comprising: increasing a transmission power level by a predetermined amount for the retransmitting.

Example D04 includes a method to be performed by a second device, the method comprising: monitoring an alert channel for one or more alert signals; receiving an individual alert signal from a first device in the alert channel based on the monitoring; and transmitting a request for reconfiguration to a network element based on the received alert signal.

Example D05 includes the method of example D04 and/or some other example(s) herein, further comprising: receiving a plurality of interference mitigation configurations from the network element based on the transmitted request; selecting one of the plurality of interference mitigation configurations; and implementing the selected interference mitigation configuration and/or an associated software component to mitigate or stop interference-causing activities.

Example D06 includes the method of examples D05 and/or some other example(s) herein, wherein the plurality of interference mitigation configurations include or are otherwise associated with resource management (RM) software (SW) components, and the method further comprises: receiving an RM SW component from the network element based on the selected interference mitigation configuration; and operating the received RM SW component to mitigate or stop the interference-causing activities.

Example D07 includes the method of example D06 and/or some other example(s) herein, wherein each of the plurality of interference mitigation configurations and/or RM SW components are optimized for different applications.

Example D08 includes the method of examples D05-D07 and/or some other example(s) herein, further comprising: transmitting, to the first device in the alert channel, a request to terminate the alert based on the mitigating or stopping the interference-causing activities; and receiving a response from the first device indicating that the alert has been terminated.

Example D09 includes the method of examples D01-D08 and/or some other example(s) herein, wherein the alert channel is a logical channel, a transport channel, or a physical channel.

Example D10 includes the method of examples D01-D09 and/or some other example(s) herein, wherein the alert signal comprises a header containing a Zadoff-Chu (ZC) sequence or a Constant Amplitude Zero Auto-Correlation (CAZAC) sequence.

Example D11 includes the method of examples D01-D10 and/or some other example(s) herein, wherein the alert signal comprises an identifier (ID) data element (DE) including or indicating an ID of the second device; an angle of arrival (AoA) DE including or indicating an AoA of an interfering signal as detected by the first device; a power level DE including or indicating a power level of the interfering signal as detected by the first device; a duration DE including or indicating a duration of the interfering signal as detected by the first device; and a modulation (or MCS) type DE including or indicating a modulation (or MCS) type of the interfering signal as detected by the first device.

Example D12 includes the method of examples D01-D11 and/or some other example(s) herein, wherein the alert signal is associated with a hierarchy level wherein the alert signal is prioritized over another alert signal having a lower hierarchy level than the alert signal and another alert signal having a higher hierarchy level greater than the alert signal is prioritized over the alert signal.

Example D13 includes the method of examples D01-D12 and/or some other example(s) herein, wherein the first device and/or the second device is/are capable of steering one or more antenna(s), wherein the first device is a smart antenna system, a system with one or more directional antennas, or a Multiple-Input Multiple Output (MIMO) system, and/or the second device is a smart antenna system, a system with one or more directional antennas, or a MIMO system.

Example D14 includes the method of example D13 and/or some other example(s) herein, wherein the first device is a Macrocell base station (BS), a Microcell BS, Femtocell BS, a Picocell BS, a millimeter wave BS, one or more edge compute nodes, a repeater, a relay station, a WiFi Access Point, user equipment (UE) with a directional antenna, or a multi-antenna or multi-panel UE, and the second device is a Macrocell BS, a Microcell BS, Femtocell BS, a Picocell BS, a millimeter wave BS, one or more edge compute nodes, a repeater, a relay station, a WiFi Access Point, user equipment (UE) with a directional antenna, or a multi-antenna or multi-panel UE.

Example E01 includes a method to be performed by a transcoding entity, the method comprising: obtaining, from first device implementing a first radio access technology (RAT), a first message intended for a second device implementing a second RAT, the second RAT being different than the first RAT; and translating or transcoding the first message into a second message for consumption by the second RAT. Example E01 may be combined with any of examples A01-A15, B01-B10, C01-C12, D01-D14 and/or some other example(s) herein.

Example E02 includes the method of example E01 and/or some other example(s) herein, wherein the receiving comprises: receiving the message in a transcoding channel having one or more characteristics common to the first RAT and the second RAT.

Example E03 includes the method of example E02 and/or some other example(s) herein, wherein the transcoding channel comprises a control channel section, a data channel section to at least carry software components of RAT1 and/or RAT2; and a synchronization (sync) sequence section to carry a sync sequence indicating that the channel is the transcoding channel.

Example E04 includes the method of example E03 and/or some other example(s) herein, wherein the sync sequence is a CAZAC sequence.

Example E05 includes the method of examples E01-E04 and/or some other example(s) herein, wherein the transcoding entity is implemented by the first device, and the method further comprises: monitoring for RAT2 signaling produced by the second device; determining whether one or more aspects of RAT1 are capable of being understood by RAT2; and establishing a communication link with the second device when there is at least one aspect of RAT1 are capable of being understood by RAT2.

Example E06 includes the method of example E05 and/or some other example(s) herein, wherein the first device and the second device are both user equipment (UEs) and the communication link is a radio link; or the first device and the second device are both network access nodes (NANs) and the communication link is a radio link or a wired link.

Example E07 includes the method of examples E01-E04 and/or some other example(s) herein, wherein the transcoding entity is implemented by a third device different from the first device and the second device, and the method further comprises: receiving, from the first device, a transcoding service request for transcoding services; and transmitting, to the first device, a transcoding service response indicating that the request was accepted, wherein the first message is received after transmission of the transcoding service response.

Example E08 includes the method of example E07 and/or some other example(s) herein, further comprising: receiving, from the first device, a terminate service request to terminate the transcoding service; and terminating the transcoding service between the first and second devices.

Example E09 includes the method of examples E07-E08 and/or some other example(s) herein, wherein the transcoding service response includes or indicates a list of transcoding entity options, and the method further comprises: receiving, from the first device, a selected transcoding option from the list of transcoding entity options.

Example E10 includes the method of example E09 and/or some other example(s) herein, wherein a first option in the list of transcoding entity options is to have the third device provide the transcoding service and a second option in the list of transcoding entity options is to have a fourth device provide the transcoding service.

Example E11 includes the method of examples E09-E10 and/or some other example(s) herein, wherein the third or fourth device is to start transcoding communications between the first and second devices based on the selected transcoding entity option.

Example E12 includes the method of example E11 and/or some other example(s) herein, wherein the third device is a BS, a broker system, or an inter-working function (IWF), and the fourth device is another BS, another broker system or another IWF.

Example E13 includes the method of example E12 and/or some other example(s) herein, wherein the broker system or IWF is a network function (NF) in a network operator's core network or backend system, or an application function (AF) operated by a cloud computing service, a content delivery network (CDN), or an edge computing network, and the other broker system or other IWF is an NF in a network operator's core network or backend system, or an AF operated by a cloud computing service, a CDN, or an edge computing network.

Example E14 includes the method of examples E11-E13 and/or some other example(s) herein, wherein the first device and the second device are both UEs; or the first device and the second device are both NANs.

Example E15 includes the method of examples E12-E14 and/or some other example(s) herein, further comprising: determining neighboring device information including information about available devices proximate to the first device, one or more RATs implemented by the available devices, and one or more mechanisms for data exchange; and determining available service information including transcoding entities available to provide the transcoding service and information indicating whether direct communication is available and a particular RAT configuration for the direct communication.

Example E16 includes the method of examples E01-E15 and/or some other example(s) herein, further comprising: obtaining software (SW) transmitter (Tx) and receiver (Rx) chain components of the first and second devices; and performing the transcoding using the SW Tx/Rx chains components.

Example E17 includes the method of example E16 and/or some other example(s) herein, further comprising: obtaining a Layer 2 (L2) transcoding block associated with the SW Tx/Rx chains components of the first and second devices; and performing the transcoding further using the L2 transcoding block.

Example E18 includes the method of examples E01-E17 and/or some other example(s) herein, wherein the translating or transcoding the first message into a second message comprises: converting the first message into a minimum service protocol (MSP) message; and converting the MSP message into the second message.

Example E19 includes the method of example E18 and/or some other example(s) herein, further comprising: assigning a transmission time to the MSP or the second message.

Example E20 includes the method of examples E18-E19 and/or some other example(s) herein, wherein the MSP includes a minimum amount of information required for interoperability between the first and second RATs, wherein the minimum set of information is layered and prioritized according to a type of data to be exchanged between the first and second devices.

Example E21 includes the method of examples E01-E20 and/or some other example(s) herein, wherein the first device and the second device, or the RAT1 or the RAT2, are associated with respective hierarchy levels wherein the devices or RATs having a higher hierarchy level are prioritized over other devices or RATs having lower hierarchy levels.

Example E22 includes the method of examples E01-E21 and/or some other example(s) herein, further comprising: exchanging relevant data over a radio link, the relevant data including configuration data, user performance data, system state information, context information, and communication information, the communication information including signal strength measurements, signal quality measurements, interference measurements, channel measurement data, and/or other like measurements.

Example E23 includes the method of example E22 and/or some other example(s) herein, wherein the RAT1 and the RAT2 are a same RAT, the transcoding entity is implemented by the first device, and the method comprises: establishing a direct device-to-device (D2D) communication link with the second device; and exchanging the relevant data over the D2D communication link.

Example E24 includes the method of example E22 and/or some other example(s) herein, further comprising: facilitating exchange of the relevant data between the first device and the second device.

Example E25 includes the method of examples E01-E24 and/or some other example(s) herein, wherein RAT1 and/or RAT2 is/are one of any generation of a WiFi RAT (e.g., IEEE 802.11a/b/g/n/ac/ax or the like), any Release of a 3GPP RAT (e.g., UMTS, LTE, 5G/NR including any one of Release 10, 11, 12, 13, 14, 15, 16, 17, 18, etc.), any generation of Wireless Gigabit Alliance (WiGig) (e.g., IEEE 802.11ay/ad or the like), any generation of a Worldwide Interoperability for Microwave Access (WiMAX) RAT, a 3GPP2 RAT (e.g., CDMA2000), or a personal area network (PAN) RAT (e.g., Bluetooth® or Bluetooth Low Energy, IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, or the like).

Example F01 includes a method to be performed by a device, comprising: transitioning, by a Manager Device Entity (M-DE) in the device, the device into a standalone mode in response to detecting that mandated services are unavailable during a predefined scenario or period of time; and in the standalone mode: enabling, by the M-DE, a localization mechanism to determine a current location of the device, and transmitting or broadcasting a message to one or more other devices using a channel in an repurposed spectrum, the message at least including the determined current location. Example F01 may be combined with any of examples A01-A15, B01-B10, C01-C12, D01-D14, E01-E25 and/or some other example(s) herein.

Example F02 includes the method of example F01 and/or some other example(s) herein, wherein determining the current location comprises: calculating, by the M-DE, a current position value and current time value relative to a last known position value and last known time value; and transmitting or broadcasting the calculated position and time values at regular intervals to remote equipment using dedicated localization and synchronization sequences and/or signaling.

Example F03 includes the method of example F02 and/or some other example(s) herein, wherein determining the current location further comprises: receiving, by the M-DE, position and time values from respective ones of the remote equipment via the dedicated localization and synchronization sequences and/or signaling; determining, by the M-DE, an angle-of-arrival (AoA) estimates for each of the received dedicated localization and synchronization sequences and/or signaling; and determining, by the M-DE, the current location based on the calculated position and time values, the received position and time values from respective ones of the remote equipment, and the AoA estimates.

Example F04 includes the method of example F03 and/or some other example(s) herein, wherein the calculated position and time values and the received position and time values are based on current and/or previous GNSS data, sensor data, cellular system based location estimation, estimates based on device-to-device (D2D) interactions with neighboring devices, and/or any combination thereof.

Example F05 includes the method of examples F02-F04 and/or some other example(s) herein, wherein the dedicated localization and synchronization sequences and/or signaling comprises one or more D2D communication link using any suitable D2D technology or combination of D2D technologies such as those discussed herein.

Example F06 includes the method of examples F02-F05 and/or some other example(s) herein, wherein the remote equipment are the one or more other devices, or the remote equipment are different than the one or more other devices.

Example F07 includes the method of examples F01-F06 and/or some other example(s) herein, wherein the transmitting or broadcasting comprises: setting, by the M-DE, an Arbitration Inter-Frame Spacing (AIFS) to a predefined value based on the predefined scenario and/or a device priority or device category of the device; and performing a medium sensing operation to detect an availability of the channel in an repurposed spectrum according to the AIFS.

Example F08 includes the method of examples F01-F07 and/or some other example(s) herein, wherein the transmitting or broadcasting comprises: setting, by the M-DE, a timer to a predefined value based on the predefined scenario and/or a device priority or device category of the device; and performing a medium sensing operation to detect an availability of the channel in an repurposed spectrum in response to expiration of the timer.

Example F09 includes the method of example F08 and/or some other example(s) herein, wherein the timer is a retransmission backoff timer or a contention resolution timer.

Example F10 includes the method of examples F07-F09 and/or some other example(s) herein, when the device is in the standalone mode, the method further comprises: performing, by the M-DE, D2D discovery, authorization, and message exchange according to a fallback protocol.

Example F111 includes the method of example F10 and/or some other example(s) herein, wherein the fallback communication protocol includes one or more symbols to include the message and other messages from the one or more other devices, and wherein the transmitting or broadcasting the message in the one or more symbols acts as a reservation of the channel.

Example F12 includes the method of examples F01-F11 and/or some other example(s) herein, wherein the message further includes or indicates a start time of the predefined scenario or period of time; a duration of the predefined scenario or period of time; and/or type(s) of devices and/or traffic allowed to access resource(s) during the predefined scenario or period of time.

Example F13 includes the method of examples F01-F12 and/or some other example(s) herein, wherein the message further includes or indicates aZadoff-Chu sequence or a CAZAC sequence.

Example F14 includes the method of examples F01-F13 and/or some other example(s) herein, further comprising: detecting, by the M-DE, the predefined scenario or the period of time has been enacted or is otherwise taking place; attempting to perform communications via an authorized spectrum; and placing the device in the standalone mode when the attempting fails.

Example F15 includes the method of example F14 and/or some other example(s) herein, wherein the detecting is based on receipt of a scenario-specific message.

Example F16 includes the method of examples F14-F15 and/or some other example(s) herein, wherein the authorized spectrum comprises a licensed spectrum and/or an unlicensed spectrum, and the repurposed spectrum is a spectrum not allocated or authorized for communication by the device.

Example F17 includes the method of examples F01-F16 and/or some other example(s) herein, further comprising: determining, by the M-DE, one or more channels in the repurposed spectrum using channel map indicating where parts of the repurposed band are unused at the current location.

Example F18 includes the method of examples F01-F17 and/or some other example(s) herein, wherein the predefined scenario or the period of time is an emergency situation.

Example F19 includes the method of example F18 and/or some other example(s) herein, wherein the detecting is based on receipt of a Public Warning System (PWS), Earthquake and Tsunami Warning System (ETWS), or Commercial Mobile Alert Service (CMAS) message.

Example F20 includes the method of examples F01-F19 and/or some other example(s) herein, wherein the device is a vehicle embedded computing system, and to detecting the mandated services as being unavailable is based on being within a coverage area of infrastructure equipment.

Example F21 includes the method of examples F01-F20 and/or some other example(s) herein, wherein a hierarchy is defined for standalone equipment, wherein equipment of a higher hierarchy is a controller for equipment of a lower hierarchy.

Example G01 includes a method, comprising: generating a data container comprising user data and a Privacy Hierarchy Level (PHL) tag associated with the user data; and transmitting the data container over a security channel different than other channels of an underlying network protocol. Example G01 may be combined with any of examples A01-A15, B01-B10, C01-C12, D01-D14, E01-E25, F01-F21, and/or some other example(s) herein.

Example G02 includes the method of example G01 and/or some other example(s) herein, wherein the PHL tag is an integer, Boolean value, character, character string, or any other type of data indicative of a PHL of the user data.

Example G03 includes the method of examples G01-G02 and/or some other example(s) herein, wherein the PHL is among a plurality of PHLs, and the plurality of PHLs comprises a first (public data) level indicating that associated data is not privacy related and can be freely shared, a second level indicating that associated data is indirectly related to a user which may be used to infer privacy-related information, a third level indicating that associated data is historical data related to a context of a user, a fourth level indicating that associated data is current data related to the context of the user, and fifth level indicating that associated data is intimate or sensitive and high-related to user privacy.

Example G04 includes the method of example G03 and/or some other example(s) herein, wherein the transmitting comprises transmitting the data container over the security channel only when the PHL of the user data is the third level, the fourth level, or the fifth level.

Example G05 includes the method of examples G03-G04 and/or some other example(s) herein, further comprising: transmitting the data container over a broadcast channel when the PHL associated with the user data is the first level; and transmitting the data container over a data channel when the PHL associated with the user data is the second level.

Example G06 includes the method of examples G01-G05 and/or some other example(s) herein, wherein the security channel includes a security identifier (ID) data element/field that carries a security ID, a preamble data element/field to carry a security preamble, a pointer data element/field to carry a security pointer, and a secure information data element/field to carry information/data for transmission.

Example G07 includes the method of example G06 and/or some other example(s) herein, further comprising: generating the security ID as a bit string representation of a device ID of the device, wherein the bit string representation comprises K active bits and N additional active bits, wherein K and N are numbers, and the N bits are only known to authorized devices; and inserting the generated security ID into the security ID data element.

Example G08 includes the method of examples G06-G07 and/or some other example(s) herein, further comprising: generating the security preamble, the security preamble only being known to authorized devices; and inserting the generated security preamble into the security preamble data element.

Example G09 includes the method of example G08 and/or some other example(s) herein, further comprising: monitoring the security channel using the security preamble to detect security messages from other devices.

Example G10 includes the method of examples G06-G09 and/or some other example(s) herein, further comprising: inserting the user data into the secure information data element.

Example G11 includes the method of examples G06-G09 and/or some other example(s) herein, further comprising: generating a security pointer, the security pointer pointing to a secure resource that stores the user data; and inserting the generated security pointer into the secure information data element.

Example G12 includes the method of example G11 and/or some other example(s) herein, wherein the secure resource is network address, URL, URI, or the like of a database object in a secure database or storage device storing the user data.

Example G13 includes the method of examples G01-G12 and/or some other example(s) herein, wherein the security channel is among a plurality of security channels, wherein each of the plurality of security channels are associated with a respective hierarchy level wherein security channels of higher priority/rank in the hierarchy are considered more secure or trustworthy than security channels having lower priorities/ranks in the hierarchy.

Example H01 includes a method for communicating between privacy-related components and non-privacy related components in an execution environment, the method comprising: generating, by a non-privacy-related component, one or more information objects excluding privacy data; sending, by the non-privacy-related component to a privacy-related component, a first request message to request addition of privacy-data to the generated information objects; and receiving, by the non-privacy-related component from the privacy-related component, a first response message including a confirmation to add the privacy-data to the generated information objects. Example H01 may be combined with any of examples A01-A15, B01-B10, C01-C12, D01-D14, E01-E25, F01-F21, G01-G13, and/or some other example(s) herein.

Example H02 includes the method of example H01 and/or some other example(s) herein, further comprising: sending, by the non-privacy-related component to the privacy-related component, a second request message to request a certificate from the privacy-related component; and receiving, by the non-privacy-related component from the privacy-related component, a second response message including the requested certificate.

Example H03 includes the method of example H02 and/or some other example(s) herein, further comprising: sending, by the non-privacy-related component to a certificate authority, a third request message to validate the received certificate; and receiving, by the non-privacy-related component from the certificate authority, a third response message indicating that the certificate is valid.

Example H04 includes the method of example H03 and/or some other example(s) herein, further comprising: sending, by the non-privacy-related component to the privacy-related component, a fourth request message to register with the privacy-related component in response to receipt of the third response message; and receiving, by the non-privacy-related component from the privacy-related component, a fourth response message confirming registration with the privacy-related component.

Example H05 includes the method of example H04 and/or some other example(s) herein, further comprising: sending, by the non-privacy-related component to the certificate authority, a fifth request message to indicate a configuration based on the registration with the privacy-related component; and receiving, by the non-privacy-related component from the certificate authority, a fifth response message confirming receipt of the configuration.

Example H06 includes the method of examples H01-H05 and/or some other example(s) herein, wherein the first request message includes the generated information objects.

Example H07 includes the method of example H06, wherein the first response message includes updated information objects including the privacy-data, or the first response message includes updated information objects including anonymized or pseudonymized data.

Example H08 includes the method of examples H01-H05 and/or some other example(s) herein, wherein the first request message includes an indication of a user associated with the privacy-data.

Example H09 includes the method of example H08 and/or some other example(s) herein, wherein the first response message includes anonymized or pseudonymized data to be included in the information objects.

Example H10 includes the method of example H08 and/or some other example(s) herein, wherein the first response message indicates anonymization or pseudonymization algorithm, and the method further comprises: generating anonymized or pseudonymized data for inclusion in the generated information objects using the anonymization or pseudonymization algorithm; and updating the generated information objects to include the generated anonymized or pseudonymized data.

Example H11 includes the method of example H08 and/or some other example(s) herein, wherein the first response message indicates permission to use an anonymization or pseudonymization algorithm, and the method further comprises: selecting an anonymization or pseudonymization algorithm; generating anonymized or pseudonymized data for inclusion in the generated information objects using the selected anonymization or pseudonymization algorithm; and updating the generated information objects to include the generated anonymized or pseudonymized data.

Example H12 includes the method of examples H01-H11 and/or some other example(s) herein, wherein the execution environment is a trusted execution environment or a rich execution environment.

Example Z01 may include an apparatus comprising means to perform one or more elements of a method described in or related to any of examples A01-A15, B01-B10, C01-C12, D01-D14, E01-E25, F01-F21, G01-G12, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A15, B01-B10, C01-C12, D01-D14, E01-E25, F01-F21, G01-G12, or any other method or process described herein. Example Z03 may include an apparatus comprising logic, modules, or circuitry to perform one or more elements of a method described in or related to any of examples A01-A15, B01-B10, C01-C12, D01-D14, E01-E25, F01-F21, G01-G12, or any other method or process described herein. Example Z04 may include a method, technique, or process as described in or related to any of examples A01-A15, B01-B10, C01-C12, D01-D14, E01-E25, F01-F21, G01-G12, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A15, B01-B10, C01-C12, D01-D14, E01-E25, F01-F21, G01-G12, or portions thereof. Example Z06 may include a signal as described in or related to any of examples A01-A15, B01-B10, C01-C12, D01-D14, E01-E25, F01-F21, G01-G12, or portions or parts thereof. Example Z07 may include a datagram, packet, frame, segment, protocol data unit (PDU), or message as described in or related to any of examples A01-A15, B01-B10, C01-C12, D01-D14, E01-E25, F01-F21, G01-G12, or portions or parts thereof, or otherwise described in the present disclosure.

Example Z08 may include a signal encoded with data as described in or related to any of examples A01-A15, B01-B10, C01-C12, D01-D14, E01-E25, F01-F21, G01-G12, or portions or parts thereof, or otherwise described in the present disclosure. Example Z09 may include a signal encoded with a datagram, packet, frame, segment, protocol data unit (PDU), or message as described in or related to any of examples A01-A15, B01-B10, C01-C12, D01-D14, E01-E25, F01-F21, G01-G12, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A15, B01-B10, C01-C12, D01-D14, E01-E25, F01-F21, G01-G12, or portions thereof. Example Z11 may include a computer program comprising instructions, wherein execution of the program by a processing element is to cause the processing element to carry out the method, techniques, or process as described in or related to any of examples A01-A15, B01-B10, C01-C12, D01-D14, E01-E25, F01-F21, G01-G12, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

Any of the above-described examples may be combined with any other example (or combination of examples), unless explicitly stated otherwise. Aspects described herein can also implement a hierarchical application of the scheme for example, by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Some of the features in the present disclosure are defined for network elements (or network equipment) such as Access Points (APs), eNBs, gNBs, core network elements (or network functions), application servers, application functions, etc. Any embodiment discussed herein as being performed by a network element may additionally or alternatively be performed by a UE, or the UE may take the role of the network element (e.g., some or all features defined for network equipment may be implemented by a UE).

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

13. TERMINOLOGY

The terminology used herein is for the purpose of describing the various embodiments discussed previously and is not intended to be limiting the inventive aspects of the present disclosure.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like. The term "physical interface" refers to a physical port or air interface (such as radio, audio or optical) used to communicate with the device at the physical layer; examples include radios, ethernet ports, serial interfaces (e.g., USB), and those used for debugging. The term "radio interface" refers to the specification of regulated use of radio spectrum. The term "logical interface" refers to a software implementation that utilizes a network interface to communicate over the network via channels or ports. The term "network interface" may refer to physical interface that can be used to access resources and/or the functionality of computing system via a network.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "equipment" refers to any apparatus or fixed installation. A "fixed installation" is a particular combination of several types of apparatus and, where applicable, other devices, which are assembled, installed and intended to be used permanently at a predefined location.

The term "apparatus" refers to any finished appliance or combination thereof made available on the market as a single functional unit, intended for an end-user. In some instances, an "apparatus" is capable of generating electromagnetic disturbance, or the performance of which is liable to be affected by such disturbance. For the purposes of the present disclosure, an "apparatus" may also refer to one or more "components" or "sub-assemblies" intended for incorporation into an apparatus, and/or "mobile installations" which is a combination of apparatus and, where applicable, other devices, intended to be moved and operated in a range of locations.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, terminal equipment, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Additionally or alternatively, the term "user equipment" or "UE" may refer to terminal equipment as defined in point (1) of Article 1 of Commission Directive 2008/63/EC. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "radio equipment" or "RE" refers to an electrical or electronic product, which intentionally emits and/or receives radio waves for the purpose of radio communication and/or radiodetermination, or an electrical or electronic product which must be completed with an accessory, such as antenna, so as to intentionally emit and/or receive radio waves for the purpose of radio communication and/or radio-determination. Additionally or alternatively, the term "radio equipment" may refer to a device with radio communication capabilities.

The term "radiodetermination" refers to the determination of the position, velocity and/or other characteristics of an object, or the obtaining of information relating to those parameters, by means of the propagation properties of radio waves.

The term "reconfigurable radio equipment" refers to radio equipment with radio communication capabilities providing support for radio reconfiguration, including software-based radio reconfiguration and/or hardware-based radio reconfiguration. Any equipment may be considered to be "reconfigurable equipment" even if only limited reconfiguration is possible, for example, through firmware upgrades. As used herein, the term "reconfigurable mobile device" refers to a mobile device with radio communication capabilities providing support for radio reconfiguration. A reconfigurable mobile device is a type of reconfigurable radio equipment. Reconfigurable Radio Equipment may include, for example, Smartphones, Feature phones, Tablets, Laptops, Connected Vehicle communication platforms, Network platforms, IoT devices, network devices, network appliances, and/or the like. As used herein a "radio computer" is the part of Radio Equipment hardware working under ROS control and on which RAs are executed.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or C0) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. The term "IoT product" may refer to consumer IoT device(s) and its/their associated services. The term "consumer IoT device" may refer to a network-connected (and network-connectable) device that has relationships to associated services and are used by a consumer typically in the home or as electronic wearables. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio communication" means communication by means of radio waves. As used herein, the term "radio waves" means electromagnetic waves of frequencies propagated in space without artificial guide.

The term "channel" as used herein refers to any transmission medium, either tangible or intangible, which is used to communicate data or a data stream. Additionally or alternatively, the term "channel" refers to a designated part of an information transfer capability having specified characteristics, provided at the user network interface. Additionally or alternatively, the term "channel" refers to the over-the-air wireless propagation channel which is used to convey an information signal from transmitter to receiver (see e.g., ETSI EN 303 648). The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally or alternatively, the term "link" as used herein refers to a connection from one location to another and/or between two or more devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or 3GPP 5G New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X, Dedicated Short Range Communications (DSRC), DSRC in Japan in the 700 MHz band (including 715 MHz to 725 MHz), Intelligent-Transport-Systems (ITS) including the European ITS-G5, ITS-G5B, ITS-G5C, etc., IEEE 802.11p or IEEE 802.11bd, and the like), In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "electronic communications network" refers to transmission systems, whether or not based on a permanent infrastructure or centralised administration capacity, and, where applicable, switching or routing equipment and other resources, including network elements which are not active, which permit the conveyance of signals by wire, radio, optical or other electromagnetic means, including satellite networks, fixed (circuit- and packet-switched, including internet) and mobile networks, electricity cable systems, to the extent that they are used for the purpose of transmitting signals, networks used for radio and television broadcasting, and cable television networks, irrespective of the type of information conveyed.

The term "electronic communications service" refers to a service normally provided for remuneration via electronic communications networks, which encompasses, with the exception of services providing, or exercising editorial control over, content transmitted using electronic communications networks and services, and may include, for example, internet access services; interpersonal communications services; and services comprising wholly or mainly in the conveyance of signals such as transmission services used for the provision of machine-to-machine services and for broadcasting. The term "interpersonal communications service" refers to a service normally provided for remuneration that enables direct interpersonal and interactive exchange of information via electronic communications networks between a finite number of persons, whereby the persons initiating or participating in the communication determine its recipient(s) and does not include services which enable interpersonal and interactive communication merely as a minor ancillary feature that is intrinsically linked to another service.

The term "operator" refers to an undertaking providing or authorised to provide a network or services and/or providing or authorised to provide a public electronic communications network or an associated facility. The term "public electronic communications network" refers to an electronic communications network used wholly or mainly for the provision of publicly available electronic communications services which support the transfer of information between network termination points; The term "network termination point" refers to the physical point at which an end-user is provided with access to a public electronic communications network, and which, in the case of networks involving switching or routing, is identified by means of a specific network address, which may be linked to an end-user's number or name. The term "provision of an electronic communications network" refers to the establishment, operation, control or making available of such a network.

The term "associated facilities'" refers to associated services, physical infrastructures, and other facilities or elements associated with an electronic communications network or an electronic communications service which enable or support the provision of services via that network or service, or have the potential to do so, and include buildings or entries to buildings, building wiring, antennae, towers and other supporting constructions, ducts, conduits, masts, manholes, and cabinets. The term "associated service" refers to a service associated with an electronic communications network or an electronic communications service which enables or supports the provision, self-provision or automated-provision of services via that network or service, or has the potential to do so, and includes number translation or systems offering equivalent functionality, conditional access systems and electronic programme guides (EPGs), as well as other services such as identity, location and presence service. Additionally or alternatively, the term "associated service" refers to digital services that, together with the device, are part of the overall consumer product (e.g., IoT devices) and that are typically required to provide the product's intended functionality. Examples of associated services can include mobile applications, cloud computing/storage, Application Programming Interfaces (APIs), and third-party services.

The term "access" may refer to the making available of facilities or services to another undertaking, under defined conditions, either on an exclusive or a non-exclusive basis, for the purpose of providing one or more services, including when they are used for the delivery of information society services or broadcast content services; it covers, inter alia: access to network elements and associated facilities, which may involve the connection of equipment, by fixed or non-fixed means (in particular this includes access to the local loop and to facilities and services necessary to provide services over the local loop); access to physical infrastructure including buildings, ducts and masts; access to relevant software systems including operational support systems; access to information systems or databases for pre-ordering, provisioning, ordering, maintaining and repair requests, and billing; access to number translation or systems offering equivalent functionality; access to fixed and mobile networks, in particular for roaming; access to conditional access systems for digital television services and access to virtual network services. The term "conditional access system" refers to any technical measure, authentication system and/or arrangement whereby access to a protected radio or television broadcasting service in intelligible form is made conditional upon subscription or another form of prior individual authorisation.

The terms "security incident" or "attack" refer to an event having an actual adverse effect on the security of electronic communications networks or services. The term "security of networks and services" refers to the ability of electronic communications networks and services to resist, at a given level of confidence, any action that compromises the availability, authenticity, integrity or confidentiality of those networks and services, of stored or transmitted or processed data, or of the related services offered by, or accessible via, those electronic communications networks or services. The term "authentication mechanism" refers to a method used to prove the authenticity of an entity.

The term "interconnection" refers to a specific type of access implemented between public network operators by means of the physical and logical linking of public electronic communications networks used by the same or a different undertaking in order to allow the users of one undertaking to communicate with users of the same or another undertaking, or to access services provided by another undertaking where such services are provided by the parties involved or other parties who have access to the network.

The term "radio spectrum allocation" refers to the designation of a given radio spectrum band for use by one or more types of radio communications services, where appropriate, under specified conditions. The term "shared use of radio spectrum" refers to access by two or more users to use the same radio spectrum bands under a defined sharing arrangement, authorised on the basis of a general authorisation, individual rights of use for radio spectrum or a combination thereof, including regulatory approaches such as licensed shared access aiming to facilitate the shared use of a radio spectrum band, subject to a binding agreement of all parties involved, in accordance with sharing rules as included in their rights of use for radio spectrum in order to guarantee to all users predictable and reliable sharing arrangements, and without prejudice to the application of competition law.

The term "electromagnetic disturbance" or "interference" refers to any electromagnetic phenomenon which may degrade the performance of equipment; an electromagnetic disturbance may be electromagnetic noise, an unwanted signal or a change in the propagation medium itself. The term "harmful interference" refers to interference which endangers the functioning of a radio navigation service, safety services, or which otherwise seriously degrades, obstructs, or repeatedly interrupts a radio communications service operating in accordance with the applicable international or national regulations.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The term "emergency communication" refers to communication by means of interpersonal communications services between an end-user and a public safety answering point (PSAP) with the goal to request and receive emergency relief from emergency services. The term "emergency service" refers to a service that provides immediate and rapid assistance in situations where there is a direct risk to life or limb, to individual or public health or safety, to private or public property, or to the environment, in accordance with national law.

The terms "instantiate," "instantiation," and the like as used herein refers to the creation of an instance. An "instance" also refers to a concrete occurrence of an object, which may occur, for example, during execution of program code. The term "reference point" refers to a conceptual point at the conjunction of two non-overlapping functions that can be used to identify the type of information passing between these functions.

The term "information element" refers to a structural element containing one or more fields. The term "field" refers to individual contents of an information element, or a data element that contains content. The term "data element" or "DE" refers to a data type that contains one single data. The term "data frame" or "DF" refers to a data type that contains more than one data element in a predefined order.

The term "database" refers to a collection of data, independent works, and/or other materials arranged in a systematic or methodical way and individually accessible by electronic or other means. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The term "information object" refers to any data structure that is capable of including one or more data items, each of which may include one or more data values. Examples of information objects may include electronic documents, electronic files, database objects, media content, resources, and/or the like. The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., mark-up language elements/tags, etc.). The terms "data item" or "information item" as used herein may also refer to data elements and/or content items, although these terms may refer to difference concepts. A data element (or simply "element") is a logical component of an information object (or electronic document) that begins with a start tag (e.g., "<element>") and ends with a matching end tag (e.g., "</element>"), or only an empty element tag (e.g., "<element/>"). Any characters between the start tag and end tag, if any, are the element's content (referred to herein as "content items" or the like). Content items may include text content (e.g., "<element>content item</element>"), attributes (e.g., "<element attribute="attributeValue">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to program code, script, or other unit of software designed to perform specific tasks. Additionally or alternatively, the term "application" may refer to a complete and deployable package, environment, or element configurable to achieve a certain function in an operational environment. The term "application programming interface" or "API" refers to a software interface between two or more applications.

The term "software component" refers to a unit of functionality that manages a single abstraction. Additionally or alternatively, the term "software component" refers to reusable code elements. Additionally or alternatively, the term "software component" refers to program code, script, or other unit of software with specified interfaces and explicit context dependencies. A software component can be as small as a block of reusable code, or it can be as big as an entire application. A software component can be deployed independently of other software components and may be subject to composition by third parties. The term "software service" refers to a software component of a device that is used to support functionality; examples of software services include a runtime for a programming language used within the device software or a daemon that exposes an API used by the device software (e.g., a cryptographic module's API).

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements. The term "AI/ML application" or the like may be an application that contains some AI/ML models and application-level descriptions.

The term "ego" used with respect to an element or entity, such as "ego ITS-S", "ego UE", "ego device," and/or the like, refers to an entity (e.g., ITS-S, UE, device, etc.) that is under consideration. The term "neighbors" or "proximity" used to describe elements or entities refers to entities/elements different than the ego entity/element.

The term "user" refers to a natural or legal person using or requesting equipment, apparatus, and/or service. The term "end-user" refers to a user not providing equipment, apparatus, and/or public electronic communications networks or services. The term "consumer" means any entity or element that uses or requests equipment, apparatus, and/or services.

The term "interoperability" refers to the ability of a device (e.g., REs including UEs and infrastructure equipment) and utilizing one standard/protocol/RAT to communicate with one or more other devices that utilize the another standard/protocol/RAT. The term "Coexistence" refers to sharing or allocating radiofrequency resources among REs using different standards/protocols/RATs.

The term "personal data" and/or the term "personally identifiable information" refers to information that relates to an identified or identifiable individual. Additionally or alternatively, "personal data" and/or "personally identifiable information" refers to information that can be used on its own or in combination with other information to identify, contact, or locate a person, or to identify an individual in context.

The term "sensitive data" may refer to data related to racial or ethnic origin, political opinions, religious or philosophical beliefs, or trade union membership, genetic data, biometric data, data concerning health, and/or data concerning a natural person's sex life or sexual orientation.

The term "confidential data" refers to any form of information that a person or entity is obligated, by law or contract, to protect from unauthorized access, use, disclosure, modification, or destruction. Additionally or alternatively, "confidential data" may refer to any data owned or licensed by a person or entity that is not intentionally shared with the general public or that is classified by the person or entity with a designation that precludes sharing with the general public.

The term "pseudonymization" or the like refers to any means of processing personal data or sensitive data in such a manner that the personal/sensitive data can no longer be attributed to a specific data subject (e.g., person or entity) without the use of additional information. The additional information may be kept separately from the personal/sensitive data and may be subject to technical and organizational measures to ensure that the personal/sensitive data are not attributed to an identified or identifiable natural person.

The term "radio application" or "RA" refers to a software element, which enforces the generation of the transmission of RF signals and/or the decoding of received RF signals. RAs may have different forms of representation, such as source code(s) including Radio Library calls of Radio Library native implementation and Radio HAL calls; intermediate Representations (IRs) including Radio Library calls of Radio Library native implementation and radio Hardware Abstraction Layer (HAL) calls; and/or executable code(s) for a particular radio platform. RAs are executed on a particular radio platform or a Radio Virtual Machine (RVM) as part of the radio platform.

The term "Radio Virtual Machine" or "RVM" refers to an abstract machine or virtual machine supporting reactive and concurrent executions. An RVM may be implemented as a controlled execution environment which allows the selection of a trade-off between flexibility of base band code development and required (re-)certification efforts.

The term "radio library" refers to a library of Standard Functional Blocks (SFB) that is/are provided by a platform vendor in a form of platform-specific executable code. SFBs implement reference code(s) of functions which are typical for radio signal processing. They are not atomic and their source codes are typed and visible for Radio Application developers.

An SFB is implemented through a Radio HAL when the SFB is implemented on dedicated HW accelerators. Radio HAL is part of ROS.

The term "CE mark" refers to a marking affixed to an apparatus or product by which a manufacturer indicates that the apparatus or product is in conformity with one or more applicable requirements set out in legislation, harmonization legislation, regulation, technical standard, harmonised standard, guideline(s), and/or the like. The CE mark may include a CE logo, and in some cases, may also include a 4-digit identifier.

The term "technical specification" refers to a document that prescribes technical requirements to be fulfilled by equipment or product. A "Document of Conformity" or "DoC" is a document provided with radio equipment in which a manufacturer declares that it has assessed compliance with all relevant acts and/or regulations governing the with radio equipment.

The term "manufacturer" refers to any natural or legal person who manufactures apparatus or has apparatus designed or manufactured, and markets that apparatus under his name, trademark, and/or CE mark. The term "authorised representative" refers to any natural or legal person established within one or more legal frameworks who has received a written mandate from a manufacturer to act on his behalf in relation to specified task(s).

The term "conformity assessment" refers to a process of demonstrating whether essential requirements have been fulfilled. A "conformity assessment body" is a body that performs conformity assessment activities/processes. The term "making available on the market" refers to any supply of equipment or product(s) for distribution, consumption or use on the market in the course of a commercial activity, whether in return for payment or free of charge. The term "placing on the market" means the first making available of equipment or product(s) on the market or for user consumption.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. One or more non-transitory computer-readable media (NTCRM) comprising instructions for governing access to a set of data items, wherein execution of the instructions by a radio control framework (RCF) of a radio equipment (RE) is to cause the RCF to:

generate a statistical model for facilitating access to a set of data items based on a number of times access for individual data items of the set of data items are requested, a reason for each request to access the individual data items, and interdependencies or relationships between each request to access the individual data items;

facilitate access to individual data items of the set of data items based on the statistical model;

generate a security data container; and cause transmission of the security data container over a security channel different from other channels of an underlying network access protocol.

2. The one or more NTCRM of claim 1, wherein each request to access the individual data items includes a category indicator indicating the reason for accessing the individual data items, wherein the category indicator includes:

an identifier of each entity that requested the individual data items, an intended use for the individual data items, and a certificate of each entity that requested the individual data items.

3. The one or more NTCRM of claim 1, wherein the statistical model is based on one or more of:

a time since a previous access to any data item requested by any requesting entity of a set of requesting entities;

a number of accesses to any data item within a given time interval requested by any requesting entity of the set of requesting entities;

a time since a previous access to a given data item requested by an authorized requesting entity of the set of requesting entities;

a number of accesses to a given data item within a given time interval requested by an authorized entity of the set of requesting entities;

a time since a last access to any data item requested by an authorized requesting entity of the set of requesting entities;

a number of accesses to any data item within a given time interval and requested by an authorized requesting entity of the set of requesting entities;

a time since a previous access to a given data item under a condition that one or more other data items had been accessed during a given time interval;

a geographic area or a current location of a requesting entity of the set of requesting entities;

a geographic area or a current location of a requested data item;

mobility information of the requesting entity;

mobility information of equipment storing the requested data item;

one or more devices proximate or within a predefined distance of the requesting entity; and one or more devices proximate or within a predefined distance of the equipment storing the requested data item.

4. The one or more NTCRM of claim 1, wherein execution of the instructions is to cause the RCF to:

update the statistical model in response to receipt of each request for an individual data item based on the individual data items that were requested, a reason for the request, and any interdependencies or relationships between the request and one or more other requests or other data items.

5. The one or more NTCRM of claim 1, wherein, to facilitate the access to the individual data items, execution of the instructions is to cause the RCF to:

grant access to the individual data items when the requests for access to the individual data items are compatible with the statistical model; and deny access to the individual data items when the requests for access to the individual data items are not compatible with the statistical model.

6. The one or more NTCRM of claim 1, wherein the security data container comprises:

a Privacy Hierarchy Level (PHL) tag associated with user data, wherein the PHL tag is an integer, Boolean value, a character, a character string, or one or more bits, and a security identifier (ID) data element that carries a security ID, a preamble data element to carry a security preamble, a pointer data element to carry a security pointer, the security pointer pointing to a secure resource that stores the user data, and a secure information data element to carry data for transmission.

7. The one or more NTCRM of claim 6, wherein the PHL is among a plurality of PHLs, and the plurality of PHLs comprises a first (public data) level indicating that associated data is not privacy related and can be freely shared, a second level indicating that associated data is indirectly related to a user which may be used to infer privacy-related information, a third level indicating that associated data is historical data related to a context of a user, a fourth level indicating that associated data is current data related to the context of the user, and fifth level indicating that associated data is intimate or sensitive and high-related to user privacy.

8. The one or more NTCRM of claim 7, wherein, to cause transmission of the security data container, execution of the instructions is to cause the RCF to cause a radio platform of the RE to:

transmit the data container over the security channel only when the PHL of the user data is the third level, the fourth level, or the fifth level;

transmit the data container over a broadcast channel when the PHL associated with the user data is the first level; and transmit the data container over a data channel when the PHL associated with the user data is the second level.

9. The one or more NTCRM of claim 6, wherein execution of the instructions is to cause the RCF to:

generate the security ID as a bit string representation of a device ID of the device, wherein the bit string representation comprises K active bits and N additional active bits, wherein K and N are numbers, and the N bits are only known to authorized entities; and insert the generated security ID into the security ID data element.

* * * * *